US012380858B2

(12) United States Patent
Takasugi et al.

(10) Patent No.: US 12,380,858 B2
(45) Date of Patent: Aug. 5, 2025

(54) DISPLAY DEVICE

(71) Applicant: LG DISPLAY CO., LTD., Seoul (KR)

(72) Inventors: Shinji Takasugi, Kanagawa (JP); Hyun-Jong Ji, Kanagawa (JP)

(73) Assignee: LG Display Co., Ltd., Seoul (KR)

( * ) Notice: Subject to any disclaimer, the term of this patent is extended or adjusted under 35 U.S.C. 154(b) by 5 days.

(21) Appl. No.: 18/384,357

(22) Filed: Oct. 26, 2023

(65) Prior Publication Data

US 2024/0221677 A1 Jul. 4, 2024

(30) Foreign Application Priority Data

Dec. 28, 2022 (JP) ................................. 2022-211744

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2310/0278* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2012/0212401 A1* 8/2012 Bae ...................... G09G 3/3677 345/87

FOREIGN PATENT DOCUMENTS

JP 2012-173742 A 9/2012
KR 10-2016-0066654 A 6/2016
KR 10-2020-0016100 A 2/2020
KR 10-2021-0085513 A 7/2021
WO 2018/221477 A1 12/2018

OTHER PUBLICATIONS

Japanese Office Action dated Jan. 18, 2024 issued in Patent Application No. 2022-211744 w/English Translation (11 pages).
Korean Office Action dated Jun. 29, 2024 issued in Patent Application No. 10-2023-0101659 (6 pages).

* cited by examiner

*Primary Examiner* — Brian M Butcher
(74) *Attorney, Agent, or Firm* — Fish & Richardson P.C.

(57) ABSTRACT

A display device includes a display panel having a plurality of subpixels arranged in a row and a column; a first gate driving unit supplying a plurality of gate signals to the first subpixel through a plurality of first gate lines; a second gate driving unit supplying the plurality of gate signals to the second subpixel through a plurality of second gate lines; a data driving unit supplying a plurality of data signals through the plurality of data lines; and a timing controlling unit controlling the first gate driving unit, the second gate driving unit and the data driving unit, wherein the timing controlling unit controls the first gate driving unit independently from the second gate driving unit to consecutively supply the plurality of gate signals to the first subpixel through the plurality of first gate lines.

26 Claims, 37 Drawing Sheets

FIG. 10

| gate line | GIP | stage | clock(1) | clock(2) | clock(3) | clock(4) | clock(5) | clock(6) | clock(7) | clock(8) | clock(9) |
|---|---|---|---|---|---|---|---|---|---|---|---|
| GL1,GL3 | first GIP | first stage | ON | HOLD | HOLD | HOLD | HOLD | HOLD | HOLD | HOLD | HOLD |
| GL2,GL4 | second GIP | second stage | ON | ON | ON | ON | ON | HOLD | HOLD | HOLD | HOLD |
| GL5,GL7 | first GIP | third stage | ON | ON | HOLD | HOLD | HOLD | HOLD | HOLD | HOLD | HOLD |
| GL6,GL8 | second GIP | fourth stage | ON | ON | ON | ON | ON | ON | HOLD | HOLD | HOLD |
| GL9,GL11 | first GIP | fifth stage | ON | ON | ON | HOLD | HOLD | HOLD | HOLD | HOLD | HOLD |
| GL10,GL12 | second GIP | sixth stage | ON | ON | ON | ON | ON | ON | ON | HOLD | HOLD |
| GL13,GL15 | first GIP | seventh stage | ON | ON | ON | ON | HOLD | HOLD | HOLD | HOLD | HOLD |
| GL14,GL16 | second GIP | eighth stage | ON | ON | ON | ON | ON | ON | ON | ON | HOLD |
| GL17,GL19 | first GIP | ninth stage | HOLD | ON | ON | ON | ON | ON | ON | ON | ON |
| GL18,GL20 | second GIP | tenth stage | HOLD | HOLD | HOLD | HOLD | HOLD | ON | ON | ON | ON |
| GL21,GL23 | first GIP | eleventh stage | HOLD | HOLD | ON | ON | ON | ON | ON | ON | ON |
| GL22,GL24 | second GIP | twelfth stage | HOLD | HOLD | HOLD | HOLD | HOLD | HOLD | ON | ON | ON |
| GL25,GL27 | first GIP | thirteenth stage | HOLD | HOLD | HOLD | ON | ON | ON | ON | ON | ON |
| GL26,GL28 | second GIP | fourteenth stage | HOLD | HOLD | HOLD | HOLD | HOLD | HOLD | HOLD | ON | ON |
| GL29,GL31 | first GIP | fifteenth stage | HOLD | HOLD | HOLD | HOLD | ON | ON | ON | ON | ON |
| GL30,GL32 | second GIP | sixteenth stage | HOLD | HOLD | HOLD | HOLD | HOLD | HOLD | HOLD | HOLD | ON |

FIG. 11

| gate line | GIP | stage | clock(1) | clock(2) | clock(3) | clock(4) | clock(5) | clock(6) | clock(7) | clock(8) | clock(9) |
|---|---|---|---|---|---|---|---|---|---|---|---|
| GL1,GL3 | first GIP | first stage | ON | ON | ON | ON | ON | HOLD | HOLD | HOLD | HOLD |
| GL2,GL4 | second GIP | second stage | ON | HOLD | HOLD | HOLD | HOLD | HOLD | HOLD | HOLD | HOLD |
| GL5,GL7 | first GIP | third stage | ON | ON | ON | ON | ON | ON | HOLD | HOLD | HOLD |
| GL6,GL8 | second GIP | fourth stage | ON | ON | HOLD | HOLD | HOLD | HOLD | HOLD | HOLD | HOLD |
| GL9,GL11 | first GIP | fifth stage | ON | ON | ON | ON | ON | ON | ON | HOLD | HOLD |
| GL10,GL12 | second GIP | sixth stage | ON | ON | ON | HOLD | HOLD | HOLD | HOLD | HOLD | HOLD |
| GL13,GL15 | first GIP | seventh stage | ON | ON | ON | ON | ON | ON | ON | ON | HOLD |
| GL14,GL16 | second GIP | eighth stage | ON | ON | ON | ON | HOLD | HOLD | HOLD | HOLD | HOLD |
| GL17,GL19 | first GIP | ninth stage | HOLD | HOLD | HOLD | HOLD | HOLD | ON | ON | ON | ON |
| GL18,GL20 | second GIP | tenth stage | HOLD | ON | ON | ON | ON | ON | ON | ON | ON |
| GL21,GL23 | first GIP | eleventh stage | HOLD | HOLD | HOLD | HOLD | HOLD | HOLD | ON | ON | ON |
| GL22,GL24 | second GIP | twelfth stage | HOLD | HOLD | ON | ON | ON | ON | ON | ON | ON |
| GL25,GL27 | first GIP | thirteenth stage | HOLD | HOLD | HOLD | HOLD | HOLD | HOLD | HOLD | ON | ON |
| GL26,GL28 | second GIP | fourteenth stage | HOLD | HOLD | HOLD | ON | ON | ON | ON | ON | ON |
| GL29,GL31 | first GIP | fifteenth stage | HOLD | HOLD | HOLD | HOLD | HOLD | HOLD | HOLD | HOLD | ON |
| GL30,GL32 | second GIP | sixteenth stage | HOLD | HOLD | HOLD | HOLD | ON | ON | ON | ON | ON |

FIG. 16

| row number | input | |
|---|---|---|
| | odd column | even column |
| x-7 | 0 | 0 |
| x-6 | 1 | 0 |
| x-5 | 1 | 0 |
| x-4 | 1 | 0 |
| x-3 | 1 | 0 |
| x-2 | 1 | 0 |
| x-1 | 1 | 0 |
| x | 1 | 0 |

FIG. 17

| scan number | judgement result | input data number | input validation signal | input register selection signal | output register selection signal | output data number |
|---|---|---|---|---|---|---|
| 1 | odd number | 1 | 1 | first register | first register | 1 |
| 2 | odd number | 2 | 0 | first register | first register | 2 |
| 3 | odd number | 3 | 0 | first register | first register | 3 |
| 4 | odd number | 4 | 0 | first register | first register | 4 |
| 5 | odd number | 5 | 0 | first register | first register | 5 |
| 6 | odd number | 6 | 0 | first register | first register | 6 |
| 7 | odd number | 7 | 0 | first register | first register | 7 |
| 8 | odd number | 8 | 0 | first register | first register | 8 |
| 9 | even number | 9 | 1 | second register | second register | 9 |
| 10 | even number | 10 | 1 | second register | second register | 10 |
| 11 | even number | 11 | 1 | second register | second register | 11 |
| 12 | even number | 12 | 1 | second register | second register | 12 |
| 13 | even number | 13 | 1 | second register | second register | 13 |
| 14 | even number | 14 | 1 | second register | second register | 14 |
| 15 | even number | 15 | 1 | second register | second register | 15 |
| 16 | even number | 16 | 1 | second register | second register | 16 |

FIG. 18

| row number | input | |
|---|---|---|
| | odd column | even column |
| x-15 | 0 | 0 |
| x-14 | 0 | 0 |
| x-13 | 0 | 0 |
| x-12 | 0 | 0 |
| x-11 | 0 | 0 |
| x-10 | 0 | 0 |
| x-9 | 0 | 0 |
| x-8 | 0 | 0 |

FIG. 19

| scan number | judgement result | input data number | input validation signal | input register selection signal | output register selection signal | output data number |
|---|---|---|---|---|---|---|
| 17 | odd number | 17 | 1 | first register | first register | 17 |
| 18 | even number | 18 | 1 | second register | second register | 18 |
| 19 | even number | 19 | 1 | second register | second register | 19 |
| 20 | odd number | 20 | 1 | first register | first register | 20 |
| 21 | odd number | 21 | 1 | first register | first register | 21 |
| 22 | even number | 22 | 1 | second register | second register | 22 |
| 23 | even number | 23 | 1 | second register | second register | 23 |
| 24 | odd number | 24 | 1 | first register | first register | 24 |
| 25 | odd number | 25 | 1 | first register | first register | 25 |
| 26 | even number | 26 | 1 | second register | second register | 26 |
| 27 | even number | 27 | 1 | second register | second register | 27 |
| 28 | odd number | 28 | 1 | first register | first register | 28 |
| 29 | odd number | 29 | 1 | first register | first register | 29 |
| 30 | even number | 30 | 1 | second register | second register | 30 |
| 31 | even number | 31 | 1 | second register | second register | 31 |
| 32 | odd number | 32 | 1 | first register | first register | 32 |

FIG. 33

| row number | input | |
|---|---|---|
| | odd column | even column |
| 2501 | 0 | 0 |
| 2502 | 0 | 0 |
| 2503 | 0 | 0 |
| 2504 | 1, 2501 | 0 |
| 2505 | 0 | 0 |
| 2506 | 1, 2504 | 0 |
| 2507 | 0 | 0 |
| 2508 | 0 | 0 |

FIG. 36

| scan number | judgement result | input data number | input validation signal | input register selection signal | output register selection signal | output data number |
|---|---|---|---|---|---|---|
| 33 | odd number | 33 | 1 | first register | first register | 33 |
| 34 | odd number | 41 | 1 | second register | first register | 34 |
| 35 | odd number | - | 0 | second register | first register | 35 |
| 36 | odd number | - | 0 | second register | first register | 36 |
| 37 | odd number | - | 0 | second register | first register | 37 |
| 38 | odd number | - | 0 | second register | first register | 38 |
| 39 | odd number | - | 0 | second register | first register | 39 |
| 40 | odd number | - | 0 | second register | first register | 40 |
| 41 | even number | 42 | 1 | first register | second register | 41 |
| 42 | even number | 43 | 1 | second register | first register | 42 |
| 43 | even number | 44 | 1 | first register | second register | 43 |
| 44 | even number | 45 | 1 | second register | first register | 44 |
| 45 | even number | 46 | 1 | first register | second register | 45 |
| 46 | even number | 47 | 1 | second register | first register | 46 |
| 47 | even number | 48 | 1 | first register | second register | 47 |
| 48 | even number | - | 1 | first register | first register | 48 |

DISPLAY DEVICE

CROSS-REFERENCE TO RELATED APPLICATION

The present application claims the priority of Japanese Patent Application No. 2022-211744, filed on Dec. 28, 2022, which is hereby incorporated by reference in its entirety.

BACKGROUND

Field of the Disclosure

The present disclosure relates to a display device, and more particularly, to a display device including a gate driving unit for supplying a gate signal to a subpixel.

Description of the Background

Recently, a display device using a double rate driving (DRD) method has been suggested.

In Korean Patent Publication No. 10-2020-0016100, a display device using a double rate driving method where two subpixels commonly have one data line is disclosed.

However, in the display device, a gate signal is not sufficiently supplied to the subpixels.

SUMMARY

Accordingly, the present disclosure is directed to a display device that substantially obviates one or more of the problems due to limitations and disadvantages of the related art.

More specifically, the present disclosure is to provide a display device including a gate driving unit for supplying a gate signal to a subpixel.

Additional features and advantages of the disclosure will be set forth in the description which follows, and in part will be apparent from the description, or can be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes a display panel having a plurality of subpixels arranged in a row and a column, a plurality of gate lines extending along a row direction and a plurality of data lines extending along a column direction; a first gate driving unit supplying a plurality of gate signals for activating a first subpixel of a first color of the plurality of subpixels to the first subpixel through a plurality of first gate lines of the plurality of gate lines; a second gate driving unit supplying the plurality of gate signals for activating a second subpixel of a second color of the plurality of subpixels to the second subpixel through a plurality of second gate lines of the plurality of gate lines; a data driving unit supplying a plurality of data signals corresponding to a luminance of the plurality of subpixels through the plurality of data lines; and a timing controlling unit controlling the first gate driving unit, the second gate driving unit and the data driving unit, wherein the first subpixel and the second subpixel in a first row commonly have a first data line of the plurality of data lines, and wherein the timing controlling unit controls the first gate driving unit independently from the second gate driving unit to consecutively supply the plurality of gate signals to the first subpixel through the plurality of first gate lines.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings:

FIG. 10 is a view showing an ON state and a HOLD state of a first GIP and a second GIP of a display device according to a first aspect of the present disclosure;

FIG. 11 is a view showing an ON state and a HOLD state of a first GIP and a second GIP of a display device according to a second aspect of the present disclosure;

FIG. 16 is a view showing input signals to a scheduler of a display device according to a first aspect of the present disclosure;

FIG. 17 is a view showing input signals to a data selection part of a display device according to a first aspect of the present disclosure;

FIG. 18 is a view showing input signals to a scheduler of a display device according to a third aspect of the present disclosure;

FIG. 19 is a view showing input signals to a data selection part of a display device according to a third aspect of the present disclosure;

FIG. 33 is a view showing input signals to a scheduler of a display device according to a fourth aspect of the present disclosure;

FIG. 36 is a view showing input signals to a data selecting part of a display device according to a sixth aspect of the present disclosure;

DETAILED DESCRIPTION OF THE ASPECTS

Figure 1:
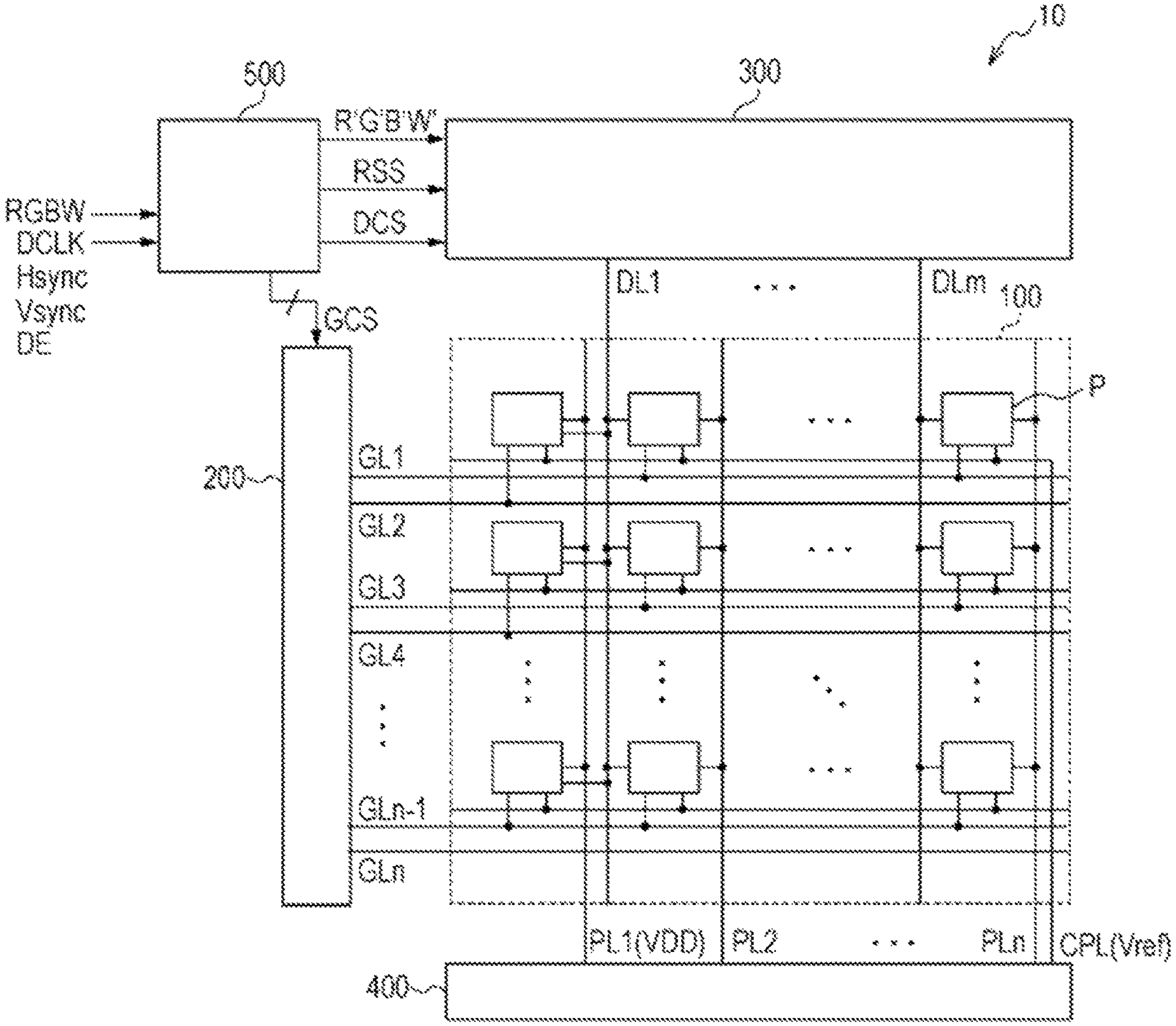
FIG. 1 is a view showing a display device according to a first aspect of the present disclosure.

Reference will now be made in detail to aspects of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations are selected only for convenience of writing the specification and can be thus different from those used in actual products.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure can be sufficiently thorough and complete to assist those skilled in the art to fully understand the scope of the present disclosure. Further, the present disclosure is only defined by scopes of claims.

FIG. 1 is a view showing a display device according to a first aspect of the present disclosure. Although a display device 10 according to a first aspect of the present disclosure is an organic light emitting diode (OLED) display device, it is not limited thereto. For example, the display device 10 may be a liquid crystal display (LCD) device. In FIG. 1, the display device 10 includes a display panel 100, a gate driving unit 200, a data driving unit 300, a power supplying unit 400 and a timing controlling unit 500.

The display panel 100 generates a display image of the display device 10. The display panel 100 includes a pixel region defined by a plurality of gate lines GL1 to GLn (n is a positive integer) and a plurality of data lines DL1 to DLm (m is a positive integer) crossing each other, and the pixel region includes a plurality of subpixels P arranged in a matrix. The plurality of gate lines GL1 to GLn extend along a horizontal direction from a gate driving unit 200, and the plurality of data lines DL1 to DLm extend along a vertical direction from a data driving unit 300. A pair of adjacent subpixels along each of the plurality of gate lines GL1 to GLn are disposed to have one of the plurality of data lines DL1 to DLm commonly.

The gate driving unit 200 outputs a gate signal to each of the plurality of gate lines GL1 to GLn in an order determined according to a gate control signal GCS. The gate driving unit 200 includes an inner circuit such as a level shifter, a shift register, a delay circuit and a flip-flop and consecutively generates a control signal including a gate start pulse GSP, a gate shift clock GSC and a gate output enable GOE according to the gate control signal GCS. The gate start pulse GSP controls an operation start timing of a gate driving integrated circuit in the gate driving unit 200. The gate shift clock GSC controls a shift timing of a gate signal (scan signal) and is commonly inputted to the gate driving integrated circuit. The gate output enable designates a timing information of the gate driving integrated circuit. The gate driving unit 200 consecutively generates the gate signal by shifting the gate start pulse GSP according to the gate shift clock GSC and supplies the gate signal to each of the plurality of gate lines GL1 to GLn. The gate signal supplied through the plurality of gate lines GL1 to GLn is used for activating each of the plurality of subpixels P in the display panel 100. The gate driving unit 200 controls an output width of the gate signal due to the data enable DE whose output width is modulated by the timing controlling unit 500 and the gate output enable GOE whose output width is modulated by the data enable DE. A disposition of the gate driving unit 200 is not limited to FIG. 1. For example, the gate driving unit 200 may be disposed in non-display areas at both side portions of the display panel 100.

The data driving unit 300 receives an image data R'G'B'W' arranged in the timing controlling unit 500 by row from the timing controlling unit 500. Further, the data driving unit 300 receives the data control signal DCS including a source start pulse SSP, a source shift clock SSC and a source output enable SOE from the timing controlling unit 500. The source start pulse SSP controls a data sampling start timing of a source driving integrated circuit in the data driving unit 300. The source shift clock SSC controls a data sampling timing in each source driving integrated circuit. The data driving unit 300 arranges an image data RGBW using the data control signal DCS and converts the image data RGBW into an analog data voltage for each row. The present disclosure may be applied to an RGB type display device not including a white subpixel and a RGBY type display device including a yellow subpixel as well as a RGBW type display device. Although the RGBW type display device will be exemplarily illustrated hereinafter, it is not limited thereto.

During one horizontal period where the gate signal is supplied to each of the plurality of gate lines GL1 to GLn according to the source output enable SOE, the data driving unit 300 performs a sampling to the image data R'G'B'W' arranged according to the source shift clock SSC by row and converts the image data R'G'B'W' into the data voltage DATA. The data driving unit 300 supplies the data voltage DATA of an analog type to each of the plurality of subpixels in the display panel 100. A conversion period and an output period for the data voltage of the data driving unit 300 may vary according to the data enable DE whose output width is modulated by the timing controlling unit 500 and the source output enable SOE whose output width is modulated by the data enable DE. The data driving unit 300 generates the data voltage DATA such that some of the subpixels P having the same color and disposed along a vertical direction parallel to the data line emit a light and consecutively supplies the data voltage DATA to the plurality of subpixels P in the display panel 100 through the plurality of data lines DL1 to DLm in synchronization with the output timing of the gate signal. The data voltages supplied to the plurality of subpixels correspond to luminances of the plurality of subpixels P.

The power supplying unit 400 supplies a high level voltage VDD and a low level voltage VSS to each of the plurality of subpixels P through a power line. The power supplying unit 400 supplies a compensation voltage Vref to each of the plurality of subpixels P through a compensation power line CPL.

The timing controlling unit 500 generates signals for driving the plurality of subpixels P in the display panel 100 through a double rate driving (DRD) method. The timing controlling unit 500 arranges the image data RGBW such that some of the subpixels P having the same color and disposed along a vertical direction parallel to the data line emit a light. The timing controlling unit 500 outputs the arranged image data RGBW to the data driving unit 300 to operate the plurality of subpixels P in a different order by one frame and some of the subpixels P consecutively emit a light.

The timing controlling unit 500 generates the gate control signal GCS and the data control signal DCS using a dot clock DCLK, the data enable DE, a horizontal synchronization signal Hsync and a vertical synchronization signal Vsync. For driving the display device 10 through a DRD method, the timing controlling unit 500 transmits the gate control signal GCS and the data control signal DCS to the gate driving unit 200 and the data driving unit 300, respectively. The timing controlling unit 500 may generate the gate control signal GCS and the data control signal DCS such that some of the subpixels P having the same color and disposed along a vertical direction consecutively emit a light through a DRD method.

Figure 2:
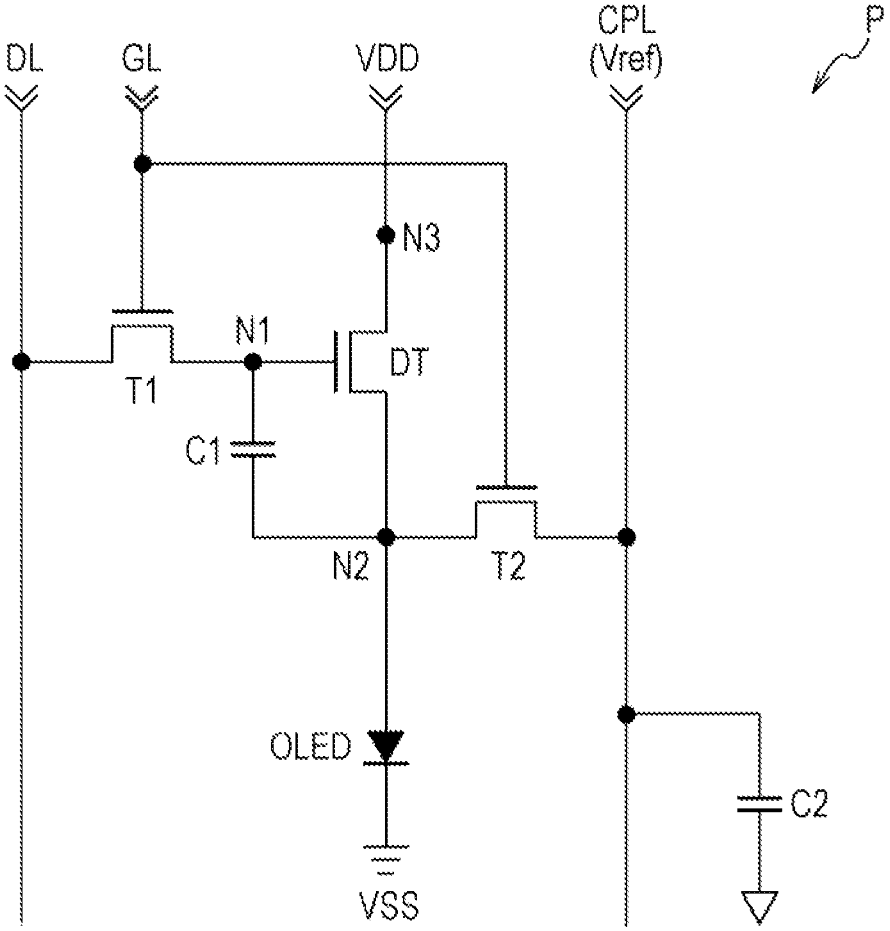
FIG. 2 is a circuit diagram showing a subpixel of a display device according to a first aspect of the present disclosure.

A connection relation of the gate line GL1 to GLn, the data line DL1 to DLm and the subpixel P will be illustrated with reference to FIG. 2. FIG. 2 is a circuit diagram showing a subpixel of a display device according to a first aspect of the present disclosure. In FIG. 2, each subpixel P includes a light emitting diode OLED, a driving transistor DT, a first switching transistor T1, a second switching transistor T2, a first capacitor C1 and a second capacitor C2. The subpixel P is connected to the data line DL, the gate line GL, the high level voltage VDD, the low level voltage VSS and the compensation power line CPL. The light emitting diode OLED may correspond to one of red, green, blue and white colors constituting the pixel region. An anode of the light emitting diode OLED is connected to the high level voltage VDD through the driving transistor DT, and a cathode of the light emitting diode OLED is connected to the low level voltage VSS.

The driving transistor DT, the first switching transistor T1 and the second transistor T2 may be a metal oxide semiconductor field effect transistor (MOSFET). A gate of the driving transistor DT is connected to a source of the first switching transistor T1 through a first node N1, a drain of the driving transistor DT is connected to the high level voltage VDD through a third node N3, and a source of the driving transistor DT is connected to the anode of the light emitting diode OLED through a second node N2. A gate of the first switching transistor T1 is connected to the gate line GL, and a drain of the first switching transistor T1 is connected to the data line DL. The first capacitor C1 is connected between the first and second nodes N1 and N2. A gate of the second switching transistor T2 is connected to the gate line GL, a drain of the second transistor T2 is connected to the second node N2, and a source of the second switching transistor T2 is connected to the compensation power line CPL. The second switching transistor T2 supplies the compensation voltage Vref inputted through the compensation power line CPL to the second node N2 in response to the gate signal of the gate line GL to compensate a voltage of the drain of the driving transistor DT that is an output terminal of the data voltage. To stabilize the compensation voltage Vref, the second capacitor C2 is connected to the compensation power line CPL.

A driving or a stop of the light emitting diode OLED is determined according to a level of the gate line GL, and a luminance of the driven light emitting diode OLED is determined according to a voltage of the data line DL. The gate line GL has a high level when the light emitting diode OLED is scanned (driven), and the gate line GL has a low level when the light emitting diode OLED is not scanned. When the gate line GL has a high level, the first transistor T1 has an ON state and a voltage based on the voltage of the data line DL charges the first capacitor C1. When a voltage of the first capacitor C1 is greater than a threshold voltage of the driving transistor DT, the driving transistor DT has an ON state. The driving transistor DT of an ON state supplies a drain current according to a gate voltage, i.e., a voltage difference between the voltage of the data line DL and the compensation voltage Vref from the high level voltage VDD to the light emitting diode OLED. The light emitting diode OLED emits a light according to the drain current. The first capacitor C1 functions as a storage capacitor that maintains a gate-source voltage of the driving transistor DT of a scan frame till a next scan frame to maintain an emission state or a non-emission state of the light emitting diode OLED.

Figure 3:
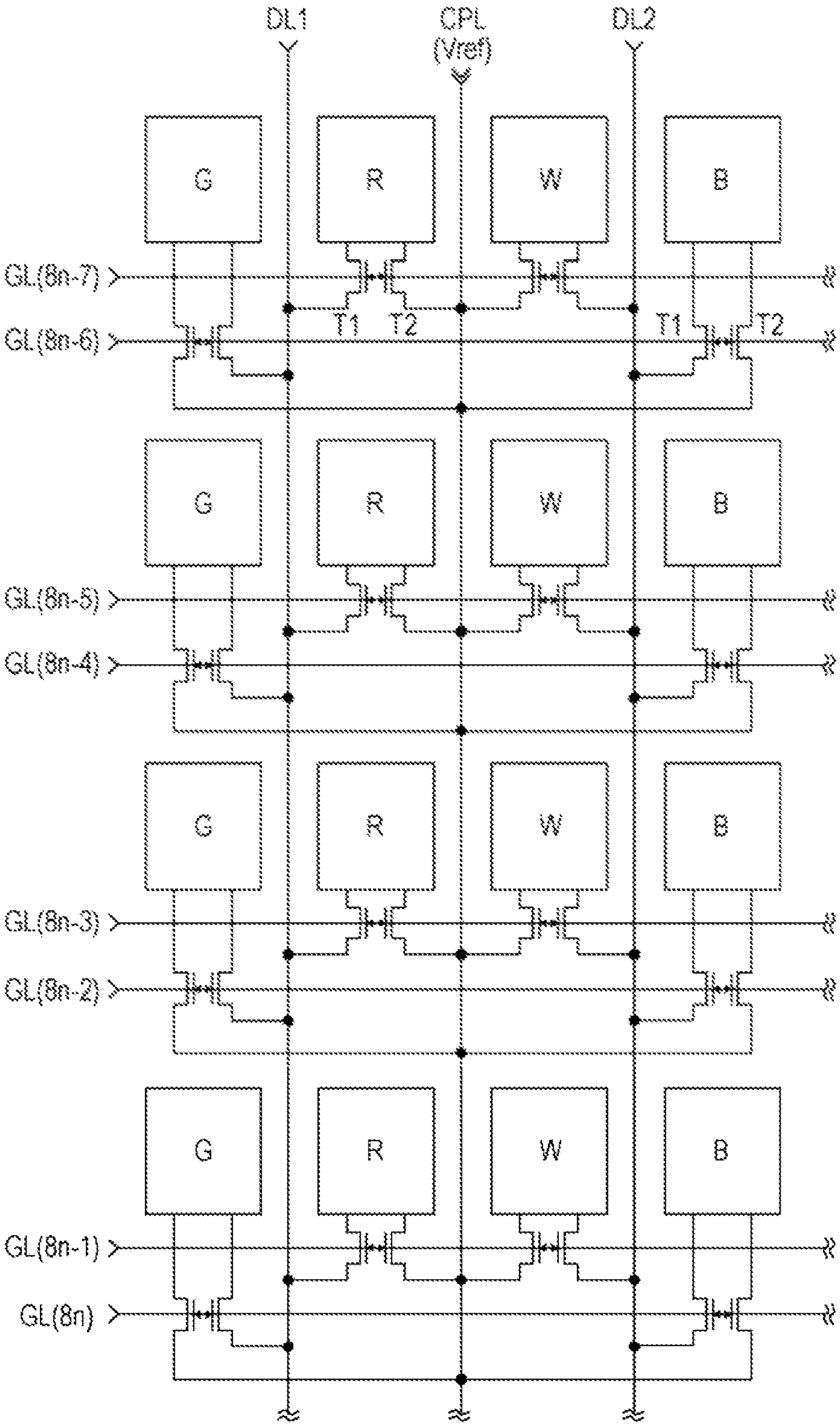
FIG. 3 is a view showing a display panel of a display device according to a first aspect of the present disclosure.

FIG. 3 is a view showing a display panel of a display device according to a first aspect of the present disclosure. In FIG. 3, the plurality of subpixels P are two-dimensionally arranged on the display panel 100 to constitute a pixel surface. The plurality of subpixels P include a green subpixel G, a red subpixel R, a white subpixel W and a blue subpixel B. The subpixel of each color is disposed in each pixel region defined by the plurality of gate lines GL1 to GLn and the plurality of data lines DL1 to DLm crossing each other. The subpixel P of each color is disposed to form a column along the data line DL. For example, the green subpixel G and the red subpixel R are disposed adjacent to each other, and one data line DL1 is disposed between the green subpixel G and the red subpixel R. A pair of adjacent subpixels in each row of the green subpixel G and the red subpixel R are connected to the same data line DL1 through the first switching transistor T1. As a result, a pair of subpixels of the green subpixel G and the red subpixel R commonly have one data line DL1. Similarly, the white subpixel W and the blue subpixel B are disposed adjacent to each other, and one data line DL2 is disposed between the white subpixel W and the blue subpixel B. A pair of adjacent subpixels in each row of the white subpixel W and the blue subpixel B are connected to the same data line DL2 through the first switching transistor T1. As a result, a pair of subpixels of the white subpixel W and the blue subpixel B commonly have one data line DL2. Since the plurality of data lines DL1 to DLm are disposed in the above-mentioned structure for all of the plurality of subpixels P in the display panel 100, the number of the plurality of data lines DL1 to DLm is a half of a sum of columns of subpixels in the display panel 100.

The red subpixel R and the white subpixel W are disposed adjacent to each other, and the compensation power line CPL is disposed between the red subpixel R and the white subpixel W. The subpixel of each color is connected to the compensation power line CPL through the second switching transistor T2 of each subpixel P. The gate of the first switching transistor T1 and the gate of the second switching transistor T2 in the red subpixel R and the white subpixel W in each row are connected to a first gate line of the plurality of gate lines GL1 to GLn. The gate of the first switching transistor T1 and the gate of the second switching transistor T2 in the green subpixel G and the blue subpixel B in the same row are connected to a second gate line of the plurality of gate lines GL1 to GLn different from the first gate line. The subpixels in the different row are connected to two gate lines different from the first and second gate lines. Since the plurality of gate lines GL1 to GLn are disposed in the above-mentioned structure for all of the plurality of subpixels P in the display panel 100, the number of the plurality of gate lines GL1 to GLn is a double of a sum of rows of subpixels in the display panel 100. An arrangement order of the green subpixel G, the red subpixel R, the white subpixel W and the blue subpixel B is not limited to an order of FIG. 3 and may be adequately changed. Although the green subpixel G and the white subpixel W are disposed in an odd column and the red subpixel R and the blue subpixel B are disposed in an even column in FIG. 3, the arrangement of the subpixels is not limited thereto and may be adequately changed. Although the green subpixel G in an odd column and the red subpixel R in an even column commonly have one data line DL1 and the white subpixel W in an odd column and the blue subpixel B in an even column commonly have one data line DL2 in FIG. 3, the columns of subpixels are not limited thereto and may be adequately changed. For example, the green subpixel G and the white subpixel W in an odd column may commonly have one data line DL1 and the red subpixel R and the blue subpixel B in an even column may commonly have one data line DL2 in another aspect.

Figure 4:
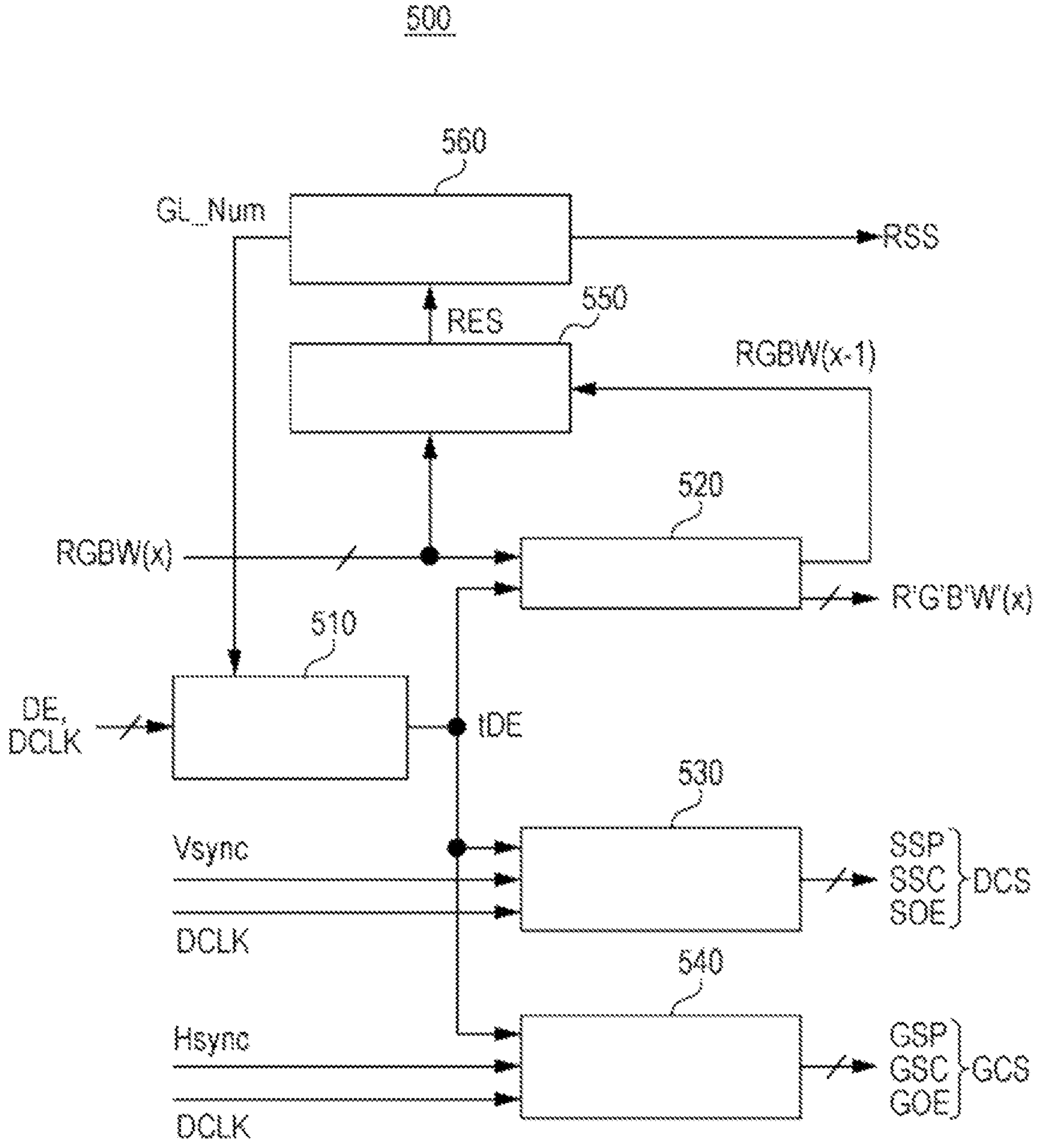
FIG. 4 is a view showing a timing controlling unit of a display device according to a first aspect of the present disclosure.

FIG. 4 is a view showing a timing controlling unit of a display device according to a first aspect of the present disclosure. In FIG. 4, the timing controlling unit 500 includes a signal modulating part 510, a row memory part 520, a data control signal generating part 530, a gate control signal generating part 540, a similarity judging part 550 and a scheduler 560.

The signal modulating part 510 modulates a pulse width of the data enable DE. For example, when the subpixels of the same colors are consecutively scanned, the signal modulating part 510 may generate a modulated data enable tDE and may determine an individual charging period for each subpixel. The signal modulating part 510 transmits the modulated data enable tDE to the row memory part 520, the control signal generating part 530 and the gate control signal generating part 540.

The row memory part 520 stores the image data RGBW by the row. For example, the row memory part 520 may store the image data RGBW(x) of an xth row (x is a positive integer). The row memory part 520 transmits the image data RGBW(x−1) of an (x−1)th row to the similarity judging part 550. The row memory part 520 arranges the image data RGBW based on the modulated data enable tDE received from the signal modulating part 510. The row memory part 520 transmits the arranged image data R'G'B'W' to the data driving unit 300.

The data control signal generating part 530 generates the data control signal DCS using the modulated image data tDE, the dot clock DCLK and the vertical synchronization signal Vsync. The data control signal generating part 530 modulates an output width of the source output enable SOE using the modulated data enable tDE and adjusts a charging period for each subpixel. The data control signal generating part 530 transmits the source start pulse SSP and the source shift clock SSC to the data driving unit 300.

The gate control signal generating part 540 generates the gate control signal GCS using the modulated data enable tDE, the dot clock DCLK and the horizontal synchronization signal Hsync. The gate control signal generating part 540 modulates an output width of the gate output enable GOE using the modulated data enable tDE and adjusts a supply period of the gate signal for the subpixel. The gate control signal generating part 540 transmits the gate start pulse GSP and the gate shift clock GSC to the gate driving unit 200.

The similarity judging part 550 judges a similarity of the image data of two rows and transmits a judgment result RES to the scheduler 560. For example, the similarity judging part 550 receives the image data RGBW(x−1) of the (x−1)th row from the row memory part 520 and judges whether the image data RGBW(x−1) of the (x−1)th row is similar to the image data RGBW(x) of the (x)th row. For example, when the image data of the two rows are judged to be similar to each other, the similarity judging part 550 outputs 1 as the judgment result RES. When the image data of the two rows are judged to be similar to each other, the similarity judging part 550 outputs 0 as the judgment result RES.

The scheduler 560 generates a gate line designation signal GL_Num designating a number of the gate line GL where the gate signal is transmitted based on the judgment result RES received from the similarity judging part 550. The gate line designation signal GL_Num is transmitted to the modulating part 510 for generating the modulated data enable tDE. The scheduler 560 transmits a register selection signal RSS for designating a register storing the image data R'G'B'W' transmitted from the row memory part 520 to the data driving unit 300. The data driving unit 300 stores the image data R'G'B'W' in the designated register based on the received register selection signal RSS.

Figure 5:
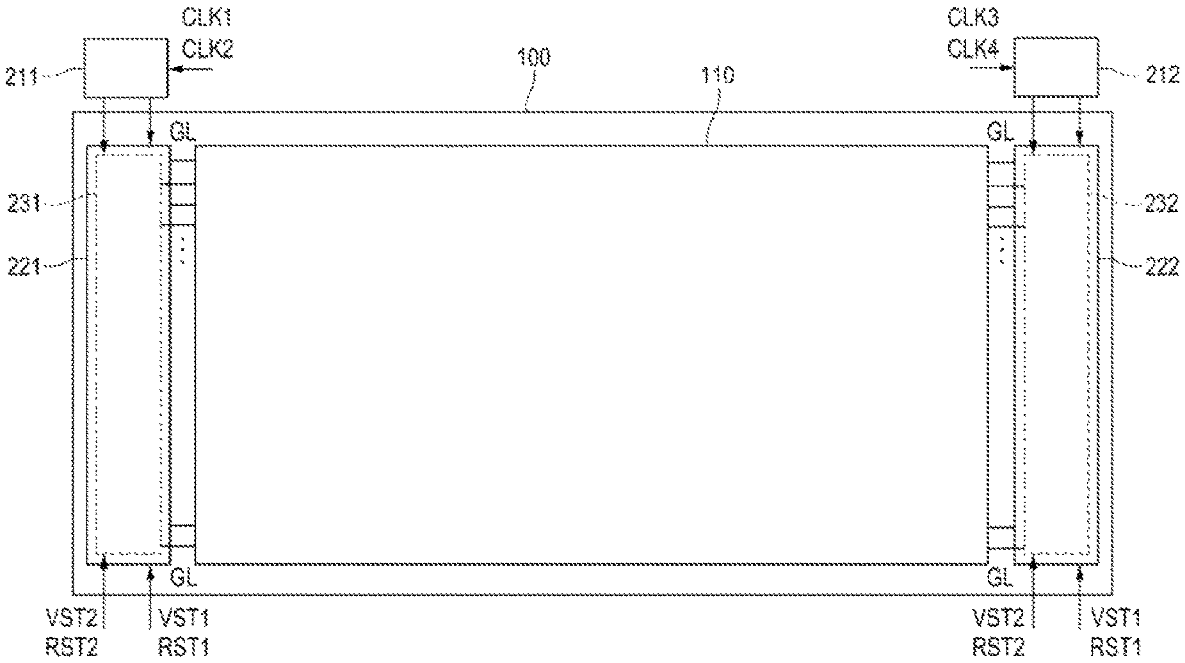
FIG. 5 is a view showing a gate driving unit of a display device according to a first aspect of the present disclosure.

FIG. 5 is a view showing a gate driving unit of a display device according to a first aspect of the present disclosure. The gate driving unit 200 includes a first level shifter 211, a second level shifter 212, a first shift register 221 and 222 and a second shift register 231 and 232.

The first level shifter 211 and the second level shifter 212 transition a transistor-transistor-logic (TTL) level of the clock CLK1 inputted from the timing controlling unit 500. For transitioning the transistor of the display panel 100 between the ON state and the OFF state, the first level shifter 211 and the second level shifter 212 generate a signal for conversion between a gate high voltage and a gate low voltage. The first level shifter 211 transmits the generated signal to the first shift register 221. The second level shifter 212 transmits the generated signal to the first shift register 222. The first level shifter 211 transitions a TTL level of the clock CLK2 inputted from the timing controlling unit 500. For transitioning the transistor of the display panel 100 between the ON state and the OFF state, the first level shifter 211 and the second level shifter 212 generate a signal for conversion between a gate high voltage and a gate low voltage. The first level shifter 211 transmits the generated signal to the second shift register 231. The second level shifter 212 transmits the generated signal to the second shift register 232.

Each first shift register 221 and 222 includes a plurality of stages. Each of the plurality of stages includes a Q node, a Qb node, a pull-up element and a pull-down element. The first shift register 221 and 222 is disposed in a non-display area outside a display area 110 of the display panel 100 in a gate-in-panel (GIP) type. For example, the first shift register 221 may be disposed in the non-display area adjacent to one short side portion (left short side portion) of the display area 110. The first shift register 222 may be disposed in the non-display area adjacent to the other short side portion (right short side portion) of the display area 110. The gate line GL from the first shift register 221 may be connected to the gate line GL from the first shift register 222.

The first shift register 221 supplies the gate signal to the gate line GL based on the signal received from the first level shifter 211. The first shift register 222 supplies the gate signal to the gate line GL based on the signal received from the second level shifter 212. The first shift register 221 and 222 receives the gate start signal VST1 from the timing controlling unit 500. The first shift register 221 and 222 sequentially generates a carry signal based on the received gate start signal VST1. The first shift register 221 and 222 supplies the generated carry signal as a gate start signal to one of the plurality of stages in the first shift register 221 and 222. The first shift register 221 and 222 receives a reset signal RST1 from the timing controlling unit 500 at a scan beginning of one frame or at a scan ending of one frame. Since the Q node is reset through the reset signal RST1, a voltage of the Q node and the Qb node of the first shift register 221 and 222 may be stably maintained.

Each second shift register 231 and 232 includes a plurality of stages. Each of the plurality of stages includes a Q node, a Qb node, a pull-up element and a pull-down element. The second shift register 231 and 232 is disposed in a non-display area outside a display area 110 of the display panel 100 in a gate-in-panel (GIP) type. For example, the second shift register 231 may be disposed in the non-display area adjacent to one short side portion (left short side portion) of the display area 110 to overlap with the first shift register 221. The second shift register 232 may be disposed in the non-display area adjacent to the other short side portion (right short side portion) of the display area 110 to overlap with the first shift register 222. Further, an area where the second shift register 231 and 232 is disposed may be the same as an area where the first shift register 221 and 222. The gate driving unit 200 according to a first aspect of the present disclosure may be formed such that a distance from the second shift register 231 and 232 to the display area 110 is the same as a distance from the first shift register 221 and 222 to the display area 110. The gate line GL from the second shift register 231 may be connected to the gate line GL from the second shift register 232.

The second shift register 231 supplies the gate signal to the gate line GL based on the signal received from the first level shifter 211. The second shift register 232 supplies the gate signal to the gate line GL based on the signal received from the second level shifter 212. The second shift register 231 and 232 receives the gate start signal VST2 from the timing controlling unit 500. A timing when the second shift register 231 and 232 receives the gate start signal VST2 is different from a timing when the first shift register 221 and 222 receives the gate start signal VST1. The second shift register 231 and 232 sequentially generates a carry signal based on the received gate start signal VST2. The second shift register 231 and 232 supplies the generated carry signal as a gate start signal to one of the plurality of stages in the second shift register 231 and 232. The second shift register 231 and 232 receives a reset signal RST2 from the timing controlling unit 500 at a scan beginning of one frame or at a scan ending of one frame. Since the Q node is reset through the reset signal RST2, a voltage of the Q node and the Qb node of the second shift register 231 and 232 may be stably maintained. A timing when the second shift register 231 and 232 receives the reset signal RST2 is different from a timing when the first shift register 221 and 222 receives the reset signal RST1. As a result, the second shift register 231 and 232 operates independently from the first shift register 221 and 222 in a circuit structure. A common gate start signal may be used as the gate start signal VST1 and the gate start signal VST2. When the common gate start signal is used, the stage of the shift register waits as an ON state after the common gate start signal is inputted till the initial clock is inputted. Accordingly, the gate start signal VST1 and the gate start signal VST2 may be used independently from each other in view of operation stability.

Figure 6:
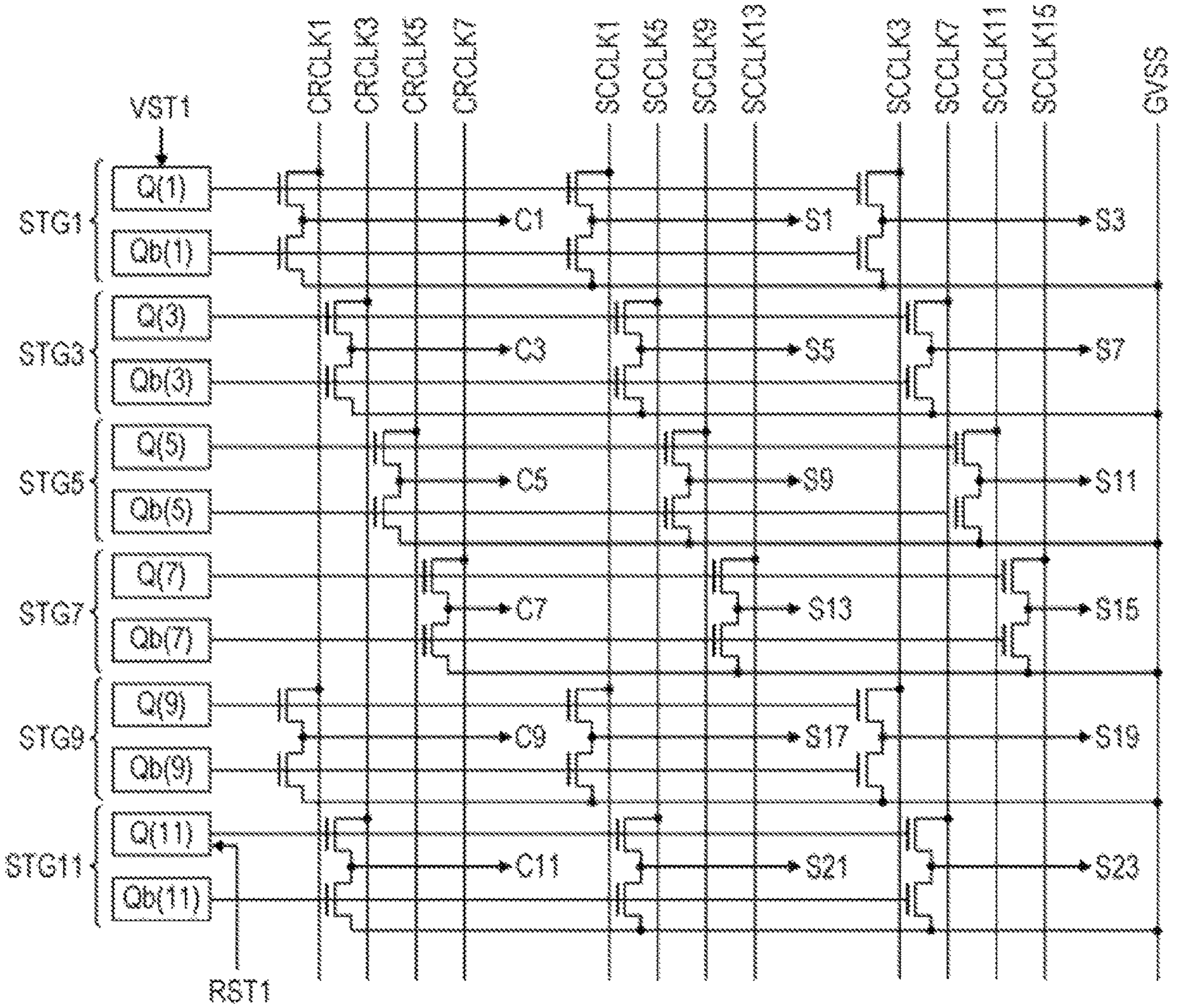
FIG. 6 is a circuit diagram showing a stage in a first shift register and a clock line of a display device according to a first aspect of the present disclosure.

FIG. 6 is a circuit diagram showing a stage in a first shift register and a clock line of a display device according to a first aspect of the present disclosure. In FIG. 6, the first shift register 221 and 222 includes the plurality of stages. Each of the plurality of stages includes the Q node, the Qb node, the pull-up element and the pull-down element.

The pull-up element of the first shift register 221 and 222 may include a transistor. A gate of the pull-up element is electrically connected to the Q node. A source or a drain of the pull-up element is electrically connected to an input terminal of the clock signal. The drain or the source of the pull-up element is electrically connected to a source or a drain of the pull-down element and an output terminal of the clock signal. The pull-up element transitions to an ON state due to a voltage of the Q node and outputs the clock signal as the scan signal (gate signal).

The pull-down element of the first shift register 221 and 222 may include a transistor. A gate of the pull-down element is electrically connected to the Qb node. A source or a drain of the pull-down element is electrically connected to the drain or the source of the pull-up element and the output terminal of the clock signal. The drain or the source of the pull-down element is electrically connected to a GIP low level voltage GVSS. The pull-down element transitions to an ON state due to a voltage of the Qb node and outputs a ground voltage as a low level of the scan signal.

In each stage, when the pull-up element has an ON state, the pull-down element has an OFF state. When an ON voltage for an ON state of the pull-up element is applied to the Q node, an OFF voltage for an OFF state of the pull-down element is applied to the Qb node. The above-mentioned state may be referred to as an ON state of the stage. In each stage, when the pull-down element has an ON state, the pull-up element has an OFF state. When an ON voltage for an ON state of the pull-down element is applied to the Qb node, an OFF voltage for an OFF state of the pull-up element is applied to the Q node. The above-mentioned state may be referred to as a HOLD state of the stage.

The first stage STG1 including the Q(1) node and the Qb(1) node of FIG. 6 will be illustrated hereinafter. The first shift register 221 and 222 receives the gate start signal VST1 designating an operation start of the gate driving unit from the Q(1) node. The first stage STG1 includes three pull-up elements. Gates of the three pull-up elements are commonly connected to the Q(1) node, and the three pull-up elements transition to an ON state due to a voltage of the Q(1) node. A source or a drain of the first pull-up element is connected to an input terminal of a carry shift clock CRCLK1, and the drain or the source of the first pull-up element is connected to an output terminal C1 of the scan signal. As a result, when the first pull-up element transitions to an ON state due to a voltage of the Q node, the carry shift clock CRCLK1 is outputted from the output terminal of the scan signal. The carry shift clock is a clock for generating a carry signal. A source or a drain of the second pull-up element is connected to an input terminal of a scan shift clock SCCLK1, and the drain or the source of the second pull-up element is connected to an output terminal S1 of the scan signal. As a result, when the second pull-up element transitions to an ON state due to a voltage of the Q node, the scan shift clock SCCLK1 is outputted from the output terminal of the scan signal. The scan shift clock SCCLK1 is a clock for generating the scan signal having a pulse. For example, the scan shift clock SCCLK1 is used for generating the gate signal transmitted through the gate line GL1. A source or a drain of the third pull-up element is connected to an input terminal of a scan shift clock SCCLK3, and the drain or the source of the third pull-up element is connected to an output terminal S3 of the scan signal. As a result, when the third pull-up element transitions to an ON state due to a voltage of the Q node, the scan shift clock SCCLK3 is outputted from the output terminal of the scan signal. For example, the scan shift clock SCCLK3 is used for generating the gate signal transmitted through the gate line GL3.

The first stage STG1 includes three pull-down elements. Gates of the three pull-down elements are commonly connected to the Qb(1) node, and the three pull-down elements transition to an ON state due to a voltage of the Qb(1) node. Drains or sources of the three pull-down elements are connected to the GIP low level voltage GVSS, and the sources or the drains of the three pull-down elements are connected to the output terminals C1, S1 and S3, respectively, of the scan signal. As a result, when the three pull-down elements transition to an ON state due to a voltage of the Qb node, the ground voltage is outputted from the output terminals C1, S1 and S3 as a low level of the scan signal.

The third stage STG3 including the Q(3) node and the Qb(3) node to the eleventh stage STG11 including the Q(11) node and the Qb(11) node of FIG. 6 may have the same structure as the first stage STG1. The reset signal RST1 may be applied to the Q(11) node of the eleventh stage STG11. In the first shift register 221 and 222, two stages may commonly have one Qb node. For example, the Qb(1) node of the first stage STG1 and the Qb(3) node of the third stage STG3 may be a first common Qb node (not shown), and the first stage STG1 and the third stage STG3 may commonly have the first common Qb node. Similarly, the Qb(5) node of the fifth stage STG5 and the Qb(7) node of the seventh stage STG7 may be a second common Qb node (not shown), and the fifth stage STG5 and the seventh stage STG7 may commonly have the second common Qb node. The Qb(9) node of the ninth stage STG9 and the Qb(11) node of the eleventh stage STG11 may be a third common Qb node (not shown), and the ninth stage STG9 and the eleventh stage STG11 may commonly have the third common Qb node. As a result, an area for the stages is reduced due to disposition of the Qb node, and a circuit area for the first shift register 221 and 222 in the non-display area is reduced. Accordingly, a bezel width of the display device 10 may be reduced or minimized. Since the first shift register 221 and 222 is independent from the second shift register 231 and 232, a stage in the first shift register 221 and 222 does not commonly have the Qb node with a stage in the second shift register 231 and 232.

Figure 7:
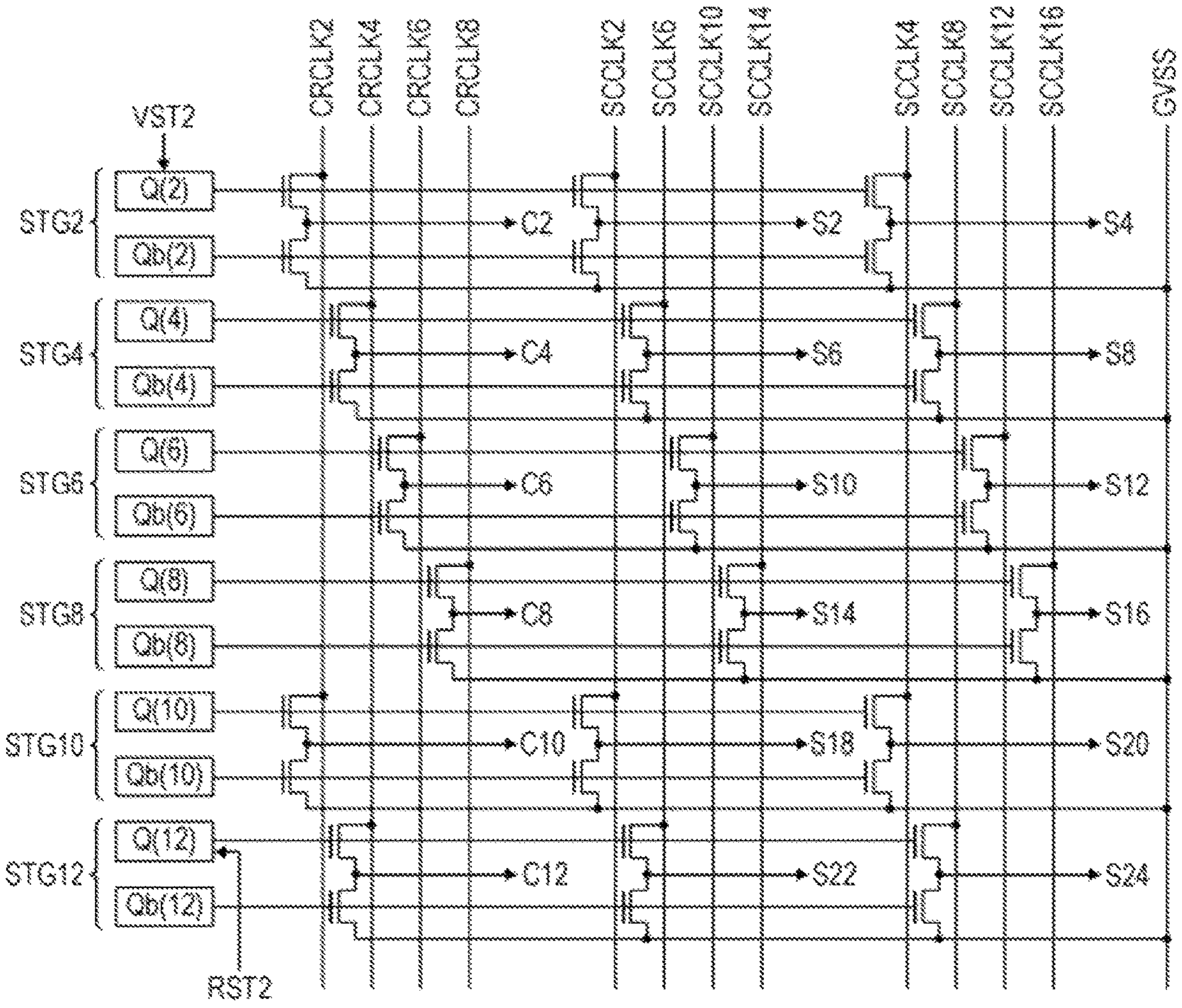
FIG. 7 is a circuit diagram showing a stage in a second shift register and a clock line of a display device according to a first aspect of the present disclosure.

FIG. 7 is a circuit diagram showing a stage in a second shift register and a clock line of a display device according to a first aspect of the present disclosure. In FIG. 7, the second shift register 231 and 232 includes the plurality of stages. Each of the plurality of stages includes the Q node, the Qb node, the pull-up element and the pull-down element.

The pull-up element of the second shift register 231 and 232 may include a transistor. A gate of the pull-up element is electrically connected to the Q node. A source or a drain of the pull-up element is electrically connected to an input terminal of the clock signal. The drain or the source of the pull-up element is electrically connected to a source or a drain of the pull-down element and an output terminal of the clock signal. The pull-up element transitions to an ON state due to a voltage of the Q node and outputs the clock signal as the scan signal.

The pull-down element of the second shift register 231 and 232 may include a transistor. A gate of the pull-down element is electrically connected to the Qb node. A source or a drain of the pull-down element is electrically connected to the drain or the source of the pull-up element and the output terminal of the clock signal. The drain or the source of the pull-down element is electrically connected to a GIP low level voltage GVSS. The pull-down element transitions to an ON state due to a voltage of the Qb node and outputs a ground voltage as a low level of the scan signal.

In each stage, when the pull-up element has an ON state, the pull-down element has an OFF state. When an ON voltage for an ON state of the pull-up element is applied to the Q node, an OFF voltage for an OFF state of the pull-down element is applied to the Qb node. In each stage, when the pull-down element has an ON state, the pull-up element has an OFF state. When an ON voltage for an ON state of the pull-down element is applied to the Qb node, an OFF voltage for an OFF state of the pull-up element is applied to the Q node.

The second stage STG2 including the Q(2) node and the Qb(2) node of FIG. 7 will be illustrated hereinafter. The second shift register 231 and 232 receives the gate start signal VST2 designating an operation start of the gate driving unit from the Q(2) node. The gate start signal VST2 is independent from the gate start signal VST1 applied to the first shift register 221 and 222. The second stage STG2 includes three pull-up elements. Gates of the three pull-up elements are commonly connected to the Q(2) node, and the three pull-up elements transition to an ON state due to a voltage of the Q(2) node. A source or a drain of the first pull-up element is connected to an input terminal of a carry shift clock CRCLK2, and the drain or the source of the first pull-up element is connected to an output terminal C2 of the scan signal. As a result, when the first pull-up element transitions to an ON state due to a voltage of the Q node, the carry shift clock CRCLK2 is outputted from the output terminal of the scan signal. A source or a drain of the second pull-up element is connected to an input terminal of a scan shift clock SCCLK2, and the drain or the source of the second pull-up element is connected to an output terminal S2 of the scan signal. As a result, when the second pull-up element transitions to an ON state due to a voltage of the Q node, the scan shift clock SCCLK2 is outputted from the output terminal of the scan signal. For example, the scan shift clock SCCLK2 is used for generating the gate signal transmitted through the gate line GL2. A source or a drain of the third pull-up element is connected to an input terminal of a scan shift clock SCCLK4, and the drain or the source of the third pull-up element is connected to an output terminal S4 of the scan signal. As a result, when the third pull-up element transitions to an ON state due to a voltage of the Q node, the scan shift clock SCCLK4 is outputted from the output terminal of the scan signal. For example, the scan shift clock SCCLK4 is used for generating the gate signal transmitted through the gate line GL4.

The second stage STG2 includes three pull-down elements. Gates of the three pull-down elements are commonly connected to the Qb(2) node, and the three pull-down elements transition to an ON state due to a voltage of the Qb(2) node. Drains or sources of the three pull-down elements are connected to the GIP low level voltage GVSS, and the sources or the drains of the three pull-down elements are connected to the output terminals C2, S2 and S2, respectively, of the scan signal. As a result, when the three pull-down elements transition to an ON state due to a voltage of the Qb node, the ground voltage is outputted from the output terminals C1, S1 and S3 as a low level of the scan signal.

The fourth stage STG4 including the Q(4) node and the Qb(4) node to the twelfth stage STG12 including the Q(12) node and the Qb(12) node of FIG. 7 may have the same structure as the second stage STG2. The reset signal RST2 may be applied to the Q(12) node of the twelfth stage STG12. The reset signal RST2 is independent from the reset signal RST1 applied to the first shift register 221 and 222. In the second shift register 231 and 232, two stages may commonly have one Qb node. For example, the Qb(2) node of the second stage STG2 and the Qb(4) node of the fourth stage STG4 may be a fourth common Qb node (not shown), and the second stage STG2 and the fourth stage STG4 may commonly have the fourth common Qb node. Similarly, the Qb(6) node of the sixth stage STG6 and the Qb(8) node of the eighth stage STG8 may be a fifth common Qb node (not shown), and the sixth stage STG6 and the eighth stage STG8 may commonly have the fifth common Qb node. The Qb(10) node of the tenth stage STG10 and the Qb(12) node of the twelfth stage STG12 may be a sixth common Qb node (not shown), and the tenth stage STG10 and the twelfth stage STG12 may commonly have the sixth common Qb node. As a result, an area for the stages is reduced due to disposition of the Qb node, and a circuit area for the second shift register 231 and 232 in the non-display area is reduced. Accordingly, a bezel width of the display device 10 may be reduced or minimized. Since the second shift register 231 and 232 is independent from the first shift register 221 and 222, a stage in the second shift register 231 and 232 does not commonly have the Qb node with a stage in the first shift register 221 and 222.

Figure 8:
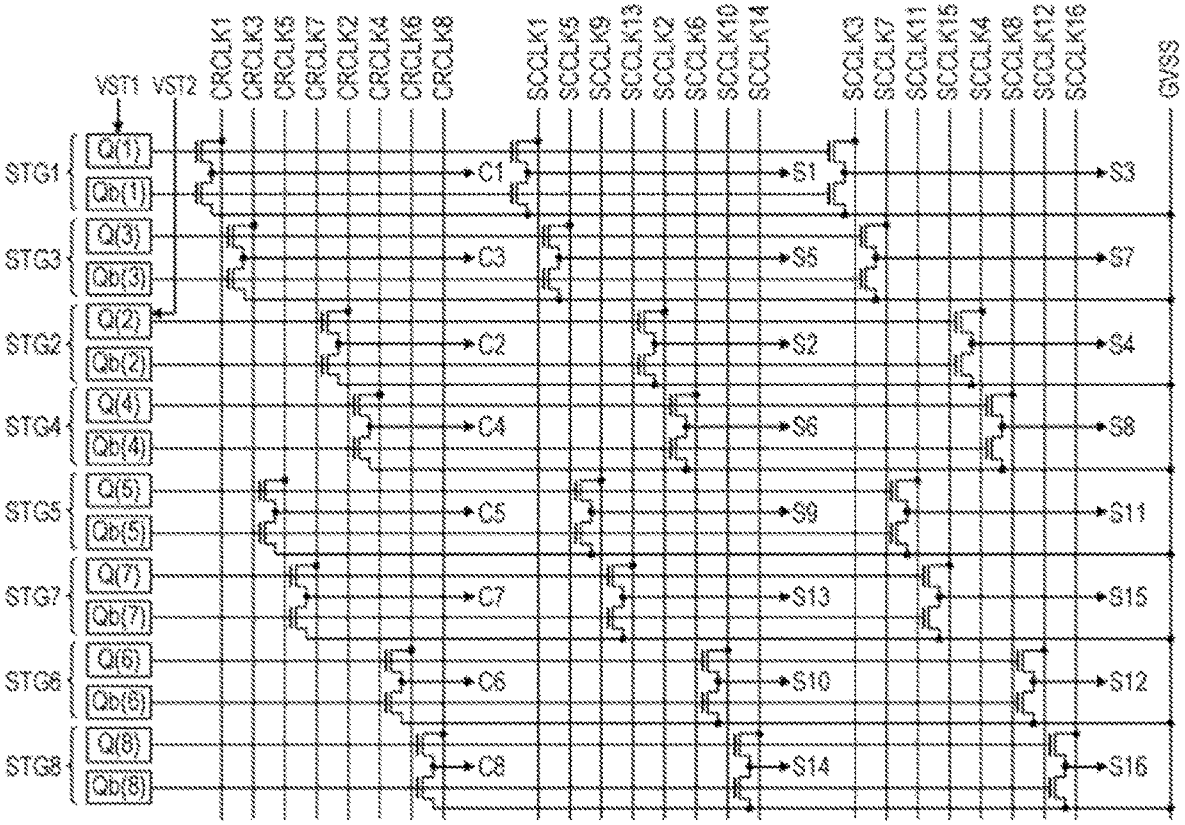
FIG. 8 is a circuit diagram showing a stage in a first shift register, a stage in a second shift register and a clock line of a display device according to a first aspect of the present disclosure.

FIG. 8 is a circuit diagram showing a stage in a first shift register, a stage in a second shift register and a clock line of a display device according to a first aspect of the present disclosure.

As shown in FIG. 5, the second shift register 231 and 232 may be disposed to overlap with the first shift register 221 and 222 in the non-display area of the display panel 100 in a plan view. The first shift register 221 and 222 and the second shift register 231 and 232 may be formed to have a GIP type. For example, the first shift register 221 and 222 is formed in the display panel 100 as a first GIP, and the second shift register 231 and 232 is formed in the display panel 100 as a second GIP. In FIG. 8, the first GIP and the second GIP are disposed in the same circuit area commonly having the same GIP low level voltage GVSS. The second stage STG2 of the second GIP is disposed as a next stage of the third stage STG3 of the first GIP. The fifth stage STG5 of the first GIP is disposed as a next stage of the fourth stage STG4 of the second GIP. The sixth stage STG6 of the second GIP is disposed as a next stage of the seventh stage STG7 of the first GIP. The first GIP and the second GIP are shift registers independent from each other. The first GIP and the second GIP do not commonly have the input clocks CRCLK and SCCLK. The first GIP receives the gate start signal VST1 and the reset signal RST1, and the second GIP receives the gate start signal VST2 and the reset signal RST2 independent from the gate start signal VST1 and the reset signal RST1. The carry signal inputted to and outputted from the stage of the first GIP is transmitted to the different stage of the first GIP, and the carry signal inputted to and outputted from the stage of the first GIP is not transmitted to the stage of the second GIP. The carry signal inputted to and outputted from the stage of the second GIP is transmitted to the different stage of the second GIP, and the carry signal inputted to and outputted from the stage of the second GIP is not transmitted to the stage of the first GIP. As a result, the first GIP is driven independently from the second GIP, and the second GIP is driven independently from the first GIP.

Figure 9:
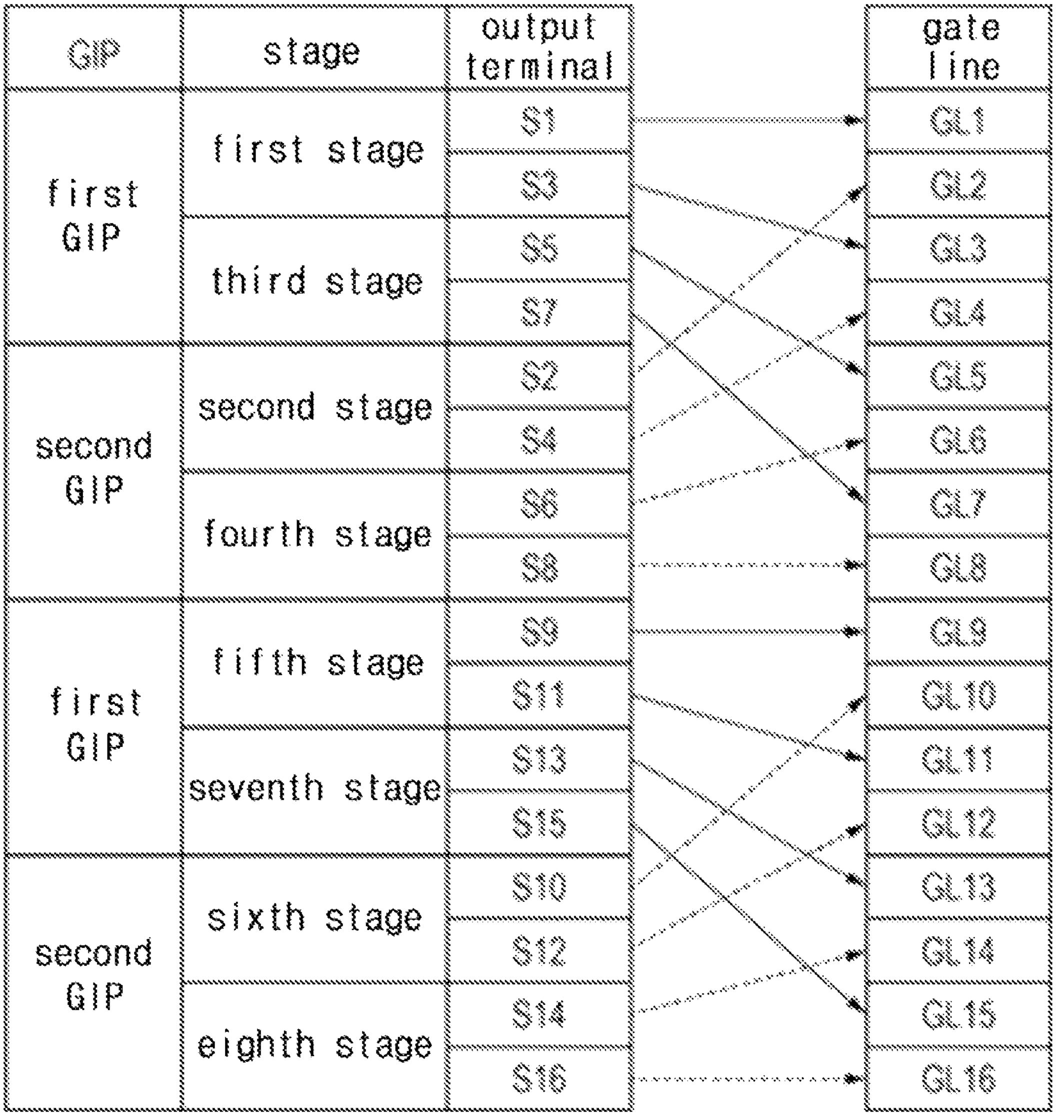
FIG. 9 is a view showing a corresponding relation between an output terminal of a first GIP and a second GIP and a gate line of a display device according to a first aspect of the present disclosure.

FIG. 9 is a view showing a corresponding relation between an output terminal of a first GIP and a second GIP and a gate line of a display device according to a first aspect of the present disclosure. In FIG. 9, the disposition of the output terminals S1 to S16 in the first GIP and the second GIP does not correspond to the disposition of the gate lines GL1 to GL16. An output line of the output terminal S3 of the first stage STG1 of the first GIP for the gate line GL3 crosses an output line of the output terminal S2 of the second stage STG2 of the second GIP for the gate line GL2. An output line of the output terminal S5 of the third stage STG3 of the first GIP for the gate line GL5 crosses an output line of the output terminal S4 of the second stage STG2 of the second GIP for the gate line GL2 and an output line of the output terminal S4 of the second stage STG2 of the second GIP for the gate line GL4. An output line of the output terminal S7 of the third stage STG3 of the first GIP for the gate line GL7 crosses an output line of the output terminal S2 of the second stage STG2 of the second GIP for the gate line GL2, an output line of the output terminal S4 of the second stage STG2 of the second GIP for the gate line GL4 and an output line of the output terminal S6 of the fourth stage STG4 of the second GIP for the gate line GL6. An output line of the output terminal S11 of the fifth stage STG5 of the first GIP for the gate line GL11 crosses an output line of the output terminal S10 of the sixth stage STG6 of the second GIP for the gate line GL10. An output line of the output terminal S13 of the seventh stage STG7 of the first GIP for the gate line GL13 crosses an output line of the output terminal S10 of the sixth stage STG6 of the second GIP for the gate line GL10 and an output line of the output terminal S12 of the sixth stage STG6 of the second GIP for the gate line GL12. An output line of the output terminal S15 of the seventh stage STG7 of the first GIP for the gate line GL15 crosses an output line of the output terminal S10 of the sixth stage STG6 of the second GIP for the gate line GL10, an output line of the output terminal S12 of the sixth stage STG6 of the second GIP for the gate line GL12 and an output line of the output terminal S14 of the eighth stage STG8 of the second GIP for the gate line GL14. As a result, a straight path connecting the output terminal of the gate signal supplied from the first GIP and the gate line corresponding to the output terminal may be disposed to cross a straight path connecting the output terminal of the gate signal supplied from the second GIP and the gate line corresponding to the output terminal. The output line of the output terminal S1 of the first stage STG1 of the first GIP and the output line of the output terminal S9 of the fifth stage STG5 of the first GIP do not cross the output line of the output terminal of the second GIP. The output line of the output terminal S8 of the fourth stage STG4 of the second GIP and the output line of the output terminal S16 of the eighth stage STG8 of the second GIP do not cross the output line of the output terminal of the first GIP.

FIG. 10 is a view showing an ON state and a HOLD state of a first GIP and a second GIP of a display device according to a first aspect of the present disclosure. In FIG. 10, each stage in the first GIP and the second GIP has an ON state or a HOLD state according to a voltage applied to the pull-up element and the pull-down element. The scan signal is not outputted from the stage having a HOLD state, and the scan signal may be outputted from the stage having an ON state. For the purpose that two or more scan signals or two or more carry signals are not transmitted from the output terminal for the same clock, the number of the stages having an ON state is required to be limited. For example, when the number of clocks inputted to the GIP is x, the number of the stages having an ON state may be determined to be smaller than 2x (x is a positive integer). The first GIP sequentially transitions the stage having a HOLD state to the stage having an ON state through the carry signal. The first GIP sequentially transitions the stage having an ON state to the stage having a HOLD state through the carry signal. Similarly, the second GIP sequentially transitions the stage having a HOLD state to the stage having an ON state through the carry signal. The second GIP sequentially transitions the stage having an ON state to the stage having a HOLD state through the carry signal. The carry signal used in the first GIP is not transmitted to the second GIP. As a result, the transition between an ON state and a HOLD state of the first GIP is independent from the operation of the second GIP. Similarly, the carry signal used in the second GIP is not transmitted to the first GIP. As a result, the transition between an ON state and a HOLD state of the second GIP is independent from the operation of the first GIP.

FIG. 10 shows an exemplary transition between an ON state and a HOLD state of each stage in the first GIP and the second GIP. The scan signal (gate signal) of the first GIP is transmitted to odd gate lines GL1, GL3, . . . , GL31. For example, according to the arrangement of the subpixels in FIG. 3, the first GIP supplies the gate voltage to the first switching element T1 of the red subpixel R and the first switching element T1 of the white subpixel W through the odd gate lines. The scan signal (gate signal) of the second GIP is transmitted to even gate lines GL2, GL4, . . . , GL32. For example, according to the arrangement of the subpixels in FIG. 3, the second GIP supplies the gate voltage to the first switching element T1 of the green subpixel G and the first switching element T1 of the blue subpixel B through the even gate lines. The gate line connected to the first GIP is not limited to the odd gate lines, and the gate line connected to the second GIP is not limited to the even gate lines. According to a circuit design of the gate driving unit, the first GIP and the second GIP may be connected to one of the odd gate line and the even gate line.

In FIG. 10, after the scan signals are consecutively transmitted through the odd gate lines, the scan signals are consecutively transmitted through the even gate lines. For example, according to the arrangement of the subpixels in FIG. 3, the first GIP consecutively supplies the scan signals to the red subpixel R and the white subpixel W of predetermined rows of the display panel 100 through the odd gate lines. Next, the second GIP consecutively supplies the scan signals to the green subpixel G and the blue subpixel B of predetermined rows of the display panel 100 through the even gate lines.

At a clock (1), the first stage, the third stage, the fifth stage and the seventh stage of the first GIP and the second stage, the fourth stage, the sixth stage and the eighth stage of the second GIP have an ON state. The first GIP has a state where the first GIP can supply the gate signal through a group of the gate lines GL1, GL3, GL5, GL7, GL9, GL11, GL13 and GL15 corresponding to the stages having an ON state. The second GIP has a state where the second GIP can supply the gate signal through a group of the gate lines GL2, GL4, GL6, GL8, GL10, GL12, GL14 and GL16 corresponding to the stages having an ON state. The ninth stage, the eleventh stage, the thirteenth stage and the fifteenth stage of the first GIP and the tenth stage, the twelfth stage, the fourteenth stage and the sixteenth stage of the second GIP have a HOLD state. At the clock (1), for example, the first GIP transmits the scan signal from the third stage to the gate line GL5. As a result, the scan signal is supplied to the red subpixel R and the white subpixel W electrically connected to the gate line GL5. The other stages except the third stage do not transmit the scan signal to the gate line GL. The first GIP may transmit the scan signal from the third stage to the gate line GL7 at a timing between the clock (1) and the clock (2).

At a clock (2), the first stage of the first GIP transitions from an ON state to a HOLD state, and the ninth stage of the first GIP transitions from a HOLD state to an ON state. The other stages of the first GIP except the first stage and the ninth stage are maintained to have the same state as the state at the clock (1). The first GIP has a state where the first GIP can supply the gate signal through a group of the gate lines GL5, GL7, GL9, GL11, GL13, GL15, GL17 and GL19 corresponding to the stages having an ON state. All of the stages of the second GIP are maintained to have the same state as the state at the clock (1). The second GIP has a state where the second GIP can supply the gate signal through a group of the gate lines GL2, GL4, GL6, GL8, GL10, GL12, GL14 and GL16 corresponding to the stages having an ON state. At the clock (2), the first GIP transmits the scan signal from the fifth stage to the gate line GL9. As a result, the scan signal is supplied to the red subpixel R and the white subpixel W electrically connected to the gate line GL9. The other stages except the fifth stage do not transmit the scan signal to the gate line GL. The first GIP may transmit the scan signal from the fifth stage to the gate line GL11 at a timing between the clock (2) and the clock (3).

At a clock (3), the third stage of the first GIP transitions from an ON state to a HOLD state, and the eleventh stage of the first GIP transitions from a HOLD state to an ON state. The other stages of the first GIP except the third stage and the eleventh stage and all of the stages of the second GIP are maintained to have the same state as the state at the clock (2). At the clock (3), the first GIP transmits the scan signal from the seventh stage to the gate line GL13. As a result, the scan signal is supplied to the red subpixel R and the white subpixel W electrically connected to the gate line GL13. The other stages except the seventh stage do not transmit the scan signal to the gate line GL. The first GIP may transmit the scan signal from the seventh stage to the gate line GL15 at a timing between the clock (3) and the clock (4).

At a clock (4), the fifth stage of the first GIP transitions from an ON state to a HOLD state, and the thirteenth stage of the first GIP transitions from a HOLD state to an ON state. The other stages of the first GIP except the fifth stage and the thirteenth stage and all of the stages of the second GIP are maintained to have the same state as the state at the clock (3). At the clock (4), the first GIP transmits the scan signal from the ninth stage to the gate line GL17. As a result, the scan signal is supplied to the red subpixel R and the white subpixel W electrically connected to the gate line GL17. The other stages except the ninth stage do not transmit the scan signal to the gate line GL. The first GIP may transmit the scan signal from the ninth stage to the gate line GL19 at a timing between the clock (4) and the clock (5).

At a clock (5), the seventh stage of the first GIP transitions from an ON state to a HOLD state, and the fifteenth stage of the first GIP transitions from a HOLD state to an ON state. The other stages of the first GIP except the seventh stage and the fifteenth stage and all of the stages of the second GIP are maintained to have the same state as the state at the clock (4). At the clock (5), the first GIP transmits the scan signal from the eleventh stage to the gate line GL21. As a result, the scan signal is supplied to the red subpixel R and the white subpixel W electrically connected to the gate line GL21. The other stages except the eleventh stage do not transmit the scan signal to the gate line GL. The first GIP may transmit the scan signal from the eleventh stage to the gate line GL23 at a timing between the clock (5) and the clock (6).

At a clock (6), the second stage of the second GIP transitions from an ON state to a HOLD state, and the tenth stage of the second GIP transitions from a HOLD state to an ON state. The other stages of the second GIP except the second stage and the tenth stage and all of the stages of the first GIP are maintained to have the same state as the state at the clock (5). At the clock (6), the second GIP transmits the scan signal from the fourth stage to the gate line GL6. As a result, the scan signal is supplied to the green subpixel G and the blue subpixel B electrically connected to the gate line GL6. The other stages except the fourth stage do not transmit the scan signal to the gate line GL. The second GIP may transmit the scan signal from the fourth stage to the gate line GL8 at a timing between the clock (6) and the clock (7).

At a clock (7), the fourth stage of the second GIP transitions from an ON state to a HOLD state, and the twelfth stage of the second GIP transitions from a HOLD state to an ON state. The other stages of the second GIP except the fourth stage and the twelfth stage and all of the stages of the first GIP are maintained to have the same state as the state at the clock (6). At the clock (7), the second GIP transmits the scan signal from the sixth stage to the gate line GL10. As a result, the scan signal is supplied to the green subpixel G and the blue subpixel B electrically connected to the gate line GL10. The other stages except the sixth stage do not transmit the scan signal to the gate line GL. The second GIP may transmit the scan signal from the sixth stage to the gate line GL12 at a timing between the clock (7) and the clock (8).

At a clock (8), the sixth stage of the second GIP transitions from an ON state to a HOLD state, and the fourteenth stage of the second GIP transitions from a HOLD state to an ON state. The other stages of the second GIP except the sixth stage and the fourteenth stage and all of the stages of the first GIP are maintained to have the same state as the state at the clock (7). At the clock (8), the second GIP transmits the scan signal from the eighth stage to the gate line GL14. As a result, the scan signal is supplied to the green subpixel G and the blue subpixel B electrically connected to the gate line GL14. The other stages except the eighth stage do not transmit the scan signal to the gate line GL. The second GIP may transmit the scan signal from the eighth stage to the gate line GL16 at a timing between the clock (8) and the clock (9).

At a clock (9), the eighth stage of the second GIP transitions from an ON state to a HOLD state, and the sixteenth stage of the second GIP transitions from a HOLD state to an ON state. The other stages of the second GIP except the eighth stage and the sixteenth stage and all of the stages of the first GIP are maintained to have the same state as the state at the clock (8). At the clock (9), the second GIP transmits the scan signal from the tenth stage to the gate line GL18. As a result, the scan signal is supplied to the green subpixel G and the blue subpixel B electrically connected to the gate line GL18. The other stages except the tenth stage do not transmit the scan signal to the gate line GL. The second GIP may transmit the scan signal from the tenth stage to the gate line GL20 at a timing next to the clock (9).

FIG. 11 is a view showing an ON state and a HOLD state of a first GIP and a second GIP of a display device according to a second aspect of the present disclosure. Illustration on a part the same as the first aspect may be omitted.

In FIG. 11, after the scan signals are consecutively transmitted through the even gate lines, the scan signals are consecutively transmitted through the odd gate lines. For example, according to the arrangement of the subpixels in FIG. 3, the second GIP consecutively supplies the scan signals to the green subpixel G and the blue subpixel B of predetermined rows of the display panel 100 through the even gate lines. Next, the first GIP consecutively supplies the scan signals to the red subpixel R and the white subpixel W of predetermined rows of the display panel 100 through the odd gate lines.

At a clock (1), the first stage, the third stage, the fifth stage and the seventh stage of the first GIP and the second stage, the fourth stage, the sixth stage and the eighth stage of the second GIP have an ON state. The ninth stage, the eleventh stage, the thirteenth stage and the fifteenth stage of the first GIP and the tenth stage, the twelfth stage, the fourteenth stage and the sixteenth stage of the second GIP have a HOLD state. At the clock (1), for example, the second GIP transmits the scan signal from the fourth stage to the gate line GL6. As a result, the scan signal is supplied to the green subpixel G and the blue subpixel B electrically connected to the gate line GL6. The other stages except the fourth stage do not transmit the scan signal to the gate line GL. The second GIP may transmit the scan signal from the fourth stage to the gate line GL8 at a timing between the clock (1) and the clock (2).

At a clock (2), the second stage of the second GIP transitions from an ON state to a HOLD state, and the tenth stage of the second GIP transitions from a HOLD state to an ON state. The other stages of the second GIP except the second stage and the tenth stage and all of the stages of the first GIP are maintained to have the same state as the state at the clock (1). At the clock (2), the second GIP transmits the scan signal from the sixth stage to the gate line GL10. As a result, the scan signal is supplied to the green subpixel G and the blue subpixel B electrically connected to the gate line GL10. The other stages except the sixth stage do not transmit the scan signal to the gate line GL. The second GIP may transmit the scan signal from the sixth stage to the gate line GL12 at a timing between the clock (2) and the clock (3).

At a clock (3), the fourth stage of the second GIP transitions from an ON state to a HOLD state, and the twelfth stage of the second GIP transitions from a HOLD state to an ON state. The other stages of the second GIP except the fourth stage and the twelfth stage and all of the stages of the first GIP are maintained to have the same state as the state at the clock (2). At the clock (3), the second GIP transmits the scan signal from the eighth stage to the gate line GL14. As a result, the scan signal is supplied to the green subpixel G and the blue subpixel B electrically connected to the gate line GL14. The other stages except the eighth stage do not transmit the scan signal to the gate line GL. The second GIP may transmit the scan signal from the eighth stage to the gate line GL16 at a timing between the clock (3) and the clock (4).

At a clock (4), the sixth stage of the second GIP transitions from an ON state to a HOLD state, and the fourteenth stage of the second GIP transitions from a HOLD state to an ON state. The other stages of the second GIP except the sixth stage and the fourteenth stage and all of the stages of the first GIP are maintained to have the same state as the state at the clock (3). At the clock (4), the second GIP transmits the scan signal from the tenth stage to the gate line GL18. As a result, the scan signal is supplied to the green subpixel G and the blue subpixel B electrically connected to the gate line GL18. The other stages except the tenth stage do not transmit the scan signal to the gate line GL. The second GIP may transmit the scan signal from the tenth stage to the gate line GL20 at a timing between the clock (4) and the clock (5).

At a clock (5), the eighth stage of the second GIP transitions from an ON state to a HOLD state, and the sixteenth stage of the second GIP transitions from a HOLD state to an ON state. The other stages of the second GIP except the eighth stage and the sixteenth stage and all of the stages of the first GIP are maintained to have the same state as the state at the clock (4). At the clock (5), the second GIP transmits the scan signal from the twelfth stage to the gate line GL22. As a result, the scan signal is supplied to the green subpixel G and the blue subpixel B electrically connected to the gate line GL22. The other stages except the twelfth stage do not transmit the scan signal to the gate line GL. The second GIP may transmit the scan signal from the twelfth stage to the gate line GL24 at a timing between the clock (5) and the clock (6).

At a clock (6), the first stage of the first GIP transitions from an ON state to a HOLD state, and the ninth stage of the first GIP transitions from a HOLD state to an ON state. The other stages of the first GIP except the first stage and the ninth stage and all of the stages of the second GIP are maintained to have the same state as the state at the clock (5). At the clock (6), the first GIP transmits the scan signal from the third stage to the gate line GL5. As a result, the scan signal is supplied to the red subpixel R and the white subpixel W electrically connected to the gate line GL5. The other stages except the third stage do not transmit the scan signal to the gate line GL. The first GIP may transmit the scan signal from the third stage to the gate line GL7 at a timing between the clock (6) and the clock (7).

At a clock (7), the third stage of the first GIP transitions from an ON state to a HOLD state, and the eleventh stage of the first GIP transitions from a HOLD state to an ON state. The other stages of the first GIP except the third stage and the eleventh stage and all of the stages of the second GIP are maintained to have the same state as the state at the clock (6). At the clock (7), the first GIP transmits the scan signal from the fifth stage to the gate line GL9. As a result, the scan signal is supplied to the red subpixel R and the white subpixel W electrically connected to the gate line GL9. The other stages except the fifth stage do not transmit the scan signal to the gate line GL. The first GIP may transmit the scan signal from the fifth stage to the gate line GL11 at a timing between the clock (7) and the clock (8).

At a clock (8), the fifth stage of the first GIP transitions from an ON state to a HOLD state, and the thirteenth stage of the first GIP transitions from a HOLD state to an ON state. The other stages of the first GIP except the fifth stage and the thirteenth stage and all of the stages of the second GIP are maintained to have the same state as the state at the clock (7). At the clock (8), the first GIP transmits the scan signal from the seventh stage to the gate line GL13. As a result, the scan signal is supplied to the red subpixel R and the white subpixel W electrically connected to the gate line GL13. The other stages except the seventh stage do not transmit the scan signal to the gate line GL. The first GIP may transmit the scan signal from the seventh stage to the gate line GL15 at a timing between the clock (8) and the clock (9).

At a clock (9), the seventh stage of the first GIP transitions from an ON state to a HOLD state, and the fifteenth stage of the first GIP transitions from a HOLD state to an ON state. The other stages of the first GIP except the seventh stage and the fifteenth stage and all of the stages of the second GIP are maintained to have the same state as the state at the clock (8). At the clock (9), the first GIP transmits the scan signal from the ninth stage to the gate line GL17. As a result, the scan signal is supplied to the red subpixel R and the white subpixel W electrically connected to the gate line GL17. The other stages except the ninth stage do not transmit the scan signal to the gate line GL. The first GIP may transmit the scan signal from the ninth stage to the gate line GL19 at a timing next to the clock (9).

The gate driving unit according to a first aspect of the present disclosure includes the first shift register 221 and 222 functioning as the first GIP and the second shift register 231 and 232 functioning as the second GIP. The first GIP is connected to the odd gate line, and the second GIP is connected to the even gate line. During a period where the first GIP transmits the scan signal as a gate signal of the odd gate line, the stages of the first GIP may transition between an ON state and a HOLD state. During the period where the first GIP transmits the scan signal as a gate signal of the odd gate line, a stage of the first GIP transitions from an ON state to a HOLD state and another stage of the first GIP simultaneously transitions from a HOLD state to an ON state. During the period where the first GIP transmits the scan signal as a gate signal of the odd gate line, states of all of the stages of the second GIP are not changed. Similarly, during a period where the second GIP transmits the scan signal as a gate signal of the even gate line, the stages of the second GIP may transition between an ON state and a HOLD state. During the period where the second GIP transmits the scan signal as a gate signal of the even gate line, a stage of the second GIP transitions from an ON state to a HOLD state and another stage of the second GIP simultaneously transitions from a HOLD state to an ON state. During the period where the second GIP transmits the scan signal as a gate signal of the even gate line, states of all of the stages of the first GIP are not changed. As a result, the first GIP is driven independently from the second GIP, and the second GIP is driven independently from the first GIP. The gate driving unit 200 according to a first aspect of the present disclosure may consecutively transmit the scan signal to the odd gate line of predetermined rows by driving the first GIP and the second GIP independently. The gate driving unit 200 may consecutively supply the gate signal to the first switching element T1 of the subpixels emitting the same color of predetermined rows. In the gate driving unit 200 according to a first aspect of the present disclosure, it is not required to increase the number of stages having an ON state for consecutively supplying the gate signal to the subpixels emitting the same color of predetermined rows. As a result, it is not required to increase the number of clocks for increasing the number of stages having an ON state. Accordingly, the display device 10 according to a first aspect of the present disclosure may consecutively perform a writing to the subpixels emitting the same color of predetermined row without increase of power consumption.

Figure 12:
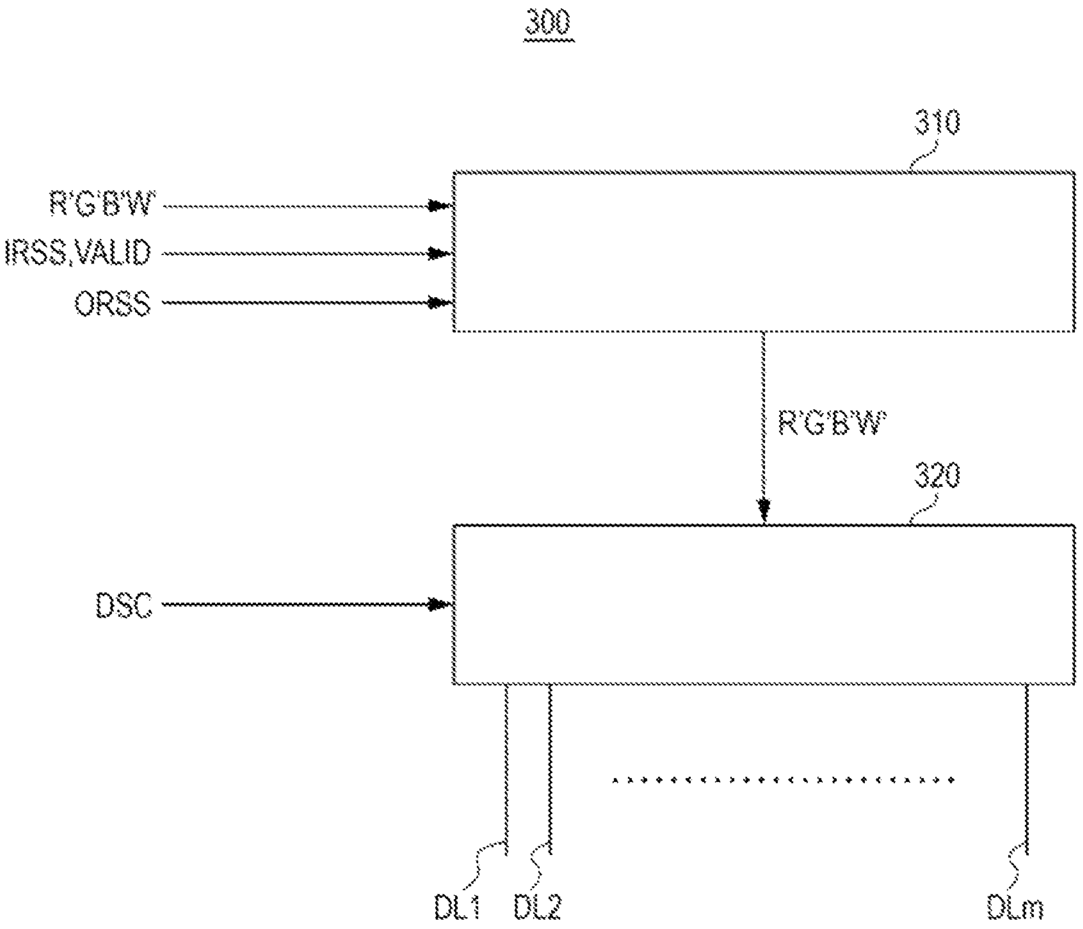
FIG. 12 is a view showing a data driving unit of a display device according to a first aspect of the present disclosure.

FIG. 12 is a view showing a data driving unit of a display device according to a first aspect of the present disclosure. In FIG. 12, the data driving unit 300 includes a data selecting part 310 and a data converting part 320. The data selecting part 310 receives the image data R'G'B'W' from the row memory part 520 and receives the register selection signal RSS from the scheduler 560. The register selection signal RSS includes an input register selection signal IRSS, an input validation signal VALID and an output register selection signal ORSS. The input register selection signal TRSS designates a register that can store the image data R'G'B'W'. The output register selection signal ORSS designates a register storing the image data R'G'B'W' for output. The input validation signal VALID validates or invalidates the input register selection signal IRSS. The data selecting part 310 has a plurality of registers and stores the image data R'G'B'W' received from the row memory part 520 according to the register selection signal IRSS and the input validation signal VALID received from the scheduler 560. When the input validation signal VALID has a high level, the data selecting part 310 validates the input register selection signal IRSS and stores the image data R'G'B'W' in the register designated according to the input register selection signal IRSS. The data selecting part 310 transmits the image data R'G'B'W' in the register designated according to the output register selection signal ORSS to the data converting part 320. The data converting part 320 converts the image data R'G'B'W' into the analog data voltage DATA using the data control signal DCS and transmits the data voltage DATA to each subpixel through the data line DL1 to DLm.

Figure 13:
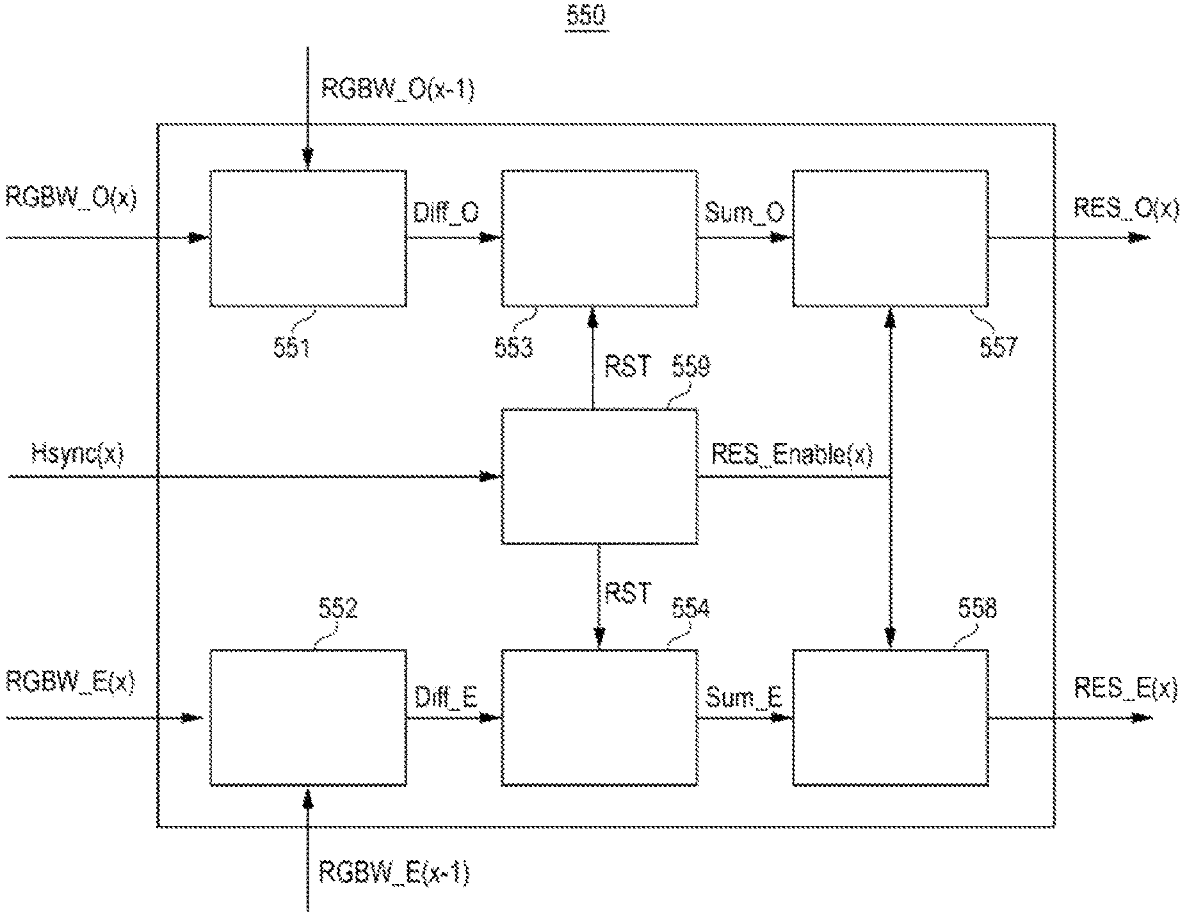
FIG. 13 is a view showing a similarity judging part of a display device according to a first aspect of the present disclosure.

FIG. 13 is a view showing a similarity judging part of a display device according to a first aspect of the present disclosure. The similarity judging part 550 includes a first difference calculating part 551, a second difference calculating part 552, a first integrating part 553, a second integrating part 554, a first threshold judging part 557, a second threshold judging part 558 and a reset judging part 559.

The first difference calculating part 551 receives the image data RGBW_O(x) of an xth row of the subpixels P of an odd column from the row memory part 520. For example, the received image data RGBW_O(x) is an RGBW value of the image data written in the green subpixel G and the white subpixel W of the xth row. The first difference calculating part 551 receives the image data RGBW_O(x−1) of an (x−1)th row of the subpixels P of an odd column from the row memory part 520. The received image data RGBW_O(x−1) is previous to the image data RGBW_O(x) by one row. For example, the received image data RGBW_O(x−1) is an RGBW value of the image data written in the green subpixel G and the white subpixel W of the (x−1)th row. The first difference calculating part 551 calculates a difference Diff_O between the image data RGBW_O(x) of the xth row and the image data RGBW_O(x−1) of the (x−1)th row and transmits the difference Diff_O of a calculation result to the first integrating part 553.

The first integrating part 553 receives the difference Diff_O between the RGBW value of the xth row and the RGBW value of the (x−1)th row in each odd column from the first difference calculating part 551. The first integrating part 553 integrates the differences Diff_O of the image data of each odd column received from the first difference calculating part 551. For example, when the number of the subpixel columns of the odd columns in the display panel 100 is m, the first integrating part 553 receives the difference values of (m−1) corresponding to the number of the odd columns for the difference Diff_O between the RGBW value of the xth row and the RGBW value of the (x−1)th row from the first difference calculating part 551. The first integrating part 553 integrates the differences Diff_O of (m−1) between columns received from the first difference calculating part 551. The first integrating part 553 transmits an integration value Sum_O of the differences Diff_O to the first threshold judging part 557. When the number of the differences Diff_O of the image data of the odd column is 1, the first integrating part 553 may be omitted.

The first threshold judging part 557 receives the integration value Sum_O of the differences Diff_O between the RGBW value of the xth row and the RGBW value of the (x−1)th row in the odd column from the first integrating part 553. The first threshold judging part 557 compares the received integration value Sum_O with a predetermined threshold value. When the received integration value Sum_O is smaller than the threshold value, the first threshold judging part 557 judges that the image data of xth row of the odd column is similar to the image data of (x−1)th row of the odd column. When the received integration value Sum_O is equal to or greater than the threshold value, the first threshold judging part 557 judges that the image data of xth row of the odd column is not similar to the image data of (x−1)th row of the odd column. The first threshold judging part 557 transmits the judgement result signal RES_O(x) to the scheduler 560. For example, when the image data of the xth row of the odd column is judged to be similar to the image data of the (x−1)th row of the odd column, the first threshold judging part 557 outputs 1 as the judgement result signal RES_O(x). When the image data of the xth row of the odd column is judged to be not similar to the image data of the (x−1)th row of the odd column, the first threshold judging part 557 outputs 0 as the judgement result signal RES_O(x).

The second difference calculating part 552 receives the image data RGBW_E(x) of an xth row of the subpixels P of an even column from the row memory part 520. For example, the received image data RGBW_E(x) is an RGBW value of the image data written in the red subpixel R and the blue subpixel B of the xth row. The second difference calculating part 552 receives the image data RGBW_E(x−1) of an (x−1)th row of the subpixels P of an even column from the row memory part 520. The received image data RGBW_E(x−1) is previous to the image data RGBW_E(x) by one row. For example, the received image data RGBW_E (x−1) is an RGBW value of the image data written in the red subpixel R and the blue subpixel B of the (x−1)th row. The second difference calculating part 552 calculates a difference Diff_E between the image data RGBW_E(x) of the xth row and the image data RGBW_E(x−1) of the (x−1)th row and transmits the difference Diff_E of a calculation result to the second integrating part 554.

The second integrating part 554 receives the difference Diff_E between the RGBW value of the xth row and the RGBW value of the (x−1)th row in each even column from the second difference calculating part 552. The second integrating part 554 integrates the differences Diff_E of the image data of each even column received from the second difference calculating part 552. For example, when the number of the subpixel columns of the even columns in the display panel 100 is m, the second integrating part 554 receives the difference values of (m−1) corresponding to the number of the even columns for the difference Diff_E between the RGBW value of the xth row and the RGBW value of the (x−1)th row from the second difference calculating part 552. The second integrating part 554 integrates the differences Diff_E of (m−1) between columns received from the second difference calculating part 552. The second integrating part 554 transmits an integration value Sum_E of the differences Diff_E to the second threshold judging part 558. When the number of the differences Diff_E of the image data of the even column is 1, the second integrating part 554 may be omitted.

The second threshold judging part 558 receives the integration value Sum_E of the differences Diff_E between the RGBW value of the xth row and the RGBW value of the (x−1)th row in the even column from the second integrating part 554. The second threshold judging part 558 compares the received integration value Sum_E with a predetermined threshold value. When the received integration value Sum_E is smaller than the threshold value, the second threshold judging part 558 judges that the image data of xth row of the even column is similar to the image data of (x−1)th row of the even column. When the received integration value Sum_E is equal to or greater than the threshold value, the second threshold judging part 558 judges that the image data of xth row of the even column is not similar to the image data of (x−1)th row of the even column. The second threshold judging part 558 transmits the judgement result signal RES_E(x) to the scheduler 560. For example, when the image data of the xth row of the even column is judged to be similar to the image data of the (x−1)th row of the even column, the second threshold judging part 558 outputs 1 as the judgement result signal RES_E(x). When the image data of the xth row of the odd column is judged to be not similar to the image data of the (x−1)th row of the even column, the second threshold judging part 558 outputs 0 as the judgement result signal RES_E(x).

The reset judging part 559 generates the reset signal RST based on the horizontal synchronization signal Hsync. The reset judging part 559 transmits the reset signal RST to the first integrating part 553 and the second integrating part 554 at a timing where the horizontal synchronization signal Hsync transitions from a high level to a low level. The first integrating part 553 and the second integrating part 554 resets the integration value of the differences of the image data to be 0 according to the received reset signal RST. The reset judging part 559 transmits a result enable signal RES_Enable to the first threshold judging part 557 and the second threshold judging part 558 at a timing where the horizontal synchronization signal Hsync transitions from a high level to a low level. The first threshold judging part 557 and the second threshold judging part 558 transmit the judgement result signal RES_O(x) and RES_E(x) to the scheduler 560 according to the received result enable signal RES_Enable.

Figure 14:
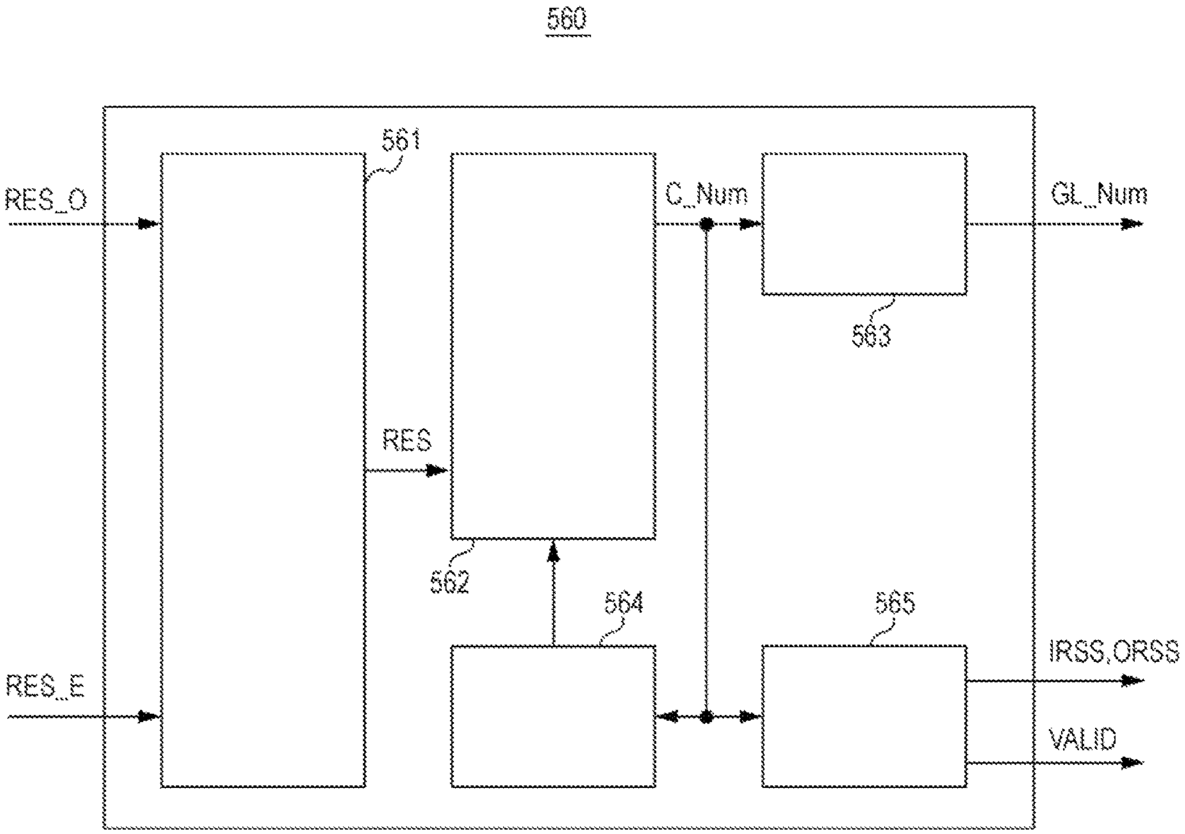
FIG. 14 is a view showing a scheduler of a display device according to a first aspect of the present disclosure.

FIG. 14 is a view showing a scheduler of a display device according to a first aspect of the present disclosure. The scheduler 560 includes a buffer 561, a scan order determining part 562, a gate line determining part 563, a register 564 and a selection signal determining part 565.

The buffer 561 receives the judgement result signals RES_O(x) and RES_E(x) from the similarity judging part 550. The buffer 561 transmits the received judgement result signals RES_O(x) and RES_E(x) to the scan order determining part 562. For example, the buffer 561 stores the judgement result signals RES_O(x) and RES_E(x) of the predetermined rows and transmits the judgement result signals RES_O(x) and RES_E(x) of the corresponding rows to the scan order determining part 562.

The scan order determining part 562 receives the judgement result signal RES of the predetermined rows from the buffer 561. The scan order determining part 562 determines the number of rows for a consecutive scan to the subpixel columns of the odd columns or the subpixel columns of the even columns based on the received judgement result signal RES. The scan order determining part 562 transmits a row number signal C_Num corresponding to the number of the rows for the consecutive scan to the gate line determining part 563, the register 564 and the selection signal determining part 565.

The gate line determining part 563 receives the row number signal C_Num corresponding to the number of the rows for the consecutive scan from the scan order determining part 562. The gate line determining part 563 determines an order of the gate lines where the gate signal is applied based on the row number signal C_Num. The gate line determining part 563 transmits a gate line designation signal GL_Num to the signal modulating part 510. The signal modulating part 510 generates the modulated data enable tDE based on the gate line designation signal GL_Num, and the row memory part 520 arranges the image data RGBW based on the modulated data enable tDE received from the signal modulating part 510.

The register 564 receives the row number signal C_Num corresponding to the number of the rows for the consecutive scan from the scan order determining part 562 and stores the row number signal C_Num. The row number signal C_Num stored in the register 564 is called when the scan order determining part 562 determines the number of rows for the consecutive scan with respect to the next predetermined rows. The scan order determining part 562 determines the number of rows for the consecutive scan with respect to the subpixel columns of the odd columns or the subpixel columns of the even columns using the row number signal C_Num received from the register 562. For example, the scan order determining part 562 determines the row number signal C_Num(x) corresponding to the number of the rows for the consecutive scan based on the outputted row number signal C_Num(x−1) proximately determined with respect to the predetermined rows. When the number of rows for the consecutive scan has an upper limit, the gate line determining part 563 modifies the row number signal C_Num(x) according to the row number signal C_Num(x−1). For example, when the row number signal C_Num(x) and the row number signal C_Num(x−1) with respect to the subpixels of the odd columns have a consecutive similarity, the gate line determining part 563 determines to consecutively scan the rows corresponding to the subpixels of the odd columns.

The selection signal determining part 565 receives the row number signal C_Num corresponding to the number of the rows for the consecutive scan from the scan order determining part 562. The selection signal determining part 565 generates the input register selection signal IRSS, the output register selection signal ORSS and the input validation signal VALID based on the row number signal C_Num. The input register selection signal IRSS designates the register that can store the image data R'G'B'W' in the data selecting part 310 of the data driving unit 300. The output register selection signal ORSS designates the register storing the image data R'G'B'W' that is outputted from the data selecting part 310. The input validation signal VALID validates or invalidates the input register selection signal IRSS. The selection signal determining part 565 transmits the input register selection signal IRSS, the output register selection signal ORSS and the input validation signal VALID to the data selecting part 310.

Figure 15:
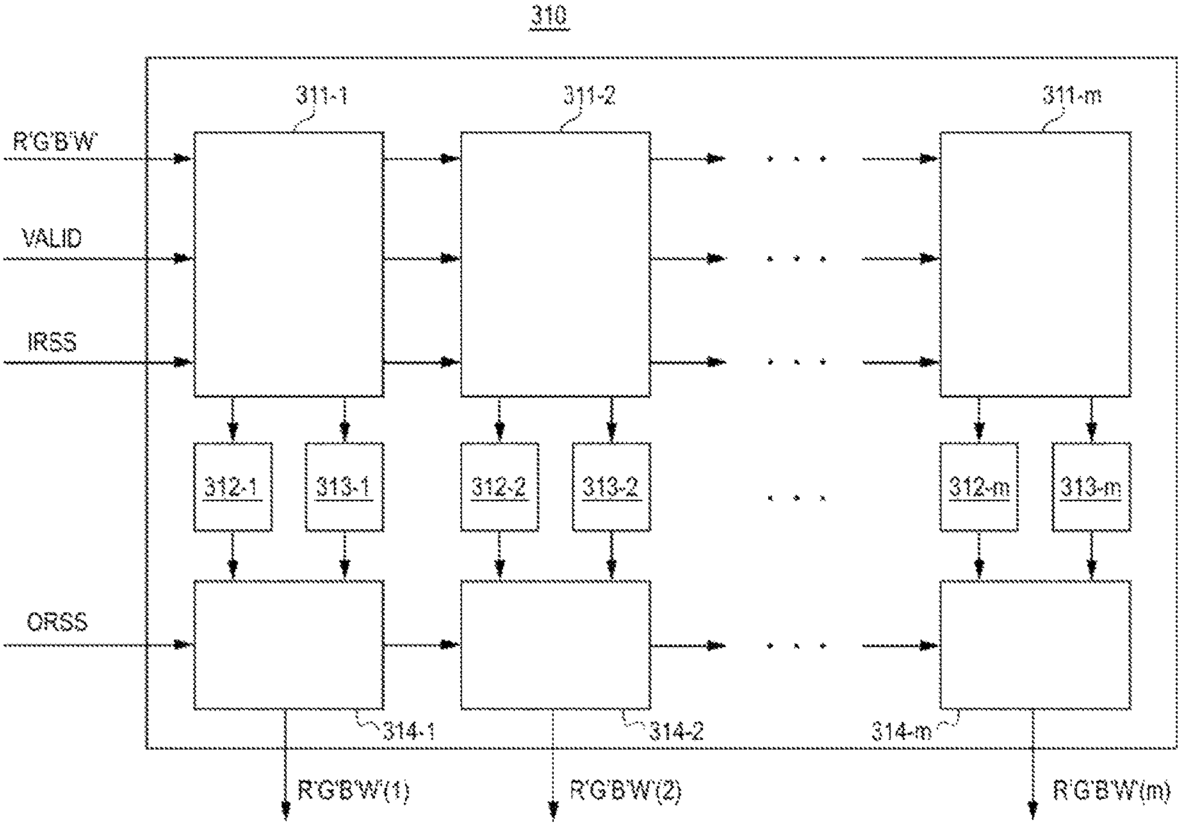
FIG. 15 is a view showing a data selecting part 310 according to a first aspect of the present disclosure.

FIG. 15 is a view showing a data selecting part 310 according to a first aspect of the present disclosure. The data selecting part 310 includes data dividing parts 311-1 to 311-*m*, first registers 312-1 to 312-*m*, second registers 313-1 to 313-*m* and selecting parts 314-1 to 314-*m*.

The data dividing parts 311-1 to 311-*m* receive the image data R'G'B'W' from the row memory part 520. The data dividing parts 311-1 to 311-*m* receive the input register selection signal IRSS and the input validation signal VALID from the selection signal determining part 565. The data dividing parts 311-1 to 311-*m* divide the received image data R'G'B'W' based on the received input register selection signal IRSS. Next, the data dividing parts 311-1 to 311-*m* transmit the divided image data R'G'B'W' based on the input register selection signal IRSS and the input validation signal VALID to the first registers 312-1 to 312-*m* or the second registers 313-1 to 313-*m*.

When the input register selection signal IRSS designates the first registers 312-1 to 312-*m* and the input validation signal VALID validates the input register selection signal IRSS, the first registers 312-1 to 312-*m* store the divided image data R'G'B'W' received from the data dividing parts 311-1 to 311-*m*. As a result, the first registers 312-1 to 312-*m* function as a memory part storing the image data. When the input register selection signal IRSS designates the first registers 312-1 to 312-*m* and the input validation signal VALID invalidates the input register selection signal IRSS, the first registers 312-1 to 312-*m* do not store the divided image data R'G'B'W' received from the data dividing parts 311-1 to 311-*m*.

When the input register selection signal IRSS designates the second registers 313-1 to 313-*m* and the input validation signal VALID validates the input register selection signal IRSS, the second registers 313-1 to 313-*m* store the divided image data R'G'B'W' received from the data dividing parts 311-1 to 311-*m*. As a result, the second registers 313-1 to 313-*m* function as a memory part storing the image data. When the input register selection signal IRSS designates the second registers 313-1 to 313-*m* and the input validation signal VALID invalidates the input register selection signal IRSS, the second registers 313-1 to 313-*m* do not store the divided image data R'G'B'W' received from the data dividing parts 311-1 to 311-*m*.

The selecting parts 314-1 to 314-*m* receive the output register selection signal ORSS from the selection signal determining part 565 in the scheduler 560. The selecting parts 314-1 to 314-*m* transmit the divided image data R'G'B'W' stored in the first registers 312-1 to 312-*m* or the second registers 313-1 to 313-*m* designated by the output register selection signal ORSS to the data converting part 320. The data converting part 320 converts the received image data R'G'B'W' into the analog data voltage DATA using the data control signal DCS and transmits the analog data voltage DATA to each subpixel through the data lines DL1 to DLm.

An operation of the data selecting part 310 according to the input signal to the scheduler 560 will be illustrated with reference to drawings. FIG. 16 is a view showing input signals to a scheduler of a display device according to a first aspect of the present disclosure, and FIG. 17 is a view showing input signals to a data selection part of a display device according to a first aspect of the present disclosure.

FIG. 16 shows the judgement result signals RES_O and RES_E inputted from the similarity judging part 550 to the scheduler 560 with respect to a (x−7)th row to a xth row. In FIG. 16, the judgement result signal RES_O of the similarity judging part 550 to the odd column has a value of 0 with respect to the (x−7)th row. The similarity judging part 550 judges that the image data of the odd column with respect to the (x−7)th row is not similar to the image data of the odd column with respect to a one-previous row. The judgement result signal RES_O of the similarity judging part 550 to the odd column has a value of 1 with respect to the (x−6)th row to the xth row. The similarity judging part 550 judges that the image data of the odd column with respect to the (x−6)th row to the xth row is similar to the image data of the odd column with respect to the one-previous row. The judgement result signal RES_E of the similarity judging part 550 to the even column has a value of 0 with respect to all of the rows. The similarity judging part 550 judges that the image data of the even column with respect to the (x−7)th row to the xth row is not similar to the image data of the even column with respect to the one-previous row.

FIG. 17 shows the input register selection signal IRSS, the input validation signal VALID and the output register selection signal ORSS transmitted to the data selecting part 310 for scan numbers of 1 to 16. The image data (signal) of the odd column with respect to the (x−6)th row to the xth row are similar to the image data of the odd column with respect to the one-previous row. As a result, for the scan numbers of 1 to 8, the arranged image data R'G'B'W' of the odd column with respect to the (x−7)th row to the xth row are inputted as input data of numbers of 1 to 8 from the row memory part 520 to the data selecting part 310. Next, for the scan numbers of 9 to 16, the arranged image data R'G'B'W' of the even column with respect to the (x−7)th row to the xth row are inputted as input data of numbers of 9 to 16 from the row memory part 520 to the data selecting part 310.

The scheduler 560 generates the input register selection signal TRSS for designating the register that can store the input data of the numbers of 1 to 8 of the odd column based on the received judgement result signal RES_O. The scheduler 560 transmits the input register selection signal IRSS designating the first registers 312-1 to 312-*m* as a register that can store the input data of the numbers of 1 to 8 to the data selecting part 310.

The scheduler 560 transmits 1 as the input validation signal VALID for the input data of the number of 1 corresponding to the odd column to the data selecting part 310 and validates the input register selection signal IRSS designating that the input data of the number of 1 is stored in the first registers 312-1 to 312-*m*. The scheduler 560 judges based on the received judgement result signal RES_O that the input data of the numbers of 1 to 8 are similar to each other. As a result, the scheduler 560 transmits 0 as the input validation signal VALID for the input data of the numbers of 2 to 8 to the data selecting part 310 and invalidates the input register selection signal IRSS designating that the input data of the numbers of 2 to 8 are stored in the first registers 312-1 to 312-*m*. Since the first registers 312-1 to 312-*m* are not updated and the input data of the number of 1 is maintained, a power consumption for updating the data stored in the first registers 312-1 to 312-*m*. The timing controlling unit 500 is formed that the input register selection signal IRSS is not transmitted to the data driving unit 300 for the scan numbers of 2 to 8.

Next, the scheduler 560 transmits 1 as the input validation signal VALID for the input data of the number of 9 corresponding to the even column to the data selecting part 310 and validates the input register selection signal IRSS designating that the input data of the number of 9 is stored in the second registers 313-1 to 313-*m*. The scheduler 560 judges based on the received judgement result signal RES_E that the input data of the numbers of 9 to 16 are not similar to each other. The input data of the number of 9 stored in the second registers 313-1 to 313-*m* cannot be used as the input data of the numbers of 10 to 16. As a result, the scheduler 560 transmits 1 as the input validation signal VALID for the input data of the numbers of 10 to 16 to the data selecting part 310 and validates the input register selection signal IRSS designating that the input data of the numbers of 10 to 16 are stored in the second registers 313-1 to 313-*m*.

The scheduler 560 transmits the output register selection signal ORSS to the data selecting part 310 for sequentially outputting the input data of the numbers of 1 to 16 as the output data of the numbers of 1 to 16 to the data converting part 320. The scheduler 560 transmits the output register selection signal ORSS designating the first registers 312-1 to 312-*m* to the data selecting part 310 for the scan numbers of 1 to 8 and transmits the output register selection signal ORSS designating the second registers 313-1 to 313-*m* to the data selecting part 310 for the scan numbers of 9 to 16.

In a display device using a double rate driving (DRD) method, subpixels of different colors commonly have one data line. As a result, an image data signal (voltage) has a discontinuity when a color of a subpixel for scanning is converted, and a power consumption of the display device increases. To reduce the power consumption of the display device using the DRD method, the subpixels of the same color are consecutively scanned and a frequency of discontinuity of the outputted image data signal (voltage) is reduced. However, when the number of rows where the subpixels of the same color are consecutively scanned increases, a great time difference is caused between the input of the image data to the subpixels of the same color and the input of the image data to the different subpixels in the same row. A quality of a display image may be deteriorated due to the great time difference. Specifically, when a region where the plurality of pixel rows are not similar to each other is displayed, the display quality may be deteriorated due to the great time difference between inputs of the image data to the plurality of subpixels in the same row. When a region where the plurality of pixel rows are similar to each other, the display quality may not be deteriorated even by the great time difference between inputs of the image data to the plurality of subpixels in the same row. In the display device 10 according to a first aspect of the present disclosure, the similarity between the subpixel rows of the display panel is judged and the subpixels of the same color are consecutively scanned based on the judgement result. In a region where the plurality of pixel rows are similar to each other and the display quality is not deteriorated even by the great time difference between inputs of the image data to the plurality of subpixels in the same row, the subpixels of the same color are consecutively scanned. As a result, deterioration of the display quality of the display device according to a first aspect of the present disclosure using the DRD method is prevented and the power consumption is reduced.

Another operation of the data selecting part 310 according to the input signal to the scheduler 560 will be illustrated with reference to drawings. FIG. 18 is a view showing input signals to a scheduler of a display device according to a third aspect of the present disclosure, and FIG. 19 is a view showing input signals to a data selection part of a display device according to a third aspect of the present disclosure.

FIG. 18 shows the judgement result signals RES_O and RES_E inputted from the similarity judging part 550 to the scheduler 560 with respect to a (x−15)th row to a (x−8)th row. In FIG. 18, the judgement result signal RES_O of the similarity judging part 550 to the odd column has a value of 0 with respect to all of the rows. The similarity judging part 550 judges that the image data of the odd column with respect to the (x−15)th row to (x−8)th row is not similar to the image data of the odd column with respect to a one-previous row. The judgement result signal RES_E of the similarity judging part 550 to the even column has a value of 0 with respect to all of the rows. The similarity judging part 550 judges that the image data of the even column with respect to the (x−15)th row to the (x−8)th row is not similar to the image data of the even column with respect to the one-previous row.

FIG. 19 shows the input register selection signal IRSS, the input validation signal VALID and the output register selection signal ORSS transmitted to the data selecting part 310 for scan numbers of 17 to 32. The image data of the odd column with respect to the (x−15)th row to the (x−8)th row are not similar to the image data of the odd column with respect to the one-previous row and the one-next row. Similarly, the image data of the even column with respect to the (x−15)th row to the (x−8)th row are not similar to the image data of the even column with respect to the one-previous row and the one-next row. As a result, for the scan number of 17, the arranged image data R'G'B'W' of the odd column with respect to the (x−15)th row is inputted as input data of a number of 17 from the row memory part 520 to the data selecting part 310. Next, for the scan numbers of 18 and 19, the arranged image data R'G'B'W' of the even column with respect to the (x−15)th row and the (x−14)th row are inputted as input data of numbers of 18 and 19 from the row memory part 520 to the data selecting part 310. Next, for the scan numbers of 20 and 21, the arranged image data R'G'B'W' of the even column with respect to the (x−14)th row and the (x−13)th row are inputted as input data of numbers of 20 and 21 from the row memory part 520 to the data selecting part 310. Next, the columns for scanning are converted by two rows, and for the scan numbers of 22, 23, 26, 27, 30 and 31, the arranged image data R'G'B'W' of the even column with respect to the (x−13)th row to the (x−8)th row are inputted as input data of numbers of 22, 23, 26, 27, 30 and 31 from the row memory part 520 to the data selecting part 310. Similarly, for the scan numbers of 24, 25, 28, 29 and 32, the arranged image data R'G'B'W' of the odd column with respect to the (x−12)th row to the (x−8)th row are inputted as input data of numbers of 24, 25, 28, 29 and 32 from the row memory part 520 to the data selecting part 310.

The scheduler 560 generates the input register selection signal IRSS for designating the register that can store the input data of the numbers of 17, 20, 21, 24, 25, 28 and 29 of the odd column based on the received judgement result signal RES_O. The scheduler 560 transmits the input register selection signal IRSS designating the first registers 312-1 to 312-*m* as a register that can store the input data of the numbers of 17, 20, 21, 24, 25, 28, 29 and 32 to the data selecting part 310. The scheduler 560 generates the input register selection signal IRSS for designating the register that can store the input data of the numbers of 18, 19, 22, 23, 26, 27, 30 and 31 of the even column based on the received judgement result signal RES_E. The scheduler 560 transmits the input register selection signal IRSS designating the second registers 313-1 to 313-*m* as a register that can store the input data of the numbers of 18, 19, 22, 23, 26, 27, 30 and 31 to the data selecting part 310.

The scheduler 560 transmits 1 as the input validation signal VALID for the input data of the numbers of 17, 20, 21, 24, 25, 28, 29 and 32 corresponding to the odd column to the data selecting part 310 and validates the input register selection signal IRSS designating that the input data of the numbers of 17, 20, 21, 24, 25, 28, 29 and 32 are stored in the first registers 312-1 to 312-*m*. The scheduler 560 judges based on the received judgement result signal RES_O that the input data of the numbers of 1 to 8 are not similar to each other. The input data of the number of 17 stored in the second registers 313-1 to 313-*m* cannot be used as the input data of the numbers of 20, 21, 24, 25, 28, 29 and 32. As a result, the scheduler 560 validates the input register selection signal IRSS designating that the input data of the numbers of 17, 20, 21, 24, 25, 28, 29 and 32 are stored in the first registers 312-1 to 312-*m*.

Similarly, the scheduler 560 transmits 1 as the input validation signal VALID for the input data of the numbers of 18, 19, 22, 23, 26, 27, 30 and 31 corresponding to the even column to the data selecting part 310 and validates the input register selection signal IRSS designating that the input data of the numbers of 18, 19, 22, 23, 26, 27, 30 and 31 are stored in the second registers 313-1 to 313-*m*. The scheduler 560 judges based on the received judgement result signal RES_E that the input data of the numbers of 9 to 16 are not similar to each other. The input data of the number of 18 stored in the second registers 313-1 to 313-*m* cannot be used as the input data of the numbers of 19, 22, 23, 26, 27, 30 and 31. As a result, the scheduler 560 transmits 1 as the input validation signal VALID for the input data of the numbers of 18, 19, 22, 23, 26, 27, 30 and 31 to the data selecting part 310 and validates the input register selection signal IRSS designating that the input data of the numbers of 18, 19, 22, 23, 26, 27, 30 and 31 are stored in the second registers 313-1 to 313-*m*.

The scheduler 560 transmits the output register selection signal ORSS to the data selecting part 310 for sequentially outputting the input data of the numbers of 17 to 32 as the output data of the numbers of 17 to 32 to the data converting part 320. The scheduler 560 transmits the output register selection signal ORSS designating the first registers 312-1 to 312-*m* to the data selecting part 310 for the scan numbers of 17, 20, 21, 24, 25, 28, 29 and 32 and transmits the output register selection signal ORSS designating the second registers 313-1 to 313-*m* to the data selecting part 310 for the scan numbers of 18, 19, 22, 23, 26, 27, 30 and 31.

As a result, deterioration of the display quality of the display device according to a third aspect of the present disclosure using the DRD method is prevented.

Figure 20:
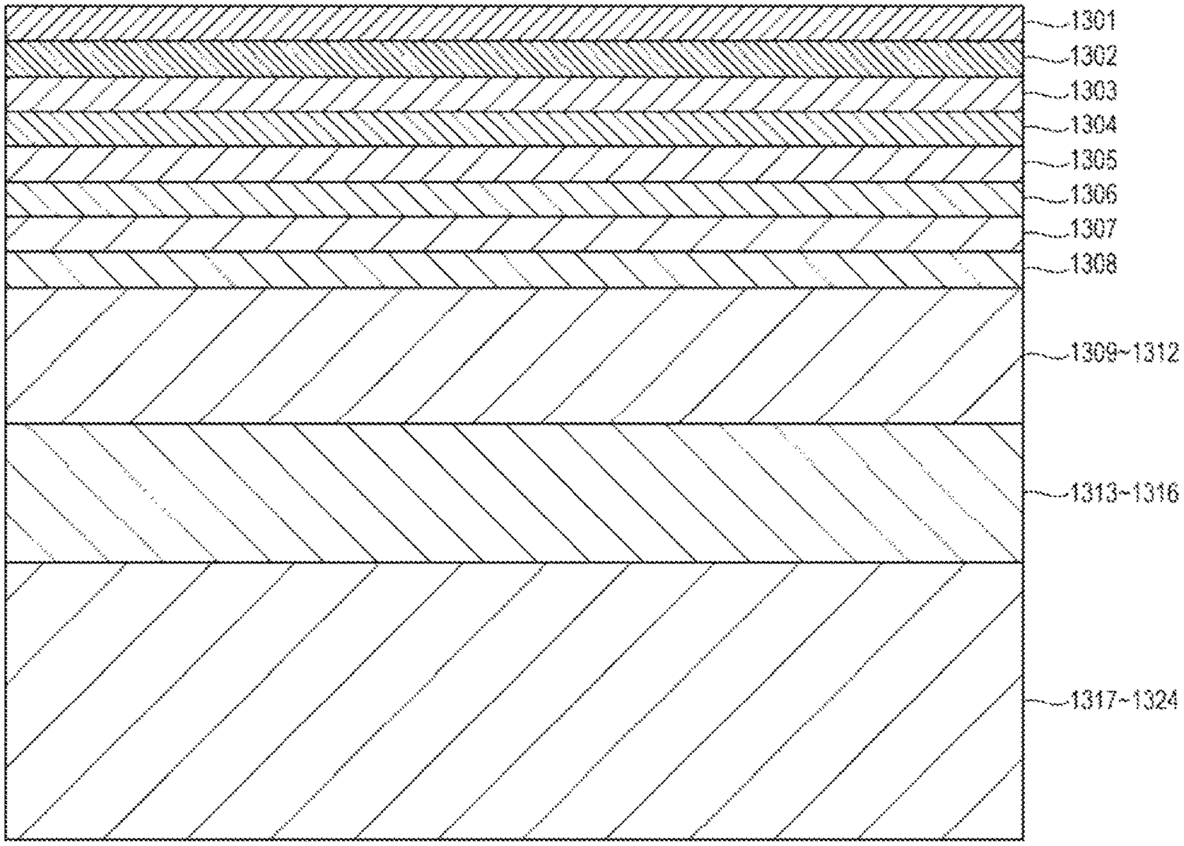
FIG. 20 is a view showing an image displayed by a display device according to a first aspect of the present disclosure.

A subpixel scan order converted based on the image displayed by the display device 10 will be illustrated hereinafter. FIG. 20 is a view showing an image displayed by a display device according to a first aspect of the present disclosure. In FIG. 20, the display panel 100 of the display device 10 displays an image using the plurality of pixel rows 1301 to 1324. The similarity judging part 550 judges that the image data written in the subpixels of the odd column and the even column of the pixel rows 1301 to 1309, 1313 and 1317 are not similar to the image data written in the subpixels of the odd column and the even column of the one-previous pixel rows. The similarity judging part 550 judges that the image data written in the subpixels of the odd column and the even column of the pixel rows 1310 to 1312, 1314 to 1316 and 1318 to 1324 are similar to the image data written in the subpixels of the odd column and the even column of the one-previous pixel rows.

Figure 21:
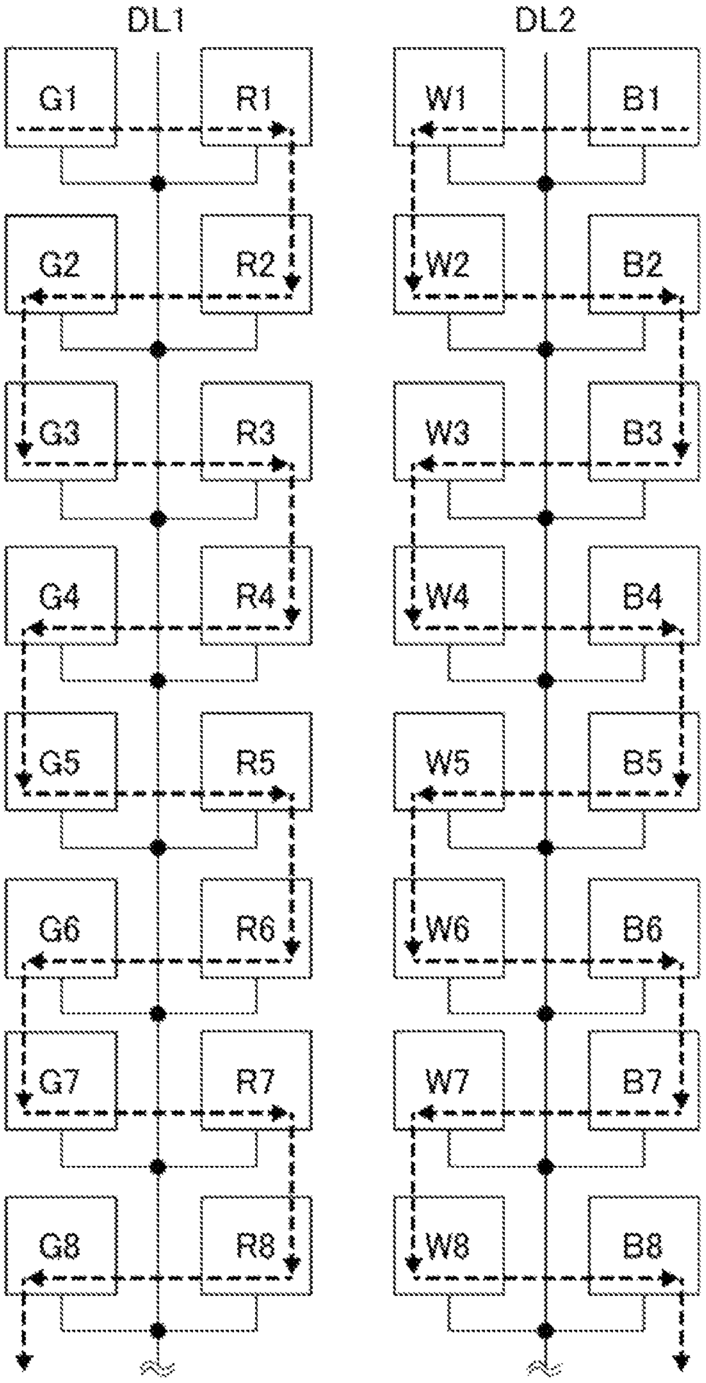
FIG. 21 is a view showing a subpixel scan order of a display device according to a first aspect of the present disclosure.

FIG. 21 is a view showing a subpixel scan order of a display device according to a first aspect of the present disclosure. FIG. 21 shows the subpixels of four columns in the pixel rows 1301 to 1308 of FIG. 20. In FIG. 21, the green subpixels G1 to G8 and the red subpixels R1 to R8 commonly have the data line DL1, and the white subpixels W1 to W8 and the blue subpixels B1 to B8 commonly have the data line DL2. The similarity judging part 550 judges that the image data (image signal) of the pixel rows 1301 to 1308 of the odd column and the even column are not similar to each other. As a result, the judgement result signals RES_O and RES_E of the pixel rows 1301 to 1308 inputted from the similarity judging part 550 to the scheduler 560 have a value of 0. The scheduler 560 generates the input register selection signal IRSS, the input validation signal VALID and the output register selection signal ORSS based on the received judgement result signals RES_O and RES_E. The scheduler 560 transmits the input register selection signal IRSS, the input validation signal VALID and the output register selection signal ORSS to the data driving unit 300. The data driving unit 300 transmits the image data (image signal) to the green subpixels G1 to G8, the red subpixels R1 to R8, the white subpixels W1 to W8 and the blue subpixels B1 to B8 according to an order designated by the received output register selection signal ORSS.

The green subpixels G1 to G8 and the red subpixels R1 to R8 of the pixel rows 1301 to 1308 are scanned according to a following order. After the green subpixel G1 is scanned, the red subpixel R1 which commonly has the data line DL1 with the green subpixel G1 in the same row and is disposed in the pixel column different from the pixel column of the green subpixel G1 is scanned. Next, the red subpixel R2 in one-next row of the red subpixel R1 is scanned. Next, the green subpixel G2 which commonly has the data line DL1 with the red subpixel R2 in the same row and is disposed in the pixel column different from the pixel column of the red subpixel R2 is scanned. Next, the green subpixel G3 in one-next row of the green subpixel G2 is scanned. Next, the red subpixel R3 which commonly has the data line DL1 with the green subpixel G3 in the same row and is disposed in the pixel column different from the pixel column of the green subpixel G3 is scanned. Next, the red subpixel R4 in one-next row of the red subpixel R3 is scanned. Next, the green subpixel G4 which commonly has the data line DL1 with the red subpixel R4 in the same row and is disposed in the pixel column different from the pixel column of the red subpixel R4 is scanned. Next, the green subpixel G5 in one-next row of the green subpixel G4 is scanned. Next, the red subpixel R5 which commonly has the data line DL1 with the green subpixel G5 in the same row and is disposed in the pixel column different from the pixel column of the green subpixel G5 is scanned. Next, the red subpixel R6 in one-next row of the red subpixel R5 is scanned. Next, the green subpixel G6 which commonly has the data line DL1 with the red subpixel R6 in the same row and is disposed in the pixel column different from the pixel column of the red subpixel R6 is scanned. Next, the green subpixel G7 in one-next row of the green subpixel G6 is scanned. Next, the red subpixel R7 which commonly has the data line DL1 with the green subpixel G7 in the same row and is disposed in the pixel column different from the pixel column of the green subpixel G7 is scanned. Next, the red subpixel R8 in one-next row of the red subpixel R7 is scanned. Next, the green subpixel G8 which commonly has the data line DL1 with the red subpixel R8 in the same row and is disposed in the pixel column different from the pixel column of the red subpixel R8 is scanned.

The white subpixels W1 to W8 and the blue subpixels B1 to B8 of the pixel rows 1301 to 1308 are scanned according to a following order. After the blue subpixel B1 is scanned, the white subpixel W1 which commonly has the data line DL2 with the blue subpixel B1 in the same row and is disposed in the pixel column different from the pixel column of the blue subpixel B1 is scanned. Next, the white subpixel W2 in one-next row of the white subpixel W1 is scanned. Next, the blue subpixel B2 which commonly has the data line DL2 with the white subpixel W2 in the same row and is disposed in the pixel column different from the pixel column of the white subpixel W2 is scanned. Next, the blue subpixel B3 in one-next row of the blue subpixel B2 is scanned. Next, the white subpixel W3 which commonly has the data line DL2 with the blue subpixel B3 in the same row and is disposed in the pixel column different from the pixel column of the blue subpixel B3 is scanned. Next, the white subpixel W4 in one-next row of the white subpixel W3 is scanned. Next, the blue subpixel B4 which commonly has the data line DL2 with the white subpixel W4 in the same row and is disposed in the pixel column different from the pixel column of the white subpixel W4 is scanned. Next, the blue subpixel B5 in one-next row of the blue subpixel B4 is scanned. Next, the white subpixel W5 which commonly has the data line DL2 with the blue subpixel B5 in the same row and is disposed in the pixel column different from the pixel column of the blue subpixel B5 is scanned. Next, the white subpixel W6 in one-next row of the white subpixel W5 is scanned. Next, the blue subpixel B6 which commonly has the data line DL2 with the white subpixel W6 in the same row and is disposed in the pixel column different from the pixel column of the white subpixel W6 is scanned. Next, the blue subpixel B7 in one-next row of the blue subpixel B6 is scanned. Next, the white subpixel W7 which commonly has the data line DL2 with the blue subpixel B7 in the same row and is disposed in the pixel column different from the pixel column of the blue subpixel B7 is scanned. Next, the white subpixel W8 in one-next row of the white subpixel W7 is scanned. Next, the blue subpixel B8 which commonly has the data line DL2 with the white subpixel W8 in the same row and is disposed in the pixel column different from the pixel column of the white subpixel W8 is scanned.

The similarity judging part 550 judges that the image data of the pixel rows 1301 to 1308 are not similar to each other. Based on this judgement, the scheduler 560 generates the input register selection signal IRSS, the input validation signal VALID and the output register selection signal ORSS such that the subpixels of each color are alternately scanned by two rows and transmits the input register selection signal IRSS, the input validation signal VALID and the output register selection signal ORSS to the data driving unit 300. The data driving unit 300 writes the image data to the green subpixels G1 to G8, the red subpixels R1 to R8, the white subpixels W1 to W8 and the blue subpixels B1 to B8 according to an order designated by the received output register selection signal ORSS. In the pixel rows 1301 to 1308 constituting a region where the image data are not similar to each other, a difference in a writing time of the image data is reduced by reducing the number of rows where the subpixels of the same color are consecutively scanned. For example, the difference in a writing time of the image data of the subpixels in the same row is reduced by scanning the subpixels of each color alternately by two rows. As a result, in the display device according to a first aspect of the present disclosure using a double rate driving (DRD) method, deterioration of the display quality due to the writing time difference of the image data between the subpixels in the same row for a region where the image data of pixel rows are not similar to each other is prevented.

Figure 22:
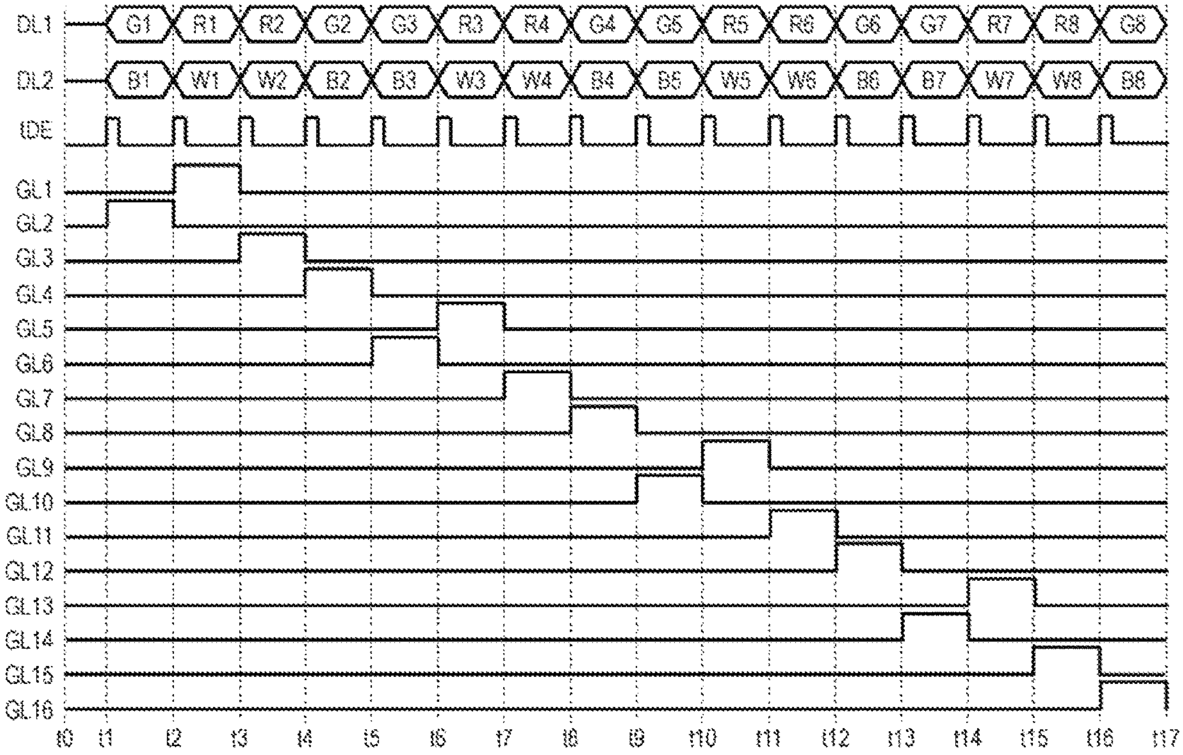
FIG. 22 is a view showing a gate signal of a gate driving unit of a display device according to a first aspect of the present disclosure.

FIG. 22 is a view showing a gate signal of a gate driving unit of a display device according to a first aspect of the present disclosure. FIG. 22 shows the gate signals applied to the gate lines GL1 to GL16 by the gate driving unit 200 when the pixel rows 1301 to 1308 of FIG. 20 are scanned according to an order of FIG. 21.

During a period between timings t0 and t1, the gate signal is not applied to the gate lines GL1 to GL16. During a period between timings t1 and t2, the gate signal is applied to the gate line GL2 in synchronization with the modulated data enable tDE. When the gate signal is applied to the gate line GL2, the data signal of the data line DL1 is applied to the first node N1 between the gate of the driving transistor DT of the green subpixel G1 and the first capacitor C1 of the green subpixel G1 through the first switching transistor T1 of the green subpixel G1. The data signal of the data line DL1 corresponds to the image data for the green subpixel G1. Similarly, when the gate signal is applied to the gate line GL2, the data signal of the data line DL2 is applied to the first node N1 between the gate of the driving transistor DT of the blue subpixel B1 and the first capacitor C1 of the blue subpixel B1 through the first switching transistor T1 of the blue subpixel B1. The data signal of the data line DL2 corresponds to the image data for the blue subpixel B1.

During a period between timings t2 and t3, the gate signal is applied to the gate line GL1 in synchronization with the modulated data enable tDE. When the gate signal is applied to the gate line GL1, the data signal of the data line DL1 is applied to the first node N1 between the gate of the driving transistor DT of the red subpixel R1 and the first capacitor C1 of the red subpixel R1 through the first switching transistor T1 of the red subpixel R1. The data signal of the data line DL1 corresponds to the image data for the red subpixel R1. Similarly, when the gate signal is applied to the gate line GL1, the data signal of the data line DL2 is applied to the first node N1 between the gate of the driving transistor DT of the white subpixel W1 and the first capacitor C1 of the white subpixel W1 through the first switching transistor T1 of the white subpixel W1. The data signal of the data line DL2 corresponds to the image data for the white subpixel W1.

During a period between timings t3 and t4, the gate signal is applied to the gate line GL3 in synchronization with the modulated data enable tDE. When the gate signal is applied to the gate line GL3, the data signal of the data line DL1 is applied to the first node N1 between the gate of the driving transistor DT of the red subpixel R2 and the first capacitor C1 of the red subpixel R2 through the first switching transistor T1 of the red subpixel R2. The data signal of the data line DL1 corresponds to the image data for the red subpixel R2. Similarly, when the gate signal is applied to the gate line GL3, the data signal of the data line DL2 is applied to the first node N1 between the gate of the driving transistor DT of the white subpixel W2 and the first capacitor C1 of the white subpixel W2 through the first switching transistor T1 of the white subpixel W2. The data signal of the data line DL2 corresponds to the image data for the white subpixel W2.

During a period between timings t4 and t5, the gate signal is applied to the gate line GL4 in synchronization with the modulated data enable tDE. When the gate signal is applied to the gate line GL4, the data signal of the data line DL1 is applied to the first node N1 between the gate of the driving transistor DT of the green subpixel G2 and the first capacitor C1 of the green subpixel G2 through the first switching transistor T1 of the green subpixel G2. The data signal of the data line DL1 corresponds to the image data for the green subpixel G2. Similarly, when the gate signal is applied to the gate line GL4, the data signal of the data line DL2 is applied to the first node N1 between the gate of the driving transistor DT of the blue subpixel B2 and the first capacitor C1 of the blue subpixel B2 through the first switching transistor T1 of the blue subpixel B2. The data signal of the data line DL2 corresponds to the image data for the blue subpixel B2.

During a period between timings t5 and t6, the gate signal is applied to the gate line GL6 in synchronization with the modulated data enable tDE. When the gate signal is applied to the gate line GL6, the data signal of the data line DL1 is applied to the first node N1 between the gate of the driving transistor DT of the green subpixel G3 and the first capacitor C1 of the green subpixel G3 through the first switching transistor T1 of the green subpixel G3. The data signal of the data line DL1 corresponds to the image data for the green subpixel G3. Similarly, when the gate signal is applied to the gate line GL6, the data signal of the data line DL2 is applied to the first node N1 between the gate of the driving transistor DT of the blue subpixel B3 and the first capacitor C1 of the blue subpixel B3 through the first switching transistor T1 of the blue subpixel B3. The data signal of the data line DL2 corresponds to the image data for the blue subpixel B3.

During a period between timings t6 and t7, the gate signal is applied to the gate line GL5 in synchronization with the modulated data enable tDE. When the gate signal is applied to the gate line GL5, the data signal of the data line DL1 is applied to the first node N1 between the gate of the driving transistor DT of the red subpixel R3 and the first capacitor C1 of the red subpixel R3 through the first switching transistor T1 of the red subpixel R3. The data signal of the data line DL1 corresponds to the image data for the red subpixel R3. Similarly, when the gate signal is applied to the gate line GL5, the data signal of the data line DL2 is applied to the first node N1 between the gate of the driving transistor DT of the white subpixel W3 and the first capacitor C1 of the white subpixel W3 through the first switching transistor T1 of the white subpixel W3. The data signal of the data line DL2 corresponds to the image data for the white subpixel W3.

During a period between timings t7 and t8, the gate signal is applied to the gate line GL7 in synchronization with the modulated data enable tDE. When the gate signal is applied to the gate line GL7, the data signal of the data line DL1 is applied to the first node N1 between the gate of the driving transistor DT of the red subpixel R4 and the first capacitor C1 of the red subpixel R4 through the first switching transistor T1 of the red subpixel R4. The data signal of the data line DL1 corresponds to the image data for the red subpixel R4. Similarly, when the gate signal is applied to the gate line GL7, the data signal of the data line DL2 is applied to the first node N1 between the gate of the driving transistor DT of the white subpixel W4 and the first capacitor C1 of the white subpixel W4 through the first switching transistor T1 of the white subpixel W4. The data signal of the data line DL2 corresponds to the image data for the white subpixel W4.

During a period between timings t8 and t9, the gate signal is applied to the gate line GL8 in synchronization with the modulated data enable tDE. When the gate signal is applied to the gate line GL8, the data signal of the data line DL1 is applied to the first node N1 between the gate of the driving transistor DT of the green subpixel G4 and the first capacitor C1 of the green subpixel G4 through the first switching transistor T1 of the green subpixel G4. The data signal of the data line DL1 corresponds to the image data for the green subpixel G4. Similarly, when the gate signal is applied to the gate line GL8, the data signal of the data line DL2 is applied to the first node N1 between the gate of the driving transistor DT of the blue subpixel B4 and the first capacitor C1 of the blue subpixel B4 through the first switching transistor T1 of the blue subpixel B4. The data signal of the data line DL2 corresponds to the image data for the blue subpixel B4.

During a period between timings t9 and t10, the gate signal is applied to the gate line GL10 in synchronization with the modulated data enable tDE. When the gate signal is applied to the gate line GL10, the data signal of the data line DL1 is applied to the first node N1 between the gate of the driving transistor DT of the green subpixel G5 and the first capacitor C1 of the green subpixel G5 through the first switching transistor T1 of the green subpixel G5. The data signal of the data line DL1 corresponds to the image data for the green subpixel G5. Similarly, when the gate signal is applied to the gate line GL10, the data signal of the data line DL2 is applied to the first node N1 between the gate of the driving transistor DT of the blue subpixel B5 and the first capacitor C1 of the blue subpixel B5 through the first switching transistor T1 of the blue subpixel B5. The data signal of the data line DL2 corresponds to the image data for the blue subpixel B5.

During a period between timings t10 and t11, the gate signal is applied to the gate line GL9 in synchronization with the modulated data enable tDE. When the gate signal is applied to the gate line GL9, the data signal of the data line DL1 is applied to the first node N1 between the gate of the driving transistor DT of the red subpixel R5 and the first capacitor C1 of the red subpixel R5 through the first switching transistor T1 of the red subpixel R5. The data signal of the data line DL1 corresponds to the image data for the red subpixel R5. Similarly, when the gate signal is applied to the gate line GL9, the data signal of the data line DL2 is applied to the first node N1 between the gate of the driving transistor DT of the white subpixel W5 and the first capacitor C1 of the white subpixel W5 through the first switching transistor T1 of the white subpixel W5. The data signal of the data line DL2 corresponds to the image data for the white subpixel W5.

During a period between timings t11 and t12, the gate signal is applied to the gate line GL11 in synchronization with the modulated data enable tDE. When the gate signal is applied to the gate line GL11, the data signal of the data line DL1 is applied to the first node N1 between the gate of the driving transistor DT of the red subpixel R6 and the first capacitor C1 of the red subpixel R6 through the first switching transistor T1 of the red subpixel R6. The data signal of the data line DL1 corresponds to the image data for the red subpixel R6. Similarly, when the gate signal is applied to the gate line GL11, the data signal of the data line DL2 is applied to the first node N1 between the gate of the driving transistor DT of the white subpixel W6 and the first capacitor C1 of the white subpixel W6 through the first switching transistor T1 of the white subpixel W6. The data signal of the data line DL2 corresponds to the image data for the white subpixel W6.

During a period between timings t12 and t13, the gate signal is applied to the gate line GL12 in synchronization with the modulated data enable tDE. When the gate signal is applied to the gate line GL12, the data signal of the data line DL1 is applied to the first node N1 between the gate of the driving transistor DT of the green subpixel G6 and the first capacitor C1 of the green subpixel G6 through the first switching transistor T1 of the green subpixel G6. The data signal of the data line DL1 corresponds to the image data for the green subpixel G6. Similarly, when the gate signal is applied to the gate line GL12, the data signal of the data line DL2 is applied to the first node N1 between the gate of the driving transistor DT of the blue subpixel B6 and the first capacitor C1 of the blue subpixel B6 through the first switching transistor T1 of the blue subpixel B6. The data signal of the data line DL2 corresponds to the image data for the blue subpixel B6.

During a period between timings t13 and t14, the gate signal is applied to the gate line GL14 in synchronization with the modulated data enable tDE. When the gate signal is applied to the gate line GL14, the data signal of the data line DL1 is applied to the first node N1 between the gate of the driving transistor DT of the green subpixel G7 and the first capacitor C1 of the green subpixel G7 through the first switching transistor T1 of the green subpixel G7. The data signal of the data line DL1 corresponds to the image data for the green subpixel G7. Similarly, when the gate signal is applied to the gate line GL14, the data signal of the data line DL2 is applied to the first node N1 between the gate of the driving transistor DT of the blue subpixel B7 and the first capacitor C1 of the blue subpixel B7 through the first switching transistor T1 of the blue subpixel B7. The data signal of the data line DL2 corresponds to the image data for the blue subpixel B7.

During a period between timings t14 and t15, the gate signal is applied to the gate line GL13 in synchronization with the modulated data enable tDE. When the gate signal is applied to the gate line GL13, the data signal of the data line DL1 is applied to the first node N1 between the gate of the driving transistor DT of the red subpixel R7 and the first capacitor C1 of the red subpixel R7 through the first switching transistor T1 of the red subpixel R7. The data signal of the data line DL1 corresponds to the image data for the red subpixel R7. Similarly, when the gate signal is applied to the gate line GL13, the data signal of the data line DL2 is applied to the first node N1 between the gate of the driving transistor DT of the white subpixel W7 and the first capacitor C1 of the white subpixel W7 through the first switching transistor T1 of the white subpixel W7. The data signal of the data line DL2 corresponds to the image data for the white subpixel W7.

During a period between timings t15 and t16, the gate signal is applied to the gate line GL15 in synchronization with the modulated data enable tDE. When the gate signal is applied to the gate line GL15, the data signal of the data line DL1 is applied to the first node N1 between the gate of the driving transistor DT of the red subpixel R8 and the first capacitor C1 of the red subpixel R8 through the first switching transistor T1 of the red subpixel R8. The data signal of the data line DL1 corresponds to the image data for the red subpixel R8. Similarly, when the gate signal is applied to the gate line GL15, the data signal of the data line DL2 is applied to the first node N1 between the gate of the driving transistor DT of the white subpixel W8 and the first capacitor C1 of the white subpixel W8 through the first switching transistor T1 of the white subpixel W8. The data signal of the data line DL2 corresponds to the image data for the white subpixel W8.

During a period between timings t16 and t17, the gate signal is applied to the gate line GL16 in synchronization with the modulated data enable tDE. When the gate signal is applied to the gate line GL16, the data signal of the data line DL1 is applied to the first node N1 between the gate of the driving transistor DT of the green subpixel G8 and the first capacitor C1 of the green subpixel G8 through the first switching transistor T1 of the green subpixel G8. The data signal of the data line DL1 corresponds to the image data for the green subpixel G8. Similarly, when the gate signal is applied to the gate line GL16, the data signal of the data line DL2 is applied to the first node N1 between the gate of the driving transistor DT of the blue subpixel B8 and the first capacitor C1 of the blue subpixel B8 through the first switching transistor T1 of the blue subpixel B8. The data signal of the data line DL2 corresponds to the image data for the blue subpixel B8.

During a period between the timings t1 and t17, the gate driving unit 200 applies the gate signal to the gate lines GL1 to GL16 based on the gate line designation signal GL_Num of the scheduler 560 according to an order as shown in FIG. 22. During a period between the timings t1 and t17, the data driving unit 300 writes the data signal to the green subpixel G and the red subpixel R through the common data line DL1 according to the gate signal applied to the gate lines GL1 to GL16. During a period between the timings t1 and t17, the data driving unit 300 writes the data signal to the white subpixel W and the blue subpixel B through the common data line DL2 according to the gate signal applied to the gate lines GL1 to GL16.

According to the timings of FIG. 22 and the order of FIG. 21, the data driving unit 300 writes the data signal to the green subpixels G1 to G8, the red subpixels R1 to R8, the white subpixels W1 to W8 and the blue subpixels B1 to B8 in the pixel rows 1301 to 1308. When the subpixels of FIG. 21 are scanned, the writing time difference of the image data of the subpixels in the same row is reduced by scanning the subpixels of each color alternately by two rows. As a result, in the display device according to a first aspect of the present disclosure using a double rate driving (DRD) method, deterioration of the display quality due to the writing time difference of the image data between the subpixels in the same row for a region where the image data of pixel rows are not similar to each other is prevented.

Figure 23:
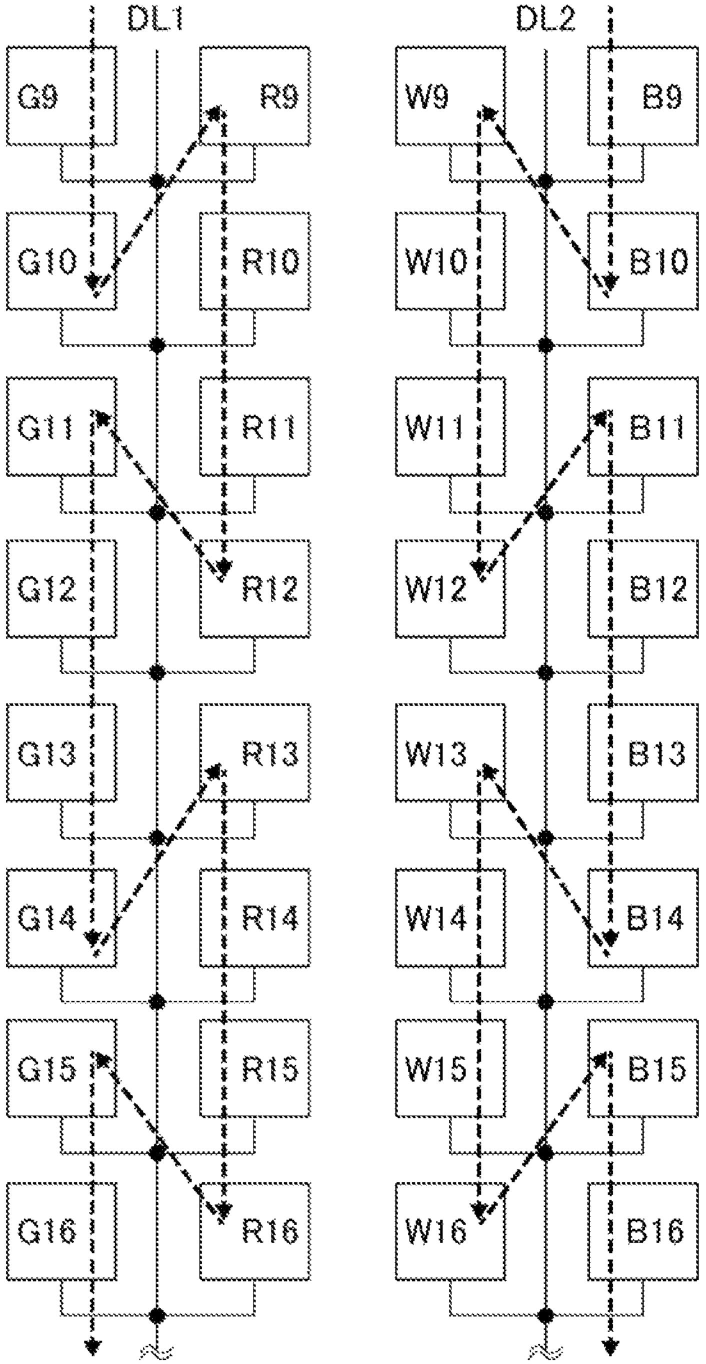
FIG. 23 is a view showing a subpixel scan order of a display device according to a first aspect of the present disclosure.

FIG. 23 is a view showing a subpixel scan order of a display device according to a first aspect of the present disclosure. FIG. 23 shows the subpixels of four columns in the pixel rows 1309 to 1316 of FIG. 20. In FIG. 23, the green subpixels G9 to G16 and the red subpixels R9 to R16 commonly have the data line DL1, and the white subpixels W9 to W16 and the blue subpixels B9 to B16 commonly have the data line DL2. The similarity judging part 550 judges that the image data (image signal) of the pixel rows 1310 to 1312 of the odd column and the even column are similar to the image data of the pixel rows in one-previous row. As a result, the judgement result signals RES_O and RES_E of the pixel rows 1310 to 1312 have a value of 1. Since the image data of the pixel row 1309 of the odd column and the even column are not similar to the image data of the pixel row 1308, the judgement result signals RES_O and RES_E of the pixel rows 1309 have a value of 0. The similarity judging part 550 judges that the image data (image signal) of the pixel rows 1314 to 1316 of the odd column and the even column are similar to the image data of the pixel rows in one-previous row. As a result, the judgement result signals RES_O and RES_E of the pixel rows 1314 to 1316 have a value of 1. Since the image data of the pixel row 1313 of the odd column and the even column are not similar to the image data of the pixel row 1312, the judgement result signals RES_O and RES_E of the pixel rows 1313 have a value of 0. The scheduler 560 generates the input register selection signal IRSS, the input validation signal VALID and the output register selection signal ORSS based on the received judgement result signals RES_O and RES_E. The scheduler 560 transmits the input register selection signal IRSS, the input validation signal VALID and the output register selection signal ORSS to the data driving unit 300. The data driving unit 300 transmits the image data (image signal) to the green subpixels G9 to G16, the red subpixels R9 to R16, the white subpixels W9 to W16 and the blue subpixels B9 to B16 according to an order designated by the received output register selection signal ORSS.

The green subpixels G9 to G16 and the red subpixels R9 to R16 of the pixel rows 1309 to 1316 are scanned according to a following order. After the green subpixel G9 is scanned, the green subpixel G10 in one-next row of the green subpixel G9 is scanned. Next, the red subpixel R9 which commonly has the data line DL1 with the green subpixel G9 in the same row and is disposed in the pixel column different from the pixel column of the green subpixel G9 is scanned. Next, the red subpixel R10 in one-next row of the red subpixel R9 is scanned. Next, the red subpixel R11 in one-next row of the red subpixel R10 is scanned. Next, the red subpixel R12 in one-next row of the red subpixel R11 is scanned. Next, the green subpixel G11 which commonly has the data line DL1 with the red subpixel R11 in the same row and is disposed in the pixel column different from the pixel column of the red subpixel R11 is scanned. Next, the green subpixel G12 in one-next row of the green subpixel G11 is scanned. Next, the green subpixel G13 in one-next row of the green subpixel G12 is scanned. Next, the green subpixel G14 in one-next row of the green subpixel G13 is scanned. Next, the red subpixel R13 which commonly has the data line DL1 with the green subpixel G13 in the same row and is disposed in the pixel column different from the pixel column of the green subpixel G13 is scanned. Next, the red subpixel R14 in one-next row of the red subpixel R13 is scanned. Next, the red subpixel R15 in one-next row of the red subpixel R14 is scanned. Next, the red subpixel R16 in one-next row of the red subpixel R15 is scanned. Next, the green subpixel G15 which commonly has the data line DL1 with the red subpixel R15 in the same row and is disposed in the pixel column different from the pixel column of the red subpixel R15 is scanned. Next, the green subpixel G16 in one-next row of the green subpixel G15 is scanned.

The white subpixels W9 to W16 and the blue subpixels B9 to B16 of the pixel rows 1309 to 1316 are scanned according to a following order. After the blue subpixel B9 is scanned, the blue subpixel B10 in one-next row of the blue subpixel B9 is scanned. Next, the white subpixel W9 which commonly has the data line DL2 with the blue subpixel B9 in the same row and is disposed in the pixel column different from the pixel column of the blue subpixel B9 is scanned. Next, the white subpixel W10 in one-next row of the white subpixel W9 is scanned. Next, the white subpixel W11 in one-next row of the white subpixel W10 is scanned. Next, the white subpixel W12 in one-next row of the white subpixel W11 is scanned. Next, the blue subpixel B11 which commonly has the data line DL2 with the white subpixel W11 in the same row and is disposed in the pixel column different from the pixel column of the white subpixel W11 is scanned. Next, the blue subpixel B12 in one-next row of the blue subpixel B11 is scanned. Next, the blue subpixel B13 in one-next row of the blue subpixel B12 is scanned. Next, the blue subpixel B14 in one-next row of the blue subpixel B13 is scanned. Next, the white subpixel W13 which commonly has the data line DL2 with the blue subpixel B13 in the same row and is disposed in the pixel column different from the pixel column of the blue subpixel B13 is scanned. Next, the white subpixel W14 in one-next row of the white subpixel W13 is scanned. Next, the white subpixel W15 in one-next row of the white subpixel W14 is scanned. Next, the white subpixel W16 in one-next row of the white subpixel W15 is scanned. Next, the blue subpixel B15 which commonly has the data line DL2 with the white subpixel W15 in the same row and is disposed in the pixel column different from the pixel column of the white subpixel W15 is scanned. Next, the blue subpixel B16 in one-next row of the blue subpixel B15 is scanned.

The similarity judging part 550 judges that the image data of the pixel rows 1309 to 1312 are similar to each other. The similarity judging part 550 judges that the image data of the pixel rows 1313 to 1316 are not similar to each other. Based on this judgement, the scheduler 560 generates the input register selection signal IRSS, the input validation signal VALID and the output register selection signal ORSS such that the subpixels of each color are alternately scanned by four rows and transmits the input register selection signal IRSS, the input validation signal VALID and the output register selection signal ORSS to the data driving unit 300. The data driving unit 300 writes the image data to the green subpixels G9 to G16, the red subpixels R9 to R16, the white subpixels W9 to W16 and the blue subpixels B9 to B16 according to an order designated by the received output register selection signal ORSS.

In the display device according to a first aspect of the present disclosure, for the pixel rows 1309 to 1312 and 1313 to 1316 where the image data are similar to each other, since the number of the rows for consecutively scanning the subpixels having the same color increases, the frequency of discontinuity of the signal (voltage) of the outputted image data is reduced. The frequency of discontinuity of the signal (voltage) of the outputted image data is reduced by alternately scanning the subpixels of each color by four rows. For example, in the region of the subpixels as shown in FIG. 21, when the green subpixels G1 to G8 and the red subpixels R1 to R8 connected to the data line DL1 are scanned, the color of the scanned subpixels is changed 8 times. Similarly, in the region of the subpixels as shown in FIG. 21, when the white subpixels W1 to W8 and the blue subpixels B1 to B8 connected to the data line DL2 are scanned, the color of the scanned subpixels is changed 8 times. As a result, when the region of the subpixels of FIG. 21 is scanned, discontinuity of the signal (voltage) of the image data through the data lines DL1 and DL2 occurs 8 times. In the region of the subpixels as shown in FIG. 23, when the green subpixels G9 to G16 and the red subpixels R9 to R16 connected to the data line DL1 are scanned, the color of the scanned subpixels is changed 4 times. Similarly, in the region of the subpixels as shown in FIG. 23, when the white subpixels W9 to W16 and the blue subpixels B9 to B16 connected to the data line DL2 are scanned, the color of the scanned subpixels is changed 4 times. As a result, in the display device according to a first aspect of the present disclosure using the DRD method, the power consumption for writing the image data to the subpixel is reduced.

In the writing operation of the image data to the subpixels of FIG. 23 as compare with the writing operation of the image data to the subpixels of FIG. 21, the writing time difference of the image data to the subpixels in the same row increases. However, since the image data of the pixel rows 1309 to 1312 and the image data of the pixel rows 1313 to 1316 are similar to each other, the influence of the writing time difference of the image data to the subpixels in the same row on the display quality of the region of FIG. 23 is smaller than the influence of the writing time difference of the image data to the subpixels in the same row on the display quality of the region of FIG. 21. Accordingly, in the display device according to a first aspect of the present disclosure using the DRD method, deterioration of the display quality is prevented and the power consumption is reduced.

Figure 24:
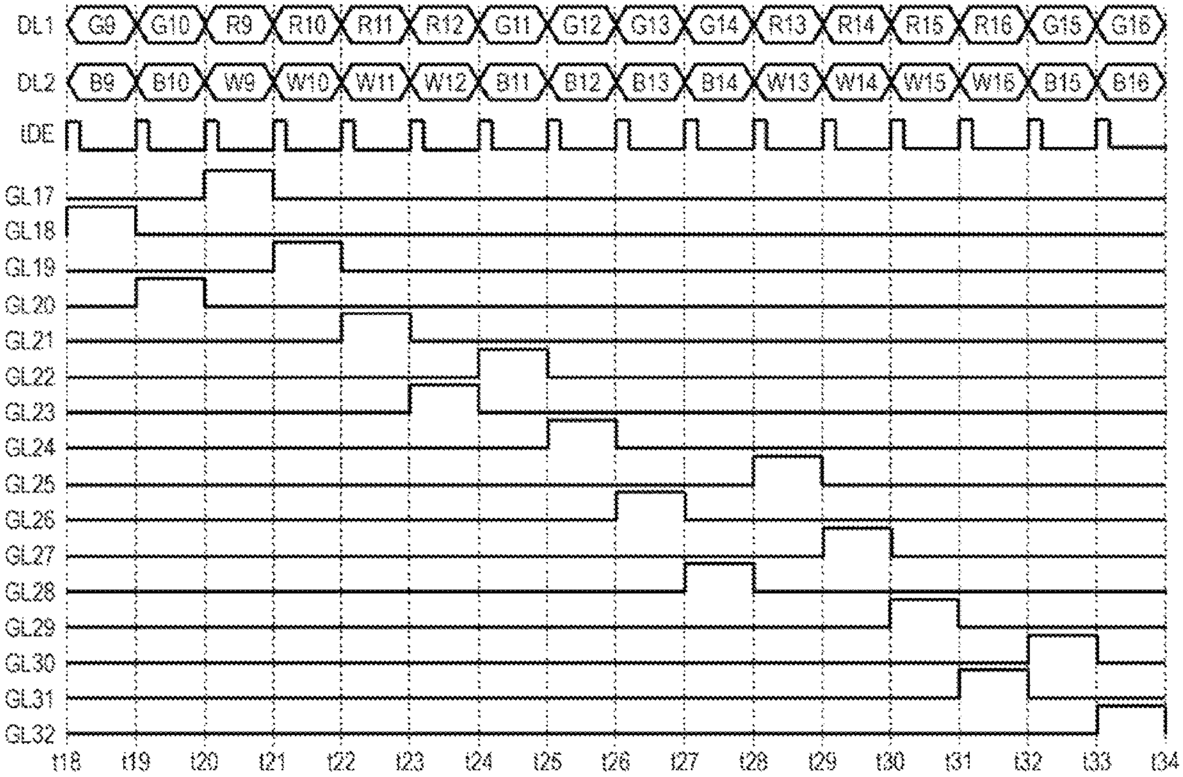
FIG. 24 is a view showing a gate signal of a gate driving unit of a display device according to a first aspect of the present disclosure.

FIG. 24 is a view showing a gate signal of a gate driving unit of a display device according to a first aspect of the present disclosure. FIG. 24 shows the gate signals applied to the gate lines GL17 to GL32 by the gate driving unit 200 when the pixel rows 1309 to 1316 of FIG. 20 are scanned according to an order of FIG. 23.

During a period between timings t18 and t19, the gate signal is applied to the gate line GL18 in synchronization with the modulated data enable tDE. When the gate signal is applied to the gate line GL18, the data signal of the data line DL1 is applied to the first node N1 between the gate of the driving transistor DT of the green subpixel G9 and the first capacitor C1 of the green subpixel G9 through the first switching transistor T1 of the green subpixel G9. The data signal of the data line DL1 corresponds to the image data for the green subpixel G9. Similarly, when the gate signal is applied to the gate line GL18, the data signal of the data line DL2 is applied to the first node N1 between the gate of the driving transistor DT of the blue subpixel B9 and the first capacitor C1 of the blue subpixel B9 through the first switching transistor T1 of the blue subpixel B9. The data signal of the data line DL2 corresponds to the image data for the blue subpixel B9.

During a period between timings t19 and t20, the gate signal is applied to the gate line GL20 in synchronization with the modulated data enable tDE. When the gate signal is applied to the gate line GL20, the data signal of the data line DL1 is applied to the first node N1 between the gate of the driving transistor DT of the green subpixel G10 and the first capacitor C1 of the green subpixel G10 through the first switching transistor T1 of the green subpixel G10. The data signal of the data line DL1 corresponds to the image data for the green subpixel G10. Similarly, when the gate signal is applied to the gate line GL20, the data signal of the data line DL2 is applied to the first node N1 between the gate of the driving transistor DT of the blue subpixel B10 and the first capacitor C1 of the blue subpixel B10 through the first switching transistor T1 of the blue subpixel B10. The data signal of the data line DL2 corresponds to the image data for the blue subpixel B10.

During a period between timings t20 and t21, the gate signal is applied to the gate line GL17 in synchronization with the modulated data enable tDE. When the gate signal is applied to the gate line GL17, the data signal of the data line DL1 is applied to the first node N1 between the gate of the driving transistor DT of the red subpixel R9 and the first capacitor C1 of the red subpixel R9 through the first switching transistor T1 of the red subpixel R9. The data signal of the data line DL1 corresponds to the image data for the red subpixel R9. Similarly, when the gate signal is applied to the gate line GL17, the data signal of the data line DL2 is applied to the first node N1 between the gate of the driving transistor DT of the white subpixel W9 and the first capacitor C1 of the white subpixel W9 through the first switching transistor T1 of the white subpixel W9. The data signal of the data line DL2 corresponds to the image data for the white subpixel W9.

During a period between timings t21 and t22, the gate signal is applied to the gate line GL19 in synchronization with the modulated data enable tDE. When the gate signal is applied to the gate line GL19, the data signal of the data line DL1 is applied to the first node N1 between the gate of the driving transistor DT of the red subpixel R10 and the first capacitor C1 of the red subpixel R10 through the first switching transistor T1 of the red subpixel R10. The data signal of the data line DL1 corresponds to the image data for the red subpixel R10. Similarly, when the gate signal is applied to the gate line GL19, the data signal of the data line DL2 is applied to the first node N1 between the gate of the driving transistor DT of the white subpixel W10 and the first capacitor C1 of the white subpixel W10 through the first switching transistor T1 of the white subpixel W10. The data signal of the data line DL2 corresponds to the image data for the white subpixel W10.

During a period between timings t22 and t23, the gate signal is applied to the gate line GL21 in synchronization with the modulated data enable tDE. When the gate signal is applied to the gate line GL21, the data signal of the data line DL1 is applied to the first node N1 between the gate of the driving transistor DT of the red subpixel R11 and the first capacitor C1 of the red subpixel R11 through the first switching transistor T1 of the red subpixel R11. The data signal of the data line DL1 corresponds to the image data for the red subpixel R11. Similarly, when the gate signal is applied to the gate line GL21, the data signal of the data line DL2 is applied to the first node N1 between the gate of the driving transistor DT of the white subpixel W11 and the first capacitor C1 of the white subpixel W11 through the first switching transistor T1 of the white subpixel W11. The data signal of the data line DL2 corresponds to the image data for the white subpixel W11.

During a period between timings t23 and t24, the gate signal is applied to the gate line GL23 in synchronization with the modulated data enable tDE. When the gate signal is applied to the gate line GL23, the data signal of the data line DL1 is applied to the first node N1 between the gate of the driving transistor DT of the red subpixel R12 and the first capacitor C1 of the red subpixel R12 through the first switching transistor T1 of the red subpixel R12. The data signal of the data line DL1 corresponds to the image data for the red subpixel R12. Similarly, when the gate signal is applied to the gate line GL23, the data signal of the data line DL2 is applied to the first node N1 between the gate of the driving transistor DT of the white subpixel W12 and the first capacitor C1 of the white subpixel W12 through the first switching transistor T1 of the white subpixel W12. The data signal of the data line DL2 corresponds to the image data for the white subpixel W12.

During a period between timings t24 and t25, the gate signal is applied to the gate line GL22 in synchronization with the modulated data enable tDE. When the gate signal is applied to the gate line GL22, the data signal of the data line DL1 is applied to the first node N1 between the gate of the driving transistor DT of the green subpixel G11 and the first capacitor C1 of the green subpixel G11 through the first switching transistor T1 of the green subpixel G11. The data signal of the data line DL1 corresponds to the image data for the green subpixel G11. Similarly, when the gate signal is applied to the gate line GL22, the data signal of the data line DL2 is applied to the first node N1 between the gate of the driving transistor DT of the blue subpixel B11 and the first capacitor C1 of the blue subpixel B11 through the first switching transistor T1 of the blue subpixel B11. The data signal of the data line DL2 corresponds to the image data for the blue subpixel B11.

During a period between timings t25 and t26, the gate signal is applied to the gate line GL24 in synchronization with the modulated data enable tDE. When the gate signal is applied to the gate line GL24, the data signal of the data line DL1 is applied to the first node N1 between the gate of the driving transistor DT of the green subpixel G12 and the first capacitor C1 of the green subpixel G12 through the first switching transistor T1 of the green subpixel G12. The data signal of the data line DL1 corresponds to the image data for the green subpixel G12. Similarly, when the gate signal is applied to the gate line GL24, the data signal of the data line DL2 is applied to the first node N1 between the gate of the driving transistor DT of the blue subpixel B12 and the first capacitor C1 of the blue subpixel B12 through the first switching transistor T1 of the blue subpixel B12. The data signal of the data line DL2 corresponds to the image data for the blue subpixel B12.

During a period between timings t26 and t27, the gate signal is applied to the gate line GL26 in synchronization with the modulated data enable tDE. When the gate signal is applied to the gate line GL26, the data signal of the data line DL1 is applied to the first node N1 between the gate of the driving transistor DT of the green subpixel G13 and the first capacitor C1 of the green subpixel G13 through the first switching transistor T1 of the green subpixel G13. The data signal of the data line DL1 corresponds to the image data for the green subpixel G13. Similarly, when the gate signal is applied to the gate line GL26, the data signal of the data line DL2 is applied to the first node N1 between the gate of the driving transistor DT of the blue subpixel B13 and the first capacitor C1 of the blue subpixel B13 through the first switching transistor T1 of the blue subpixel B13. The data signal of the data line DL2 corresponds to the image data for the blue subpixel B13.

During a period between timings t27 and t28, the gate signal is applied to the gate line GL28 in synchronization with the modulated data enable tDE. When the gate signal is applied to the gate line GL28, the data signal of the data line DL1 is applied to the first node N1 between the gate of the driving transistor DT of the green subpixel G14 and the first capacitor C1 of the green subpixel G14 through the first switching transistor T1 of the green subpixel G14. The data signal of the data line DL1 corresponds to the image data for the green subpixel G14. Similarly, when the gate signal is applied to the gate line GL28, the data signal of the data line DL2 is applied to the first node N1 between the gate of the driving transistor DT of the blue subpixel B14 and the first capacitor C1 of the blue subpixel B14 through the first switching transistor T1 of the blue subpixel B14. The data signal of the data line DL2 corresponds to the image data for the blue subpixel B14.

During a period between timings t28 and t29, the gate signal is applied to the gate line GL25 in synchronization with the modulated data enable tDE. When the gate signal is applied to the gate line GL25, the data signal of the data line DL1 is applied to the first node N1 between the gate of the driving transistor DT of the red subpixel R13 and the first capacitor C1 of the red subpixel R13 through the first switching transistor T1 of the red subpixel R13. The data signal of the data line DL1 corresponds to the image data for the red subpixel R13. Similarly, when the gate signal is applied to the gate line GL25, the data signal of the data line DL2 is applied to the first node N1 between the gate of the driving transistor DT of the white subpixel W13 and the first capacitor C1 of the white subpixel W13 through the first switching transistor T1 of the white subpixel W13. The data signal of the data line DL2 corresponds to the image data for the white subpixel W13.

During a period between timings t29 and t30, the gate signal is applied to the gate line GL27 in synchronization with the modulated data enable tDE. When the gate signal is applied to the gate line GL27, the data signal of the data line DL1 is applied to the first node N1 between the gate of the driving transistor DT of the red subpixel R14 and the first capacitor C1 of the red subpixel R14 through the first switching transistor T1 of the red subpixel R14. The data signal of the data line DL1 corresponds to the image data for the red subpixel R14. Similarly, when the gate signal is applied to the gate line GL27, the data signal of the data line DL2 is applied to the first node N1 between the gate of the driving transistor DT of the white subpixel W14 and the first capacitor C1 of the white subpixel W14 through the first switching transistor T1 of the white subpixel W14. The data signal of the data line DL2 corresponds to the image data for the white subpixel W14.

During a period between timings t30 and t31, the gate signal is applied to the gate line GL29 in synchronization with the modulated data enable tDE. When the gate signal is applied to the gate line GL29, the data signal of the data line DL1 is applied to the first node N1 between the gate of the driving transistor DT of the red subpixel R15 and the first capacitor C1 of the red subpixel R15 through the first switching transistor T1 of the red subpixel R15. The data signal of the data line DL1 corresponds to the image data for the red subpixel R15. Similarly, when the gate signal is applied to the gate line GL29, the data signal of the data line DL2 is applied to the first node N1 between the gate of the driving transistor DT of the white subpixel W15 and the first capacitor C1 of the white subpixel W15 through the first switching transistor T1 of the white subpixel W15. The data signal of the data line DL2 corresponds to the image data for the white subpixel W15.

During a period between timings t31 and t32, the gate signal is applied to the gate line GL31 in synchronization with the modulated data enable tDE. When the gate signal is applied to the gate line GL31, the data signal of the data line DL1 is applied to the first node N1 between the gate of the driving transistor DT of the red subpixel R16 and the first capacitor C1 of the red subpixel R16 through the first switching transistor T1 of the red subpixel R16. The data signal of the data line DL1 corresponds to the image data for the red subpixel R16. Similarly, when the gate signal is applied to the gate line GL31, the data signal of the data line DL2 is applied to the first node N1 between the gate of the driving transistor DT of the white subpixel W16 and the first capacitor C1 of the white subpixel W16 through the first switching transistor T1 of the white subpixel W16. The data signal of the data line DL2 corresponds to the image data for the white subpixel W16.

During a period between timings t32 and t33, the gate signal is applied to the gate line GL30 in synchronization with the modulated data enable tDE. When the gate signal is applied to the gate line GL30, the data signal of the data line DL1 is applied to the first node N1 between the gate of the driving transistor DT of the green subpixel G15 and the first capacitor C1 of the green subpixel G15 through the first switching transistor T1 of the green subpixel G15. The data signal of the data line DL1 corresponds to the image data for the green subpixel G15. Similarly, when the gate signal is applied to the gate line GL30, the data signal of the data line DL2 is applied to the first node N1 between the gate of the driving transistor DT of the blue subpixel B15 and the first capacitor C1 of the blue subpixel B15 through the first switching transistor T1 of the blue subpixel B15. The data signal of the data line DL2 corresponds to the image data for the blue subpixel B15.

During a period between timings t33 and t34, the gate signal is applied to the gate line GL32 in synchronization with the modulated data enable tDE. When the gate signal is applied to the gate line GL32, the data signal of the data line DL1 is applied to the first node N1 between the gate of the driving transistor DT of the green subpixel G16 and the first capacitor C1 of the green subpixel G16 through the first switching transistor T1 of the green subpixel G16. The data signal of the data line DL1 corresponds to the image data for the green subpixel G16. Similarly, when the gate signal is applied to the gate line GL32, the data signal of the data line DL2 is applied to the first node N1 between the gate of the driving transistor DT of the blue subpixel B16 and the first capacitor C1 of the blue subpixel B16 through the first switching transistor T1 of the blue subpixel B16. The data signal of the data line DL2 corresponds to the image data for the blue subpixel B16.

During a period between the timings t18 and t34, the gate driving unit 200 applies the gate signal to the gate lines GL17 to GL34 based on the gate line designation signal GL_Num of the scheduler 560 according to an order as shown in FIG. 24. During a period between the timings t18 and t34, the data driving unit 300 writes the data signal to the green subpixel G and the red subpixel R through the common data line DL1 according to the gate signal applied to the gate lines GL17 to GL32. During a period between the timings t18 and t34, the data driving unit 300 writes the data signal to the white subpixel W and the blue subpixel B through the common data line DL2 according to the gate signal applied to the gate lines GL17 to GL32.

According to the timings of FIG. 24 and the order of FIG. 23, the data driving unit 300 writes the data signal to the green subpixels G9 to G16, the red subpixels R9 to R16, the white subpixels W9 to W16 and the blue subpixels B9 to B16 in the pixel rows 1309 to 1316. When the region of the subpixels of FIG. 23 is scanned, discontinuity of the signal (voltage) of the image data transmitted through each of the data lines DL1 and DL2 may be reduced to 4 times. As a result, in the display device according to a first aspect of the present disclosure using a double rate driving (DRD) method, the power consumption of writing the image data to the subpixels is reduced.

Figure 25:
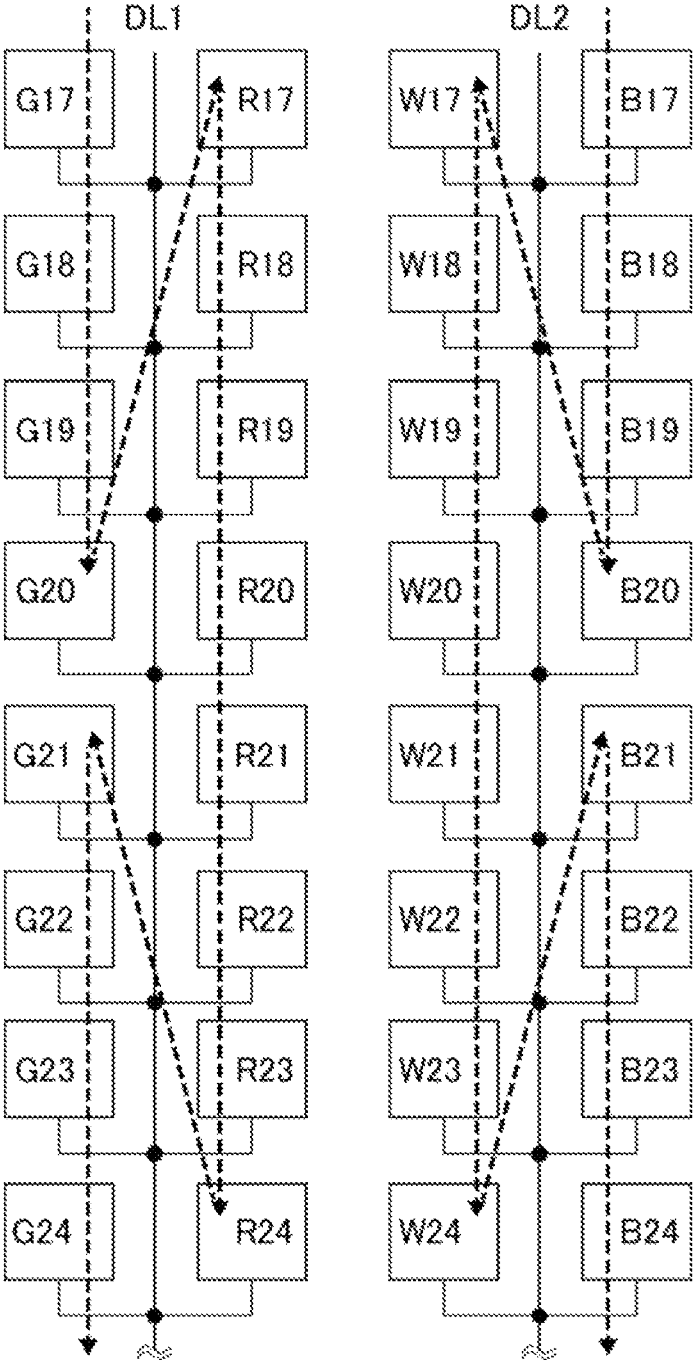
FIG. 25 is a view showing a subpixel scan order of a display device according to a first aspect of the present disclosure.

FIG. 25 is a view showing a subpixel scan order of a display device according to a first aspect of the present disclosure. FIG. 25 shows the subpixels of four columns in the pixel rows 1317 to 1324 of FIG. 20. In FIG. 25, the green subpixels G17 to G24 and the red subpixels R17 to R24 commonly have the data line DL1, and the white subpixels W17 to W24 and the blue subpixels B17 to B24 commonly have the data line DL2. The similarity judging part 550 judges that the image data (image signal) of the pixel rows 1318 to 1324 of the odd column and the even column are similar to the image data of the pixel rows in one-previous row. As a result, the judgement result signals RES_O and RES_E of the pixel rows 1318 to 1324 have a value of 1. Since the image data of the pixel row 1317 of the odd column and the even column are not similar to the image data of the pixel row 1316, the judgement result signals RES_O and RES_E of the pixel rows 1317 have a value of 0. The scheduler 560 generates the input register selection signal IRSS, the input validation signal VALID and the output register selection signal ORSS based on the received judgement result signals RES_O and RES_E. The scheduler 560 transmits the input register selection signal IRSS, the input validation signal VALID and the output register selection signal ORSS to the data driving unit 300. The data driving unit 300 transmits the image data (image signal) to the green subpixels G17 to G24, the red subpixels R17 to R24, the white subpixels W17 to W24 and the blue subpixels B17 to B24 according to an order designated by the received output register selection signal ORSS.

The green subpixels G17 to G24 and the red subpixels R17 to R24 of the pixel rows 1317 to 1324 are scanned according to a following order. After the green subpixel G17 is scanned, the green subpixel G17 in one-next row of the green subpixel G18 is scanned. Next, the green subpixel G18 and the green subpixel G19 in one-next row of the green subpixel G18 are scanned. Next, the green subpixel G20 in one-next row of the green subpixel G19 is scanned. Next, the red subpixel R17 which commonly has the data line DL1 with the green subpixel G17 in the same row and is disposed in the pixel column different from the pixel column of the green subpixel G17 is scanned. Next, the red subpixel R18 in one-next row of the red subpixel R17 is scanned. Next, the red subpixel R19 in one-next row of the red subpixel R18 is scanned. Next, the red subpixel R20 in one-next row of the red subpixel R19 is scanned. Next, the red subpixel R21 in one-next row of the red subpixel R20 is scanned. Next, the red subpixel R22 in one-next row of the red subpixel R21 is scanned. Next, the red subpixel R23 in one-next row of the red subpixel R22 is scanned. Next, the red subpixel R24 in one-next row of the red subpixel R23 is scanned. Next, the green subpixel G21 which commonly has the data line DL1 with the red subpixel R21 in the same row and is disposed in the pixel column different from the pixel column of the red subpixel G21 is scanned. Next, the green subpixel G21 in one-next row of the green subpixel G22 is scanned. Next, the green subpixel G22 in one-next row of the green subpixel G21 is scanned. Next, the green subpixel G23 in one-next row of the green subpixel G22 is scanned. Next, the green subpixel G24 in one-next row of the green subpixel G23 is scanned.

The white subpixels W17 to W24 and the blue subpixels B17 to B24 of the pixel rows 1317 to 1324 are scanned according to a following order. After the blue subpixel B17 is scanned, the blue subpixel B18 in one-next row of the blue subpixel B17 is scanned. Next, the blue subpixel B19 in one-next row of the blue subpixel B18 is scanned. Next, the blue subpixel B20 in one-next row of the blue subpixel B19 is scanned. Next, the white subpixel W17 which commonly has the data line DL2 with the blue subpixel B17 in the same row and is disposed in the pixel column different from the pixel column of the blue subpixel B17 is scanned. Next, the white subpixel W18 in one-next row of the white subpixel W17 is scanned. Next, the white subpixel W19 in one-next row of the white subpixel W18 is scanned. Next, the white subpixel W20 in one-next row of the white subpixel W19 is scanned. Next, the white subpixel W21 in one-next row of the white subpixel W20 is scanned. Next, the white subpixel W22 in one-next row of the white subpixel W21 is scanned. Next, the white subpixel W23 in one-next row of the white subpixel W22 is scanned. Next, the white subpixel W24 in one-next row of the white subpixel W23 is scanned. Next, the blue subpixel B21 which commonly has the data line DL2 with the white subpixel W21 in the same row and is disposed in the pixel column different from the pixel column of the white subpixel W21 is scanned. Next, the blue subpixel B22 in one-next row of the blue subpixel B21 is scanned. Next, the blue subpixel B23 in one-next row of the blue subpixel B22 is scanned. Next, the blue subpixel B24 in one-next row of the blue subpixel B23 is scanned.

The similarity judging part 550 judges that the image data of the pixel rows 1317 to 1324 are similar to each other. Based on this judgement, the scheduler 560 generates the input register selection signal IRSS, the input validation signal VALID and the output register selection signal ORSS such that the subpixels of each color are alternately scanned by eight rows and transmits the input register selection signal IRSS, the input validation signal VALID and the output register selection signal ORSS to the data driving unit 300. The data driving unit 300 writes the image data to the green subpixels G17 to G24, the red subpixels R17 to R24, the white subpixels W17 to W24 and the blue subpixels B17 to B24 according to an order designated by the received output register selection signal ORSS.

In the display device according to a first aspect of the present disclosure, for the pixel rows 1317 to 1324 where the image data are similar to each other, since the number of the rows for consecutively scanning the subpixels having the same color increases, the frequency of discontinuity of the signal (voltage) of the outputted image data is reduced. The frequency of discontinuity of the signal (voltage) of the outputted image data is reduced by alternately scanning the subpixels of each color by eight rows. For example, in the region of the subpixels as shown in FIG. 23, when the green subpixels G9 to G16 and the red subpixels R9 to R16 connected to the data line DL1 are scanned, the color of the scanned subpixels is changed 4 times. Similarly, in the region of the subpixels as shown in FIG. 23, when the white subpixels W9 to W16 and the blue subpixels B9 to B16 connected to the data line DL2 are scanned, the color of the scanned subpixels is changed 4 times. As a result, when the region of the subpixels of FIG. 23 is scanned, discontinuity of the signal (voltage) of the image data through the data lines DL1 and DL2 occurs 4 times. In the region of the subpixels as shown in FIG. 25, when the green subpixels G17 to G24 and the red subpixels R17 to R24 connected to the data line DL1 are scanned, the color of the scanned subpixels is changed 2 times. Similarly, in the region of the subpixels as shown in FIG. 25, when the white subpixels W17 to W24 and the blue subpixels B17 to B24 connected to the data line DL2 are scanned, the color of the scanned subpixels is changed 2 times. As a result, when the region of the subpixels of FIG. 25 is scanned, discontinuity of the signal (voltage) of the image data through the data lines DL1 and DL2 is reduced to 2 times. Accordingly, in the display device according to a first aspect of the present disclosure using the DRD method, the power consumption for writing the image data to the subpixel is reduced.

In the writing operation of the image data to the subpixels of FIG. 25 as compare with the writing operation of the image data to the subpixels of FIGS. 21 and 23, the writing time difference of the image data to the subpixels in the same row increases. However, since the image data of the pixel rows 1317 to 1324 are similar to each other, the influence of the writing time difference of the image data to the subpixels in the same row on the display quality of the region of FIG. 25 is smaller than the influence of the writing time difference of the image data to the subpixels in the same row on the display quality of the region of FIGS. 21 and 23. Accordingly, in the display device 10 according to a first aspect of the present disclosure using the DRD method, deterioration of the display quality is prevented and the power consumption is reduced.

Further, when the display panel 100 displays a static image, deterioration of the display quality according to the writing time difference of the image data to the subpixels in the same row may be negligible. As a result, when the display device 10 displays a static image, the number of the rows for consecutively scanning the subpixels of the same color may be determined to be the same as the number of the pixel rows. For example, when the display device 10 includes the pixel rows of 2160, the subpixels of the same color may be consecutively scanned throughout the rows of 2160. Since the frequency of discontinuity of the signal (voltage) of the outputted image data is further reduced, the power consumption of the display device 10 may be reduced.

Figure 26:
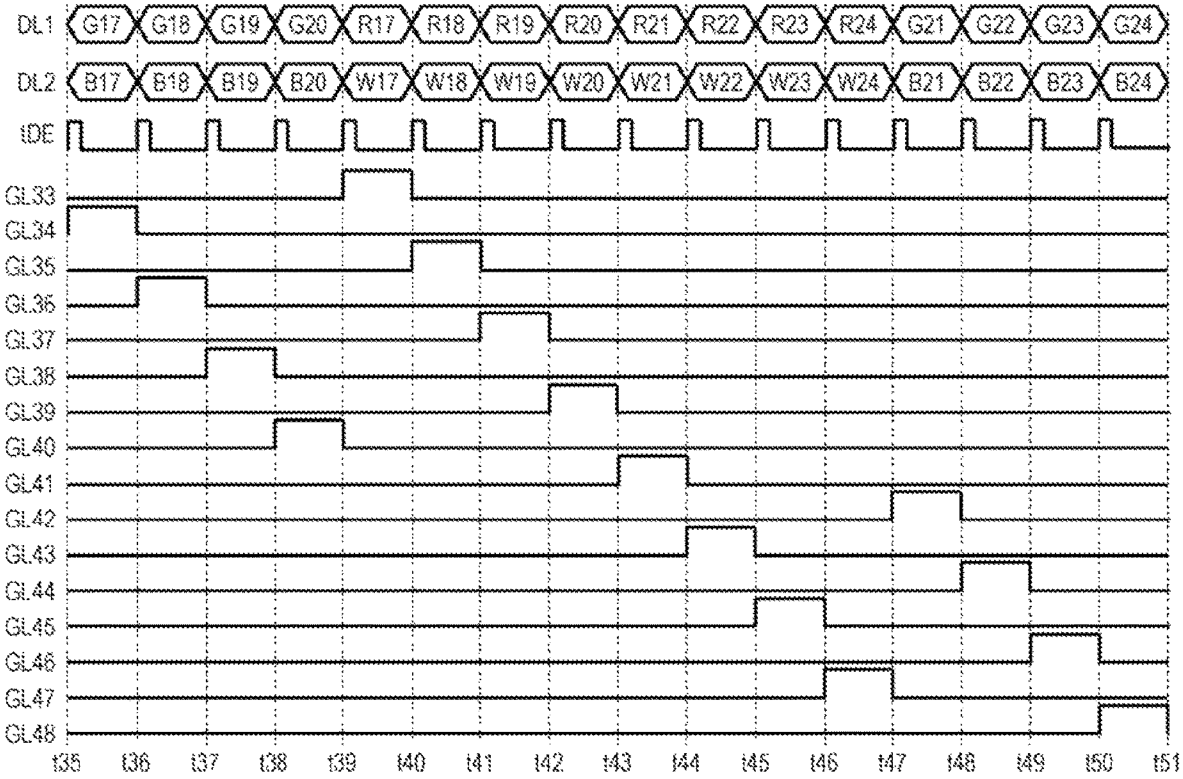
FIG. 26 is a view showing a gate signal of a gate driving unit of a display device according to a first aspect of the present disclosure.

FIG. 26 is a view showing a gate signal of a gate driving unit of a display device according to a first aspect of the present disclosure. FIG. 24 shows the gate signals applied to the gate lines GL33 to GL48 by the gate driving unit 200 when the subpixels of the pixel rows 1317 to 1324 of FIG. 20 are scanned according to an order of FIG. 25.

During a period between timings t35 and t36, the gate signal is applied to the gate line GL34 in synchronization with the modulated data enable tDE. When the gate signal is applied to the gate line GL34, the data signal of the data line DL1 is applied to the first node N1 between the gate of the driving transistor DT of the green subpixel G17 and the first capacitor C1 of the green subpixel G17 through the first switching transistor T1 of the green subpixel G17. The data signal of the data line DL1 corresponds to the image data for the green subpixel G17. Similarly, when the gate signal is applied to the gate line GL34, the data signal of the data line DL2 is applied to the first node N1 between the gate of the driving transistor DT of the blue subpixel B17 and the first capacitor C1 of the blue subpixel B17 through the first switching transistor T1 of the blue subpixel B17. The data signal of the data line DL2 corresponds to the image data for the blue subpixel B17.

During a period between timings t36 and t37, the gate signal is applied to the gate line GL36 in synchronization with the modulated data enable tDE. When the gate signal is applied to the gate line GL36, the data signal of the data line DL1 is applied to the first node N1 between the gate of the driving transistor DT of the green subpixel G18 and the first capacitor C1 of the green subpixel G18 through the first switching transistor T1 of the green subpixel G18. The data signal of the data line DL1 corresponds to the image data for the green subpixel G18. Similarly, when the gate signal is applied to the gate line GL36, the data signal of the data line DL2 is applied to the first node N1 between the gate of the driving transistor DT of the blue subpixel B18 and the first capacitor C1 of the blue subpixel B18 through the first switching transistor T1 of the blue subpixel B18. The data signal of the data line DL2 corresponds to the image data for the blue subpixel B18.

During a period between timings t37 and t38, the gate signal is applied to the gate line GL38 in synchronization with the modulated data enable tDE. When the gate signal is applied to the gate line GL38, the data signal of the data line DL1 is applied to the first node N1 between the gate of the driving transistor DT of the green subpixel G19 and the first capacitor C1 of the green subpixel G19 through the first switching transistor T1 of the green subpixel G19. The data signal of the data line DL1 corresponds to the image data for the green subpixel G19. Similarly, when the gate signal is applied to the gate line GL38, the data signal of the data line DL2 is applied to the first node N1 between the gate of the driving transistor DT of the blue subpixel B19 and the first capacitor C1 of the blue subpixel B19 through the first switching transistor T1 of the blue subpixel B19. The data signal of the data line DL2 corresponds to the image data for the blue subpixel B19.

During a period between timings t38 and t39, the gate signal is applied to the gate line GL40 in synchronization with the modulated data enable tDE. When the gate signal is applied to the gate line GL40, the data signal of the data line DL1 is applied to the first node N1 between the gate of the driving transistor DT of the green subpixel G20 and the first capacitor C1 of the green subpixel G20 through the first switching transistor T1 of the green subpixel G20. The data signal of the data line DL1 corresponds to the image data for the green subpixel G20. Similarly, when the gate signal is applied to the gate line GL40, the data signal of the data line DL2 is applied to the first node N1 between the gate of the driving transistor DT of the blue subpixel B20 and the first capacitor C1 of the blue subpixel B20 through the first switching transistor T1 of the blue subpixel B20. The data signal of the data line DL2 corresponds to the image data for the blue subpixel B20.

During a period between timings t39 and t40, the gate signal is applied to the gate line GL33 in synchronization with the modulated data enable tDE. When the gate signal is applied to the gate line GL33, the data signal of the data line DL1 is applied to the first node N1 between the gate of the driving transistor DT of the red subpixel R17 and the first capacitor C1 of the red subpixel R17 through the first switching transistor T1 of the red subpixel R17. The data signal of the data line DL1 corresponds to the image data for the red subpixel R17. Similarly, when the gate signal is applied to the gate line GL33, the data signal of the data line DL2 is applied to the first node N1 between the gate of the driving transistor DT of the white subpixel W17 and the first capacitor C1 of the white subpixel W17 through the first switching transistor T1 of the white subpixel W17. The data signal of the data line DL2 corresponds to the image data for the white subpixel W17.

During a period between timings t40 and t41, the gate signal is applied to the gate line GL35 in synchronization with the modulated data enable tDE. When the gate signal is applied to the gate line GL35, the data signal of the data line DL1 is applied to the first node N1 between the gate of the driving transistor DT of the red subpixel R18 and the first capacitor C1 of the red subpixel R18 through the first switching transistor T1 of the red subpixel R18. The data signal of the data line DL1 corresponds to the image data for the red subpixel R18. Similarly, when the gate signal is applied to the gate line GL35, the data signal of the data line DL2 is applied to the first node N1 between the gate of the driving transistor DT of the white subpixel W18 and the first capacitor C1 of the white subpixel W18 through the first switching transistor T1 of the white subpixel W18. The data signal of the data line DL2 corresponds to the image data for the white subpixel W18.

During a period between timings t41 and t42, the gate signal is applied to the gate line GL37 in synchronization with the modulated data enable tDE. When the gate signal is applied to the gate line GL37, the data signal of the data line DL1 is applied to the first node N1 between the gate of the driving transistor DT of the red subpixel R19 and the first capacitor C1 of the red subpixel R19 through the first switching transistor T1 of the red subpixel R19. The data signal of the data line DL1 corresponds to the image data for the red subpixel R19. Similarly, when the gate signal is applied to the gate line GL37, the data signal of the data line DL2 is applied to the first node N1 between the gate of the driving transistor DT of the white subpixel W19 and the first capacitor C1 of the white subpixel W19 through the first switching transistor T1 of the white subpixel W19. The data signal of the data line DL2 corresponds to the image data for the white subpixel W19.

During a period between timings t42 and t43, the gate signal is applied to the gate line GL39 in synchronization with the modulated data enable tDE. When the gate signal is applied to the gate line GL39, the data signal of the data line DL1 is applied to the first node N1 between the gate of the driving transistor DT of the red subpixel R20 and the first capacitor C1 of the red subpixel R20 through the first switching transistor T1 of the red subpixel R20. The data signal of the data line DL1 corresponds to the image data for the red subpixel R20. Similarly, when the gate signal is applied to the gate line GL39, the data signal of the data line DL2 is applied to the first node N1 between the gate of the driving transistor DT of the white subpixel W20 and the first capacitor C1 of the white subpixel W20 through the first switching transistor T1 of the white subpixel W20. The data signal of the data line DL2 corresponds to the image data for the white subpixel W20.

During a period between timings t43 and t44, the gate signal is applied to the gate line GL41 in synchronization with the modulated data enable tDE. When the gate signal is applied to the gate line GL41, the data signal of the data line DL1 is applied to the first node N1 between the gate of the driving transistor DT of the red subpixel R21 and the first capacitor C1 of the red subpixel R21 through the first switching transistor T1 of the red subpixel R21. The data signal of the data line DL1 corresponds to the image data for the red subpixel R21. Similarly, when the gate signal is applied to the gate line GL41, the data signal of the data line DL2 is applied to the first node N1 between the gate of the driving transistor DT of the white subpixel W21 and the first capacitor C1 of the white subpixel W21 through the first switching transistor T1 of the white subpixel W21. The data signal of the data line DL2 corresponds to the image data for the white subpixel W21.

During a period between timings t44 and t45, the gate signal is applied to the gate line GL43 in synchronization with the modulated data enable tDE. When the gate signal is applied to the gate line GL43, the data signal of the data line DL1 is applied to the first node N1 between the gate of the driving transistor DT of the red subpixel R22 and the first capacitor C1 of the red subpixel R22 through the first switching transistor T1 of the red subpixel R22. The data signal of the data line DL1 corresponds to the image data for the red subpixel R22. Similarly, when the gate signal is applied to the gate line GL43, the data signal of the data line DL2 is applied to the first node N1 between the gate of the driving transistor DT of the white subpixel W22 and the first capacitor C1 of the white subpixel W22 through the first switching transistor T1 of the white subpixel W22. The data signal of the data line DL2 corresponds to the image data for the white subpixel W22.

During a period between timings t45 and t46, the gate signal is applied to the gate line GL45 in synchronization with the modulated data enable tDE. When the gate signal is applied to the gate line GL45, the data signal of the data line DL1 is applied to the first node N1 between the gate of the driving transistor DT of the red subpixel R23 and the first capacitor C1 of the red subpixel R23 through the first switching transistor T1 of the red subpixel R23. The data signal of the data line DL1 corresponds to the image data for the red subpixel R23. Similarly, when the gate signal is applied to the gate line GL45, the data signal of the data line DL2 is applied to the first node N1 between the gate of the driving transistor DT of the white subpixel W23 and the first capacitor C1 of the white subpixel W23 through the first switching transistor T1 of the white subpixel W23. The data signal of the data line DL2 corresponds to the image data for the white subpixel W23.

During a period between timings t46 and t47, the gate signal is applied to the gate line GL47 in synchronization with the modulated data enable tDE. When the gate signal is applied to the gate line GL47, the data signal of the data line DL1 is applied to the first node N1 between the gate of the driving transistor DT of the red subpixel R24 and the first capacitor C1 of the red subpixel R24 through the first switching transistor T1 of the red subpixel R24. The data signal of the data line DL1 corresponds to the image data for the red subpixel R24. Similarly, when the gate signal is applied to the gate line GL47, the data signal of the data line DL2 is applied to the first node N1 between the gate of the driving transistor DT of the white subpixel W24 and the first capacitor C1 of the white subpixel W24 through the first switching transistor T1 of the white subpixel W24. The data signal of the data line DL2 corresponds to the image data for the white subpixel W24.

During a period between timings t47 and t48, the gate signal is applied to the gate line GL42 in synchronization with the modulated data enable tDE. When the gate signal is applied to the gate line GL42, the data signal of the data line DL1 is applied to the first node N1 between the gate of the driving transistor DT of the green subpixel G21 and the first capacitor C1 of the green subpixel G21 through the first switching transistor T1 of the green subpixel G21. The data signal of the data line DL1 corresponds to the image data for the green subpixel G21. Similarly, when the gate signal is applied to the gate line GL42, the data signal of the data line DL2 is applied to the first node N1 between the gate of the driving transistor DT of the blue subpixel B21 and the first capacitor C1 of the blue subpixel B21 through the first switching transistor T1 of the blue subpixel B21. The data signal of the data line DL2 corresponds to the image data for the blue subpixel B21.

During a period between timings t48 and t49, the gate signal is applied to the gate line GL44 in synchronization with the modulated data enable tDE. When the gate signal is applied to the gate line GL44, the data signal of the data line DL1 is applied to the first node N1 between the gate of the driving transistor DT of the green subpixel G22 and the first capacitor C1 of the green subpixel G22 through the first switching transistor T1 of the green subpixel G22. The data signal of the data line DL1 corresponds to the image data for the green subpixel G22. Similarly, when the gate signal is applied to the gate line GL44, the data signal of the data line DL2 is applied to the first node N1 between the gate of the driving transistor DT of the blue subpixel B22 and the first capacitor C1 of the blue subpixel B22 through the first switching transistor T1 of the blue subpixel B22. The data signal of the data line DL2 corresponds to the image data for the blue subpixel B22.

During a period between timings t49 and t50, the gate signal is applied to the gate line GL46 in synchronization with the modulated data enable tDE. When the gate signal is applied to the gate line GL46, the data signal of the data line DL1 is applied to the first node N1 between the gate of the driving transistor DT of the green subpixel G23 and the first capacitor C1 of the green subpixel G23 through the first switching transistor T1 of the green subpixel G23. The data signal of the data line DL1 corresponds to the image data for the green subpixel G23. Similarly, when the gate signal is applied to the gate line GL46, the data signal of the data line DL2 is applied to the first node N1 between the gate of the driving transistor DT of the blue subpixel B23 and the first capacitor C1 of the blue subpixel B23 through the first switching transistor T1 of the blue subpixel B23. The data signal of the data line DL2 corresponds to the image data for the blue subpixel B23.

During a period between timings t50 and t51, the gate signal is applied to the gate line GL48 in synchronization with the modulated data enable tDE. When the gate signal is applied to the gate line GL48, the data signal of the data line DL1 is applied to the first node N1 between the gate of the driving transistor DT of the green subpixel G24 and the first capacitor C1 of the green subpixel G24 through the first switching transistor T1 of the green subpixel G24. The data signal of the data line DL1 corresponds to the image data for the green subpixel G24. Similarly, when the gate signal is applied to the gate line GL48, the data signal of the data line DL2 is applied to the first node N1 between the gate of the driving transistor DT of the blue subpixel B24 and the first capacitor C1 of the blue subpixel B24 through the first switching transistor T1 of the blue subpixel B24. The data signal of the data line DL2 corresponds to the image data for the blue subpixel B24.

During a period between the timings t35 and t51, the gate driving unit 200 applies the gate signal to the gate lines GL33 to GL48 based on the gate line designation signal GL_Num of the scheduler 560 according to an order as shown in FIG. 25. During a period between the timings t35 and t51, the data driving unit 300 writes the data signal to the green subpixel G and the red subpixel R through the common data line DL1 according to the gate signal applied to the gate lines GL33 to GL48. During a period between the timings t35 and t51, the data driving unit 300 writes the data signal to the white subpixel W and the blue subpixel B through the common data line DL2 according to the gate signal applied to the gate lines GL33 to GL48.

According to the timings of FIG. 26 and the order of FIG. 25, the data driving unit 300 writes the data signal to the green subpixels G17 to G24, the red subpixels R17 to R24, the white subpixels W17 to W24 and the blue subpixels B17 to B24 in the pixel rows 1317 to 1324. When the region of the subpixels of FIG. 25 is scanned, discontinuity of the signal (voltage) of the image data transmitted through each of the data lines DL1 and DL2 may be reduced to 2 times. As a result, in the display device according to a first aspect of the present disclosure using a double rate driving (DRD) method, the power consumption of writing the image data to the subpixels is reduced.

Figure 27:
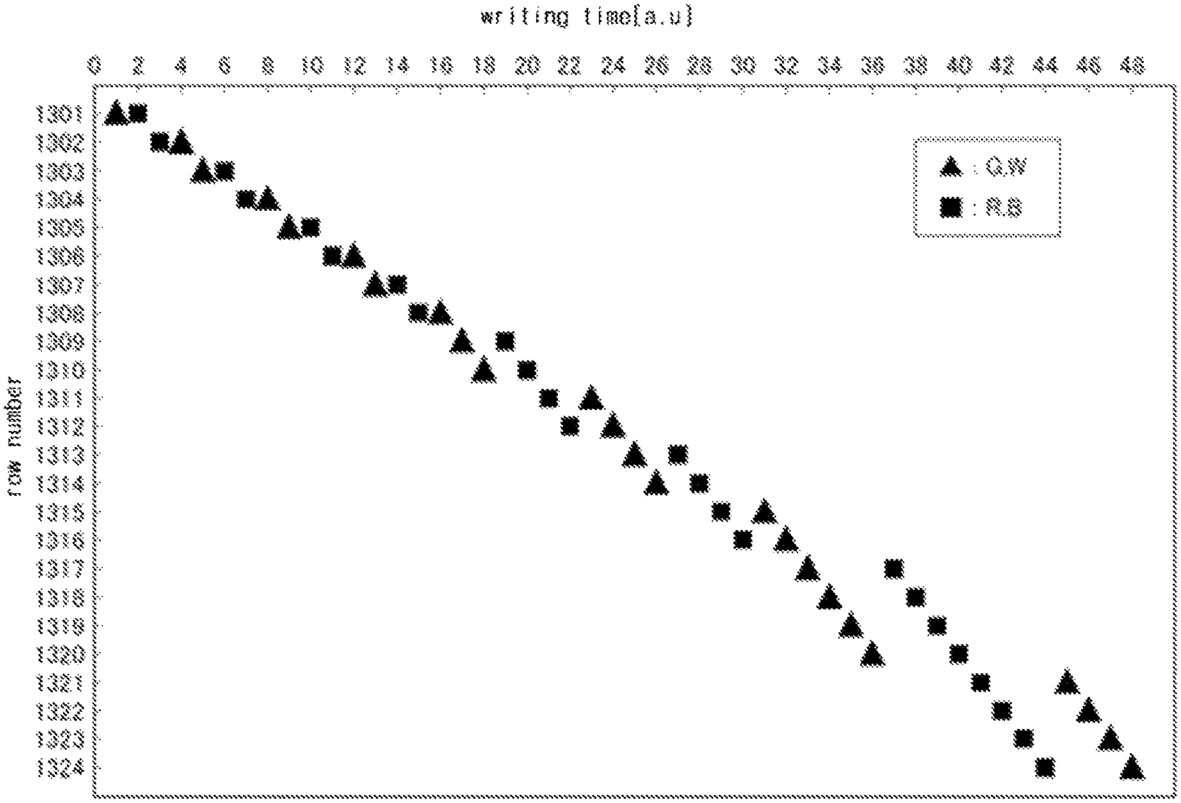
FIG. 27 is a view showing a scanning time and a subpixel row of display device according to a first aspect of the present disclosure.

FIG. 27 is a view showing a scanning time and a subpixel row of display device according to a first aspect of the present disclosure. FIG. 27 shows the scanning time and the subpixel row where writing of the data signal is performed when the image of FIG. 20 is displayed.

The similarity judging part 550 judges that the image data of the pixel rows 1301 to 1308 are not similar to each other. Based on this judgement, the data driving unit 300 alternately scans the green subpixel G and the red subpixel R by two rows in the pixel rows 1301 to 1308. Similarly, the data driving unit 300 alternately scans the white subpixel W and the blue subpixel B by two rows in the pixel rows 1301 to 1308. As a result, in the region of the pixel rows 1301 to 1308, the writing time difference of the image data between the green subpixel G and the red subpixel R in the same row is about 1 [a.u. (arbitrary unit)] as shown in FIG. 27. Similarly, in the region of the pixel rows 1301 to 1308, the writing time difference of the image data between the white subpixel W and the blue subpixel B in the same row is about 1 [a.u.] as shown in FIG. 27.

The similarity judging part 550 judges that the image data of the pixel rows 1309 to 1312 and the pixel rows 1313 to 1316 are similar to each other. Based on this judgement, the data driving unit 300 alternately scans the green subpixel G and the red subpixel R by four rows in the pixel rows 1309 to 1316. Similarly, the data driving unit 300 alternately scans the white subpixel W and the blue subpixel B by four rows in the pixel rows 1309 to 1316. As a result, in the region of the pixel rows 1309 to 1316, the writing time difference of the image data between the green subpixel G and the red subpixel R in the same row is about 2 [a.u.] as shown in FIG. 27. Similarly, in the region of the pixel rows 1309 to 1316, the writing time difference of the image data between the white subpixel W and the blue subpixel B in the same row is about 2 [a.u.] as shown in FIG. 27.

The similarity judging part 550 judges that the image data of the pixel rows 1317 to 1324 are similar to each other. Based on this judgement, the data driving unit 300 alternately scans the green subpixel G and the red subpixel R by eight rows in the pixel rows 1317 to 1324. Similarly, the data driving unit 300 alternately scans the white subpixel W and the blue subpixel B by eight rows in the pixel rows 1317 to 1324. As a result, in the region of the pixel rows 1317 to 1324, the writing time difference of the image data between the green subpixel G and the red subpixel R in the same row is about 4 [a.u.] as shown in FIG. 27. Similarly, in the region of the pixel rows 1317 to 1324, the writing time difference of the image data between the white subpixel W and the blue subpixel B in the same row is about 4 [a.u.] as shown in FIG. 27.

In the display device 10 according to a first aspect of the present disclosure, the similarity of the image data between the pixel rows are judged, and the number of the rows for consecutively scanning the subpixels of the same color is determined based on the judged similarity. In the region where the image data between the pixel rows are not similar to each other, the number of the rows for consecutively scanning the subpixels of the same color is determined to be relatively small. As a result, the writing time difference of the image data of the subpixels connected to the common data line in the same row and having different colors is reduced. Accordingly, in the display device according to a first aspect of the present disclosure using the DRD method, deterioration of the display quality due to the writing time difference of the image data between the subpixels in the same row for the region where the image data of the pixel rows are not similar to each other is prevented. In the region where the image data of the pixel rows are similar to each other, the influence of the writing time difference of the image data to the subpixels in the same row on the display quality is relatively small. As a result, in the region where the image data of the pixel rows are similar to each other, the number of the rows for consecutively scanning the subpixels of the same color is determined to be relatively great. In the region where the image data of the pixel rows are similar to each other, discontinuity of the signal (voltage) of the image data transmitted through the data line is reduced. Accordingly, in the display device according to a first aspect of the present disclosure using the DRD method, reduction of the display quality is prevented and the power consumption is reduced.

A variation of the similarity judging part 550 will be illustrated hereinafter. Illustration on parts of the first difference calculating part 551, the second difference calculating part 552, the first integrating part 553, the second integrating part 554, the first threshold judging part 557, the second threshold judging part 558 and the reset judging part 559 having the same structure and the same function as those of a first aspect may be omitted.

Figure 28:
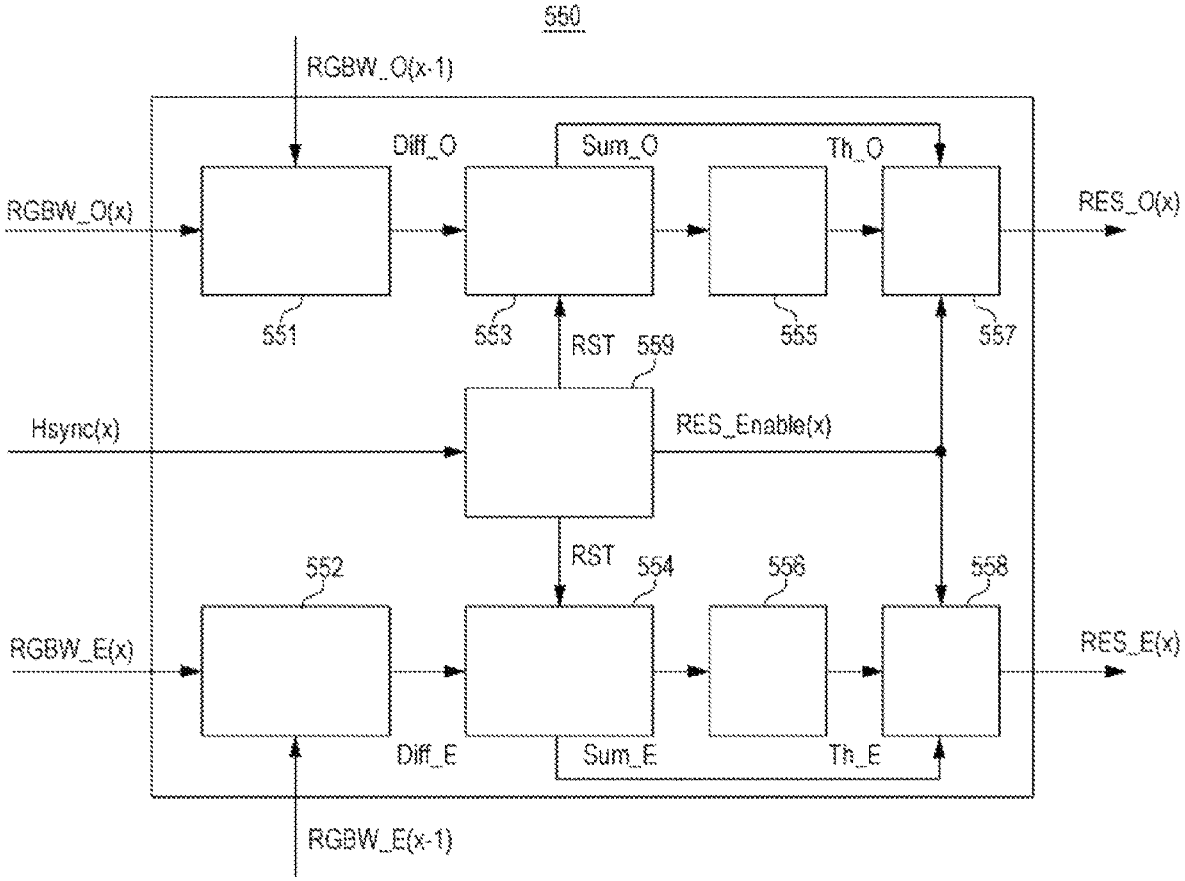
FIG. 28 is a view showing a similarity judging part of a display device according to a fourth aspect of the present disclosure.

FIG. 28 is a view showing a similarity judging part of a display device according to a fourth aspect of the present disclosure. A similarity judging part 550 further includes a first threshold adjusting part 555 and a second threshold adjusting part 556.

The first threshold adjusting part 555 receives an integration value Sum_O of a difference between an RGBW value of an xth row of an odd column and an RGBW value of an (x−1)th row of an odd column from the first integrating part 553. The first threshold adjusting part 555 adjusts a threshold value of the first threshold judging part 557 based on the received integration value Sum_O. For example, the first threshold adjusting part 555 adjusts the threshold value of the first threshold judging part 557 to an optimum value using a machine learning method based on a pre-trained model using a learning data and a classification method according to a clustering analysis obtaining an optimum threshold value from the integration value inputted to the similarity judging part 550. The first threshold adjusting part 555 transmits the adjusted threshold value Th_O of the optimum value to the first threshold judging part 557. When the received integration value Sum_O is judged to be smaller than the adjusted threshold value Th_O of the optimum value, the first threshold judging part 557 judges that the image data of the xth row of the odd column is similar to the image data of the (x−1)th row of the odd column. When the received integration value Sum_O is judged to be equal to or greater than the adjusted threshold value Th_O of the optimum value, the first threshold judging part 557 judges that the image data of the xth row of the odd column is not similar to the image data of the (x−1)th row of the odd column.

The second threshold adjusting part 556 receives an integration value Sum_E of a difference between an RGBW value of an xth row of an even column and an RGBW value of an (x−1)th row of an even column from the second integrating part 554. The second threshold adjusting part 556 adjusts a threshold value of the second threshold judging part 558 based on the received integration value Sum_E. For example, the second threshold adjusting part 556 adjusts the threshold value of the second threshold judging part 558 to an optimum value using a machine learning method based on a pre-trained model using a learning data and a classification method according to a clustering analysis obtaining an optimum threshold value from the integration value inputted to the similarity judging part 550. The second threshold adjusting part 556 transmits the adjusted threshold value Th_E of the optimum value to the second threshold judging part 558. When the received integration value Sum_E is judged to be smaller than the adjusted threshold value Th_E of the optimum value, the second threshold judging part 558 judges that the image data of the xth row of the even column is similar to the image data of the (x−1)th row of the even column. When the received integration value Sum_E is judged to be equal to or greater than the adjusted threshold value Th_E of the optimum value, the second threshold judging part 558 judges that the image data of the xth row of the even column is not similar to the image data of the (x−1)th row of the even column.

Although the similarity judging part 550 includes the first threshold adjusting part 555 and the second threshold adjusting part 556 in the display device according to a second aspect, it is not limited thereto. For example, the first threshold adjusting part 555 and the second threshold adjusting part 556 may be formed as a single threshold adjusting part. The single threshold adjusting part receives the integration values Sum_O and Sum_E of the difference of the odd column and the even column from the first integrating part 553 and the second integrating part 554. The single threshold adjusting part adjusts the threshold values of the first threshold adjusting part 557 and the second threshold adjusting part 558 based on the received integration values. The single threshold adjusting part transmits the threshold values Th_O and Th_E of an optimum value to the first threshold adjusting part 557 and the second threshold adjusting part 558.

Figure 29:
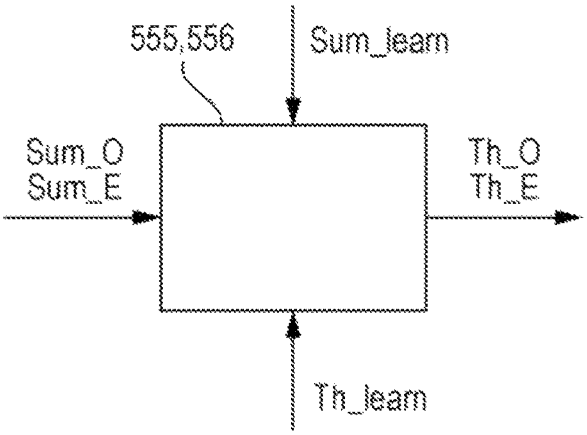
FIG. 29 is a view showing a first threshold adjusting part 555 and a second threshold adjusting part of a display device according to a fourth aspect of the present disclosure.

FIG. 29 is a view showing a first threshold adjusting part 555 and a second threshold adjusting part of a display device according to a fourth aspect of the present disclosure. In FIG. 29, the first threshold adjusting part 555 includes a neural network receiving a learning integration value Sum_learn, a learning threshold value Th_learn and an integration value Sum_O of the difference between the RGBW value of the xth row of the odd column and the RGBW value of the (x−1) th row of the odd column. For example, the first threshold adjusting part 555 calculates the learning integration value Sum_learn, the learning threshold value Th_learn and the integration value Sum_O from the various image data and reads the calculated values as a learning data. The first threshold adjusting part 555 generates the pre-trained model by assigning a weight to the received learning data. The first threshold adjusting part 555 adjusts the threshold value of the first threshold judging part 557 to a threshold value Th_O of an optimum value based on the generated pre-trained model. Similarly, the second threshold adjusting part 556 includes a neural network receiving a learning integration value Sum_learn, a learning threshold value Th_learn and an integration value Sum_O of the difference between the RGBW value of the xth row of the even column and the RGBW value of the (x−1) th row of the even column. For example, the second threshold adjusting part 556 calculates the learning integration value Sum_learn, the learning threshold value Th_learn and the integration value Sum_E from the various image data and reads the calculated values as a learning data. The second threshold adjusting part 556 generates the pre-trained model by assigning a weight to the received learning data. The second threshold adjusting part 556 adjusts the threshold value of the second threshold judging part 558 to a threshold value Th_E of an optimum value based on the generated pre-trained model.

Figure 30:
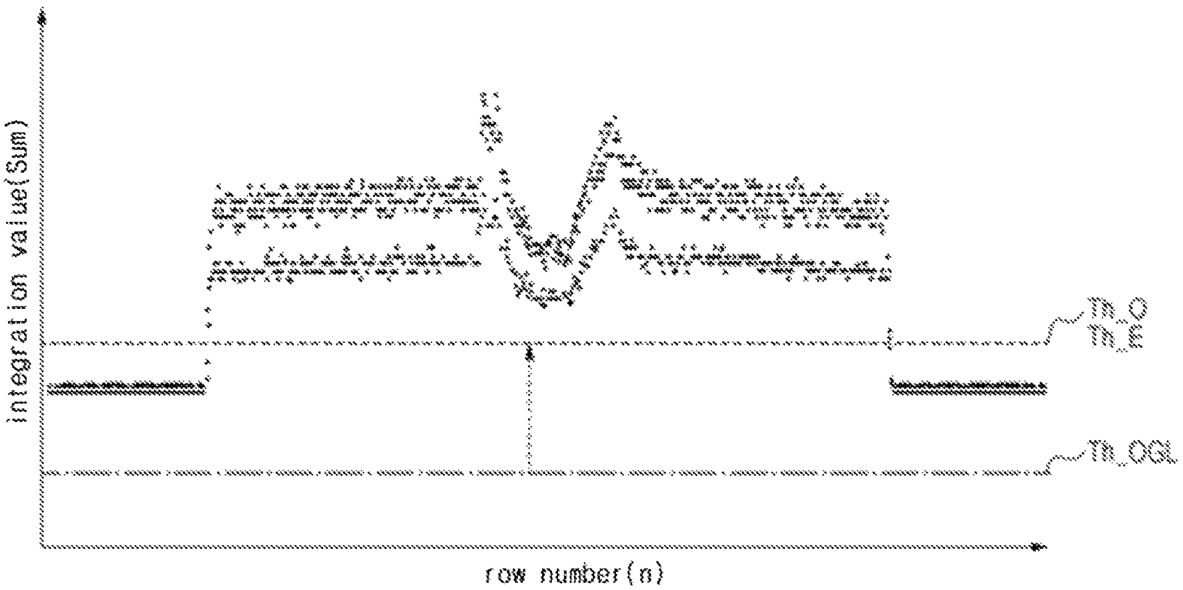
FIG. 30 is a view showing a threshold value adjusted by a similarity judging part of a display device according to a fourth aspect of the present disclosure.

FIG. 30 is a view showing a threshold value adjusted by a similarity judging part of a display device according to a fourth aspect of the present disclosure. In FIG. 30, the integration value SUM of the difference of the RGBW value between the rows of the upper portion and the lower portion of the display panel 100 is relatively smaller than the integration value SUM of the difference of the RGBW value between the rows of the central portion of the display panel 100. The image data between the rows of the upper portion and the lower portion of the display panel 100 is similar to the image data between the rows of the central portion of the display panel 100. The first threshold judging part 557 and the second threshold judging part 558 have a predetermined threshold value Th_OGL smaller than the integration value SUM of the difference of the upper portion and the lower portion of the display panel 100. When the threshold value is not adjusted, the first threshold judging part 557 and the second threshold judging part 558 judge based on the predetermined threshold value Th_OGL that the image data written in each row of the display panel 100 are not similar to each other throughout the entire region. Based on the judgement of the first threshold judging part 557 and the second threshold judging part 558, the scheduler 560 transmits the input register selection signal IRSS, the input validation signal VALID and the output register selection signal ORSS to the data driving unit 300 such that deterioration of the display quality is prevented by reducing the number of the rows for consecutively scanning the subpixels of the same color. As a result, the frequency of discontinuity of the signal (voltage) of the outputted image data increases and the power consumption of the display device 10 increases.

The first threshold adjusting part 555 and the second threshold adjusting part 556 of the similarity judging part 550 adjust the predetermined threshold value Th_OGL of the first threshold judging part 557 and the second threshold judging part 558 to the threshold values Th_O and Th_E, respectively, of an optimum value based on the pre-trained model generated using the learning data. As a result that the predetermined threshold value Th_OGL is adjusted to the threshold values Th_O and Th_E of an optimum value by the first threshold adjusting part 555 and the second threshold adjusting part 556, the first threshold judging part 557 and the second threshold judging part 558 judge that the image data between the rows of the upper portion and the lower portion of the display panel 100 are similar to each other. Based on the judgement of the first threshold judging part 557 and the second threshold judging part 558, the scheduler 560 transmits the input register selection signal IRSS, the input validation signal VALID and the output register selection signal ORSS to the data driving unit 300 such that the power consumption is reduced by increasing the number of the rows for consecutively scanning the subpixels of the same color. As a result, the frequency of discontinuity of the signal (voltage) of the outputted image data is reduced and the power consumption of the display device 10 is reduced. Accordingly, in the display device according to a fourth aspect of the present disclosure using a double rate driving (DRD) method, the power consumption of writing the image data to the subpixels is further reduced.

A variation of the similarity judging part 550 will be illustrated hereinafter. Illustration on parts of the first difference calculating part 551, the second difference calculating part 552, the first integrating part 553, the second integrating part 554, the first threshold judging part 557, the second threshold judging part 558 and the reset judging part 559 having the same structure and the same function as those of a first aspect may be omitted.

Figure 31:
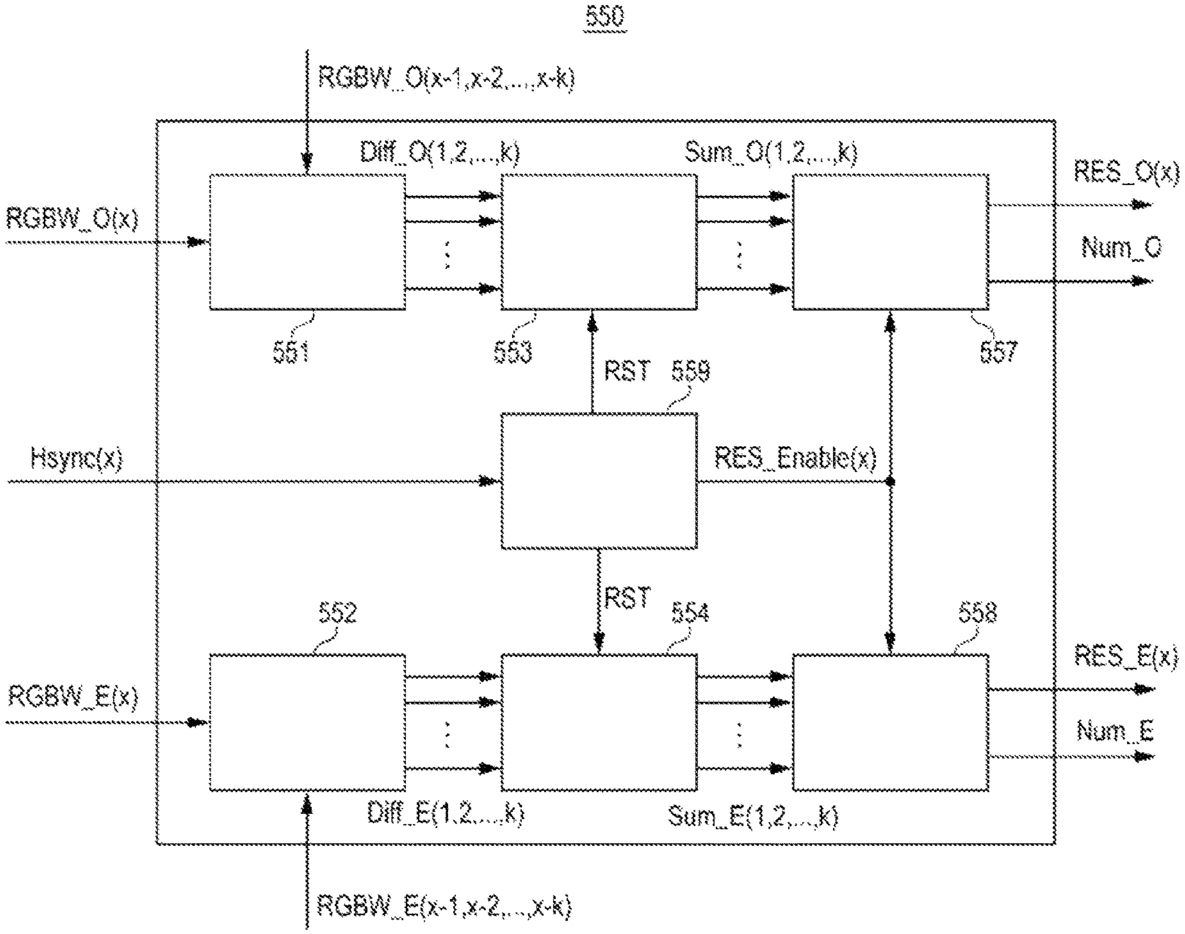
FIG. 31 is a view showing a similarity judging part of a display device according to a fifth aspect of the present disclosure.

FIG. 31 is a view showing a similarity judging part of a display device according to a fifth aspect of the present disclosure. A similarity judging part 550 includes a first difference calculating part 551, a second difference calculating part 552, a first integrating part 553, a second integrating part 554, a first threshold judging part 557, a second threshold judging part 558 and a reset judging part 559.

The first difference calculating part 551 receives an image data RGBW_O(x) of an xth row of subpixels P in an odd column from a row memory 520. The first difference calculating part 551 receives an image data RGBW_O(x−1, x−2, . . . , x−k) of an (x−1)th row to an (x−k)th row of the subpixels in an odd column from the row memory 520 (k is a positive integer smaller than x). The image data RGBW_O (x−1, x−2, . . . , x−k) are one row previous to k row previous to the image data RGBW_O(x). For example, the image data RGBW_O(x−1, x−2, . . . , x−k) are RGBW values of the image data written to green subpixels G and white subpixels W in the (x−1)th row to the (x-k)th row. The first difference calculating part 551 calculates a difference Diff_O(1) between the image data RGBW_O(x) of the xth row and the image data RGBW_O(x−1) of the (x−1)th row and transmits a calculation result to the first integrating part 553. The first difference calculating part 551 calculates differences Diff_O (2) to Diff_O(k) between the image data RGBW_O(x) of the xth row and the image data RGBW_O(x−2) of the (x−2)th row to between the image data RGBW_O(x) of the xth row and the image data RGBW_O(x−k) of the (x−k)th row and transmits calculation results to the first integrating part 553.

The first integrating part 553 receives the differences Diff_O(1) to Diff_O(k) between the RGBW value of the xth row and the RGBW value of the (x−1)th row to between the RGBW value of the xth row and the RGBW value of the (x−k)th row in the odd column from the first difference calculating part 551. The first integrating part 553 integrates the differences of the image data in the odd column received from the first difference calculating part 551. For example, when the number of the subpixel columns in the odd column of the display panel 100 is m, the first integrating part 553 receives the (m−1) differences corresponding to the odd column with respect to the difference between the RGBW value of the xth row and the RGBW value of the (x−1)th row from the first difference calculating part 551. The first integrating part 553 integrates the differences between the RGBW value of the xth row and the RGBW value of the (x−1)th row received from the first difference calculating part 551 with respect to the (m−1) columns. The first integrating part 553 transmits an integration value Sum_O (1) obtained by integrating the differences to the first threshold judging part 557. The first integrating part 553 receives the (m−1) differences between the RGBW value of the xth row and the RGBW value of the (x−2)th row to between the RGBW value of the xth row and the RGBW value of the (x−k)th row in the odd column from the first difference calculating part 551. The first integrating part 553 integrates the differences between the RGBW value of the xth row and the RGBW value of the (x−2)th row to between the RGBW value of the xth row and the RGBW value of the (x−k)th row received from the first difference calculating part 551 with respect to the (m−1) columns. The first integrating part 553 transmits integration values Sum_O(2) to Sum_O(k) obtained by integrating the differences to the first threshold judging part 557.

The first threshold judging part 557 receives the integration values Sum_O(1) to Sum_O(k) of the differences Diff_O between the RGBW value of the xth row in the odd column and the RGBW value of the (x−1)th row in the odd column to between the RGBW value of the xth row in the odd column and the RGBW value of the (x−k)th row in the odd column from the first integrating part 553. When an integration value of a row is smaller than a predetermined threshold value, the first threshold judging part 557 judges that the image data of the xth row in the odd column is similar to the image data of the corresponding row in the odd column. For example, when the integration value Sum_O(k) is smaller than the predetermined threshold value, the first threshold judging part 557 judges that the image data of the xth row in the odd column is similar to the image data of the (x−k)th row in the odd column. When an integration value of a row is equal to or greater than a predetermined threshold value, the first threshold judging part 557 judges that the image data of the xth row in the odd column is not similar to the image data of the corresponding row in the odd column. For example, when the integration value Sum_O(k) is equal to or greater than the predetermined threshold value, the first threshold judging part 557 judges that the image data of the xth row in the odd column is not similar to the image data of the (x−k)th row in the odd column. The first threshold judging part 557 transmits a judgement result signal RES_O(x) to the scheduler 560. When the image data of the corresponding row in the odd column is similar to the image data of the xth row in the odd column, the first threshold judging part 557 transmits a row designation signal Num_O with the judgement result signal RES_O(x).

The second difference calculating part 552 receives an image data RGBW_E(x) of an xth row of subpixels P in an even column from a row memory 520. The second difference calculating part 552 receives an image data RGBW_E (x−1, x−2, . . . , x−k) of an (x−1)th row to an (x-k)th row of the subpixels in an even column from the row memory 520 (k is a positive integer smaller than x). The image data RGBW_E(x−1, x−2, . . . , x−k) are one row previous to k row previous to the image data RGBW_E(x). For example, the image data RGBW_E(x−1, x−2, . . . , x−k) are RGBW values of the image data written to red subpixels R and blue subpixels B in the (x−1)th row to the (x−k)th row. The second difference calculating part 552 calculates a difference Diff_E(1) between the image data RGBW_E(x) of the xth row and the image data RGBW_E(x−1) of the (x−1)th row and transmits a calculation result to the second integrating part 554. The second difference calculating part 552 calculates differences Diff_E(2) to Diff_E(k) between the image data RGBW_E(x) of the xth row and the image data RGBW_E(x−2) of the (x−2)th row to between the image data RGBW_E(x) of the xth row and the image data RGBW_E(x−k) of the (x−k)th row and transmits calculation results to the second integrating part 554.

The second integrating part 554 receives the differences Diff_E(1) to Diff_E(k) between the RGBW value of the xth row and the RGBW value of the (x−1)th row to between the RGBW value of the xth row and the RGBW value of the (x−k)th row in the even column from the second difference calculating part 552. The second integrating part 554 integrates the differences of the image data in the even column received from the second difference calculating part 552. For example, when the number of the subpixel columns in the even column of the display panel 100 is m, the second integrating part 554 receives the (m−1) differences corresponding to the even column with respect to the difference between the RGBW value of the xth row and the RGBW value of the (x−1)th row from the second difference calculating part 552. The second integrating part 554 integrates the differences between the RGBW value of the xth row and the RGBW value of the (x−1)th row received from the second difference calculating part 552 with respect to the (m−1) columns. The second integrating part 554 transmits an integration value Sum_E(1) obtained by integrating the differences to the second threshold judging part 558. The second integrating part 554 receives the (m−1) differences between the RGBW value of the xth row and the RGBW value of the (x−2)th row to between the RGBW value of the xth row and the RGBW value of the (x−k)th row in the even column from the second difference calculating part 552. The second integrating part 554 integrates the differences between the RGBW value of the xth row and the RGBW value of the (x−2)th row to between the RGBW value of the xth row and the RGBW value of the (x−k)th row received from the second difference calculating part 552 with respect to the (m−1) columns. The second integrating part 554 transmits integration values Sum_E(2) to Sum_E(k) obtained by integrating the differences to the second threshold judging part 558.

The second threshold judging part 558 receives the integration values Sum_E(1) to Sum_E(k) of the differences Diff_E between the RGBW value of the xth row in the even column and the RGBW value of the (x−1)th row in the even column to between the RGBW value of the xth row in the even column and the RGBW value of the (x−k)th row in the even column from the second integrating part 554. When an integration value of a row is smaller than a predetermined threshold value, the second threshold judging part 558 judges that the image data of the xth row in the even column is similar to the image data of the corresponding row in the even column. For example, when the integration value Sum_E(k) is smaller than the predetermined threshold value, the second threshold judging part 558 judges that the image data of the xth row in the even column is similar to the image data of the (x−k)th row in the even column. When an integration value of a row is equal to or greater than a predetermined threshold value, the second threshold judging part 558 judges that the image data of the xth row in the even column is not similar to the image data of the corresponding row in the even column. For example, when the integration value Sum_E(k) is equal to or greater than the predetermined threshold value, the second threshold judging part 558 judges that the image data of the xth row in the even column is not similar to the image data of the (x−k)th row in the even column. The second threshold judging part 558 transmits a judgement result signal RES_E(x) to the scheduler 560. When the image data of the corresponding row in the even column is similar to the image data of the xth row in the even column, the second threshold judging part 558 transmits a row designation signal Num_E with the judgement result signal RES_E(x).

Figure 32:
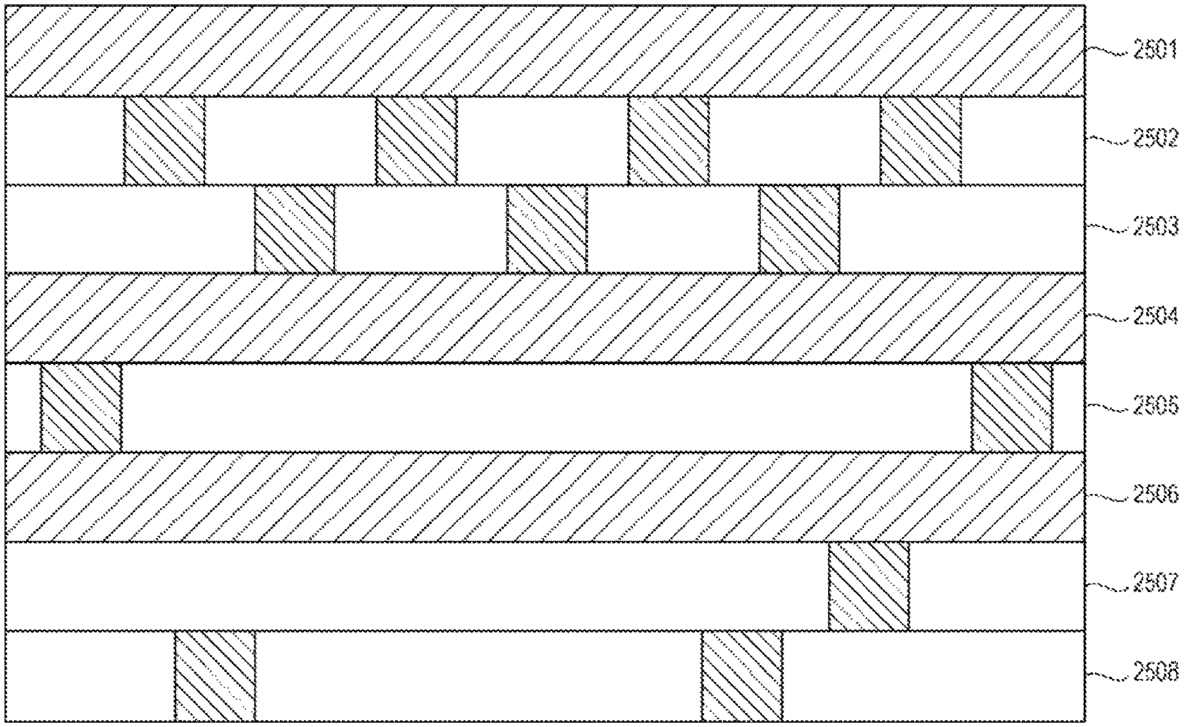
FIG. 32 is a view showing an image displayed by a display device according to a fourth aspect of the present disclosure.

A subpixel scan order converted based on the image displayed by the display device 10 will be illustrated hereinafter. FIG. 32 is a view showing an image displayed by a display device according to a fourth aspect of the present disclosure. In FIG. 32, the display panel 100 of the display device 10 displays an image using the plurality of pixel rows 2501 to 2508. The similarity judging part 550 judges that the image data written in the subpixels of the odd column of the pixel row 2504 is similar to the image data written in the subpixels of the odd column of the three-previous pixel row. The similarity judging part 550 judges that the image data written in the subpixels of the odd column of the pixel row 2506 is similar to the image data written in the subpixels of the odd column of the two-previous pixel row 2504. The similarity judging part 550 judges that the image data written in the subpixels of the odd column and the even column of the pixel rows 2502, 2503, 2505, 2507 and 2508 are not similar to the image data written in the subpixels of the odd column and the even column of the other pixel rows.

FIG. 33 is a view showing input signals to a scheduler of a display device according to a fourth aspect of the present disclosure. FIG. 33 shows the judgement result signals RES_O and RES_E and the row designation signals Num_O and Num_E inputted from the similarity judging part 550 to the scheduler 560 with respect to pixel rows 2501 to 2508. In FIG. 33, the similarity judging part 550 transmits the judgement result signal RES_O of 1 for the pixel rows 2504 and 2506 to the scheduler 560. The similarity judging part 550 transmits the row designation signal Num_O designating the row having the similar image data with the judgement result signal RES_O for the pixel rows 2504 and 2506. The similarity judging part 550 transmits the judgement result that the image data written in the subpixels of the odd column of the pixel row 2504 is similar to the image data written in the subpixels of the odd column of the pixel row 2501 to the scheduler 560. The similarity judging part 550 transmits the judgement result that the image data written in the subpixels of the odd column of the pixel row 2506 is similar to the image data written in the subpixels of the odd column of the pixel row 2504 to the scheduler 560. The similarity judging part 550 transmits the judgement result signals RES_O and RES_E of 0 except for the judgement result signal RES_O for the pixel rows 2504 and 2506 to the scheduler 560. The similarity judging part 550 transmits the judgement result that the image data except for the image data written in the subpixels of the odd column of the pixel rows 2504 and 2506 are not similar to the image data of the other pixel rows to the scheduler 560.

The scheduler 560 receives the judgement result signals RES_O and RES_E and the row designation signals Num_O and Num_E from the similarity judging part 550. The scheduler 560 generates the input register selection signal IRSS, the input validation signal VALID, the output register selection signal ORSS and the gate line designation signal GL_Num based on the judgement result signals RES_O and RES_E and the row designation signals Num_O and Num_E. The scheduler 560 transmits the input register selection signal IRSS, the input validation signal VALID and the output register selection signal ORSS to the data driving unit 300 and transmits the gate line designation signal GL_Num to the signal modulating part 510. The gate driving unit 200 applies the gate signal to the gate lines GL according to an order based on the gate line designation signal GL_Num. The data driving unit 300 transmits the image data to the subpixel through the data line DL according to an order that is in synchronization with the gate signal from the gate driving unit 200 based on the output register selection signal ORSS and is designated by the output register selection signal ORSS.

Figure 34:
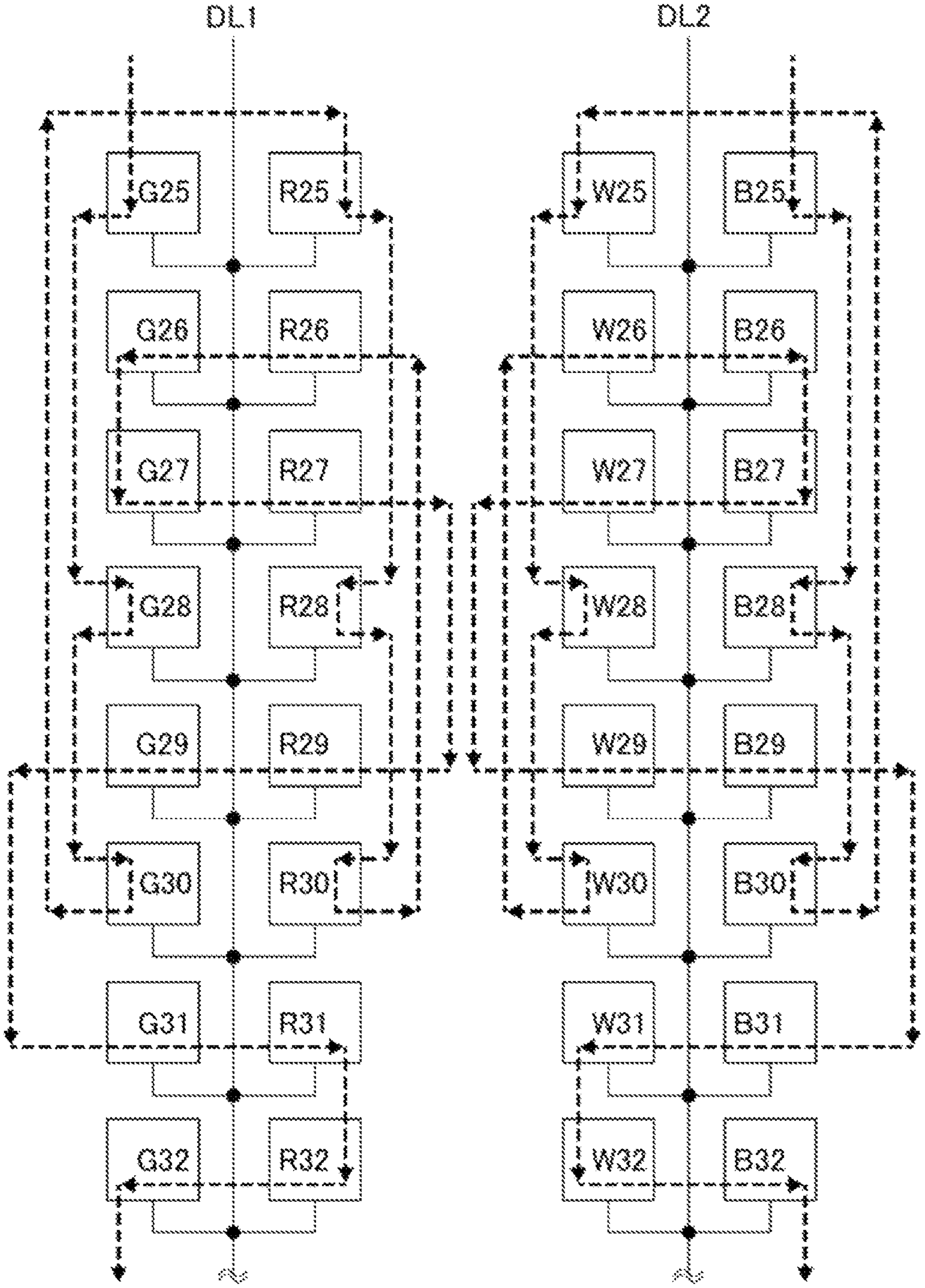
FIG. 34 is a view showing a subpixel scan order of a display device according to a fourth aspect of the present disclosure.

FIG. 34 is a view showing a subpixel scan order of a display device according to a fourth aspect of the present disclosure. FIG. 34 shows the subpixels of four columns in the pixel rows 2501 to 2508 of FIG. 32. In FIG. 34, the green subpixels G25 to G32 and the red subpixels R25 to R32 commonly have the data line DL1, and the white subpixels W25 to W32 and the blue subpixels B25 to B32 commonly have the data line DL2.

The green subpixels G25 to G32 and the red subpixels R25 to R32 of the pixel rows 2501 to 2508 are scanned according to a following order. After the green subpixel G25 is scanned, the green subpixel G28 in three-next row of the green subpixel G25 is scanned. Next, the green subpixel G30 in two-next row of the green subpixel G28 is scanned. Next, the red subpixel R25 which commonly has the data line DL1 with the green subpixel G25 in the same row and is disposed in the pixel column different from the pixel column of the green subpixel G25 is scanned. Next, the red subpixel R28 in three-next row of the red subpixel R25 is scanned. Next, the red subpixel R30 in two-next row of the red subpixel R25 is scanned. Next, the red subpixel R26 in four-previous row of the red subpixel R30 is scanned. Next, the green subpixel G26 which commonly has the data line DL1 with the red subpixel R26 in the same row and is disposed in the pixel column different from the pixel column of the red subpixel R26 is scanned. Next, the green subpixel G27 in one-next row of the green subpixel G26 is scanned. Next, the red subpixel R27 which commonly has the data line DL1 with the green subpixel G27 in the same row and is disposed in the pixel column different from the pixel column of the green subpixel G27 is scanned. Next, the red subpixel R29 in two-next row of the red subpixel R27 is scanned. Next, the green subpixel G29 which commonly has the data line DL1 with the red subpixel R29 in the same row and is disposed in the pixel column different from the pixel column of the red subpixel R29 is scanned. Next, the green subpixel G31 in two-next row of the green subpixel G29 is scanned. Next, the red subpixel R31 which commonly has the data line DL1 with the green subpixel G31 in the same row and is disposed in the pixel column different from the pixel column of the green subpixel G31 is scanned. Next, the red subpixel R32 in one-next row of the red subpixel R31 is scanned. Next, the red subpixel R32 in one-next row of the red subpixel R32 is scanned. Next, the green subpixel G32 which commonly has the data line DL1 with the red subpixel R32 in the same row and is disposed in the pixel column different from the pixel column of the red subpixel R32 is scanned.

The white subpixels W25 to W32 and the blue subpixels B25 to B32 of the pixel rows 2501 to 2508 are scanned according to a following order. After the blue subpixel B25 is scanned, the blue subpixel B28 in three-next row of the blue subpixel B25 is scanned. Next, the blue subpixel B30 in two-next row of the blue subpixel B28 is scanned. Next, the white subpixel W25 which commonly has the data line DL2 with the blue subpixel B25 in the same row and is disposed in the pixel column different from the pixel column of the blue subpixel B25 is scanned. Next, the white subpixel W28 in three-next row of the white subpixel W25 is scanned. Next, the white subpixel W30 in two-next row of the white subpixel W28 is scanned. Next, the white subpixel W26 in four-previous row of the white subpixel W30 is scanned. Next, the blue subpixel B26 which commonly has the data line DL2 with the white subpixel W26 in the same row and is disposed in the pixel column different from the pixel column of the white subpixel W26 is scanned. Next, the blue subpixel B27 in one-next row of the blue subpixel B26 is scanned. Next, the white subpixel W27 which commonly has the data line DL2 with the blue subpixel B27 in the same row and is disposed in the pixel column different from the pixel column of the blue subpixel B27 is scanned. Next, the white subpixel W29 in two-next row of the white subpixel W27 is scanned. Next, the blue subpixel B29 which commonly has the data line DL2 with the white subpixel W29 in the same row and is disposed in the pixel column different from the pixel column of the white subpixel W29 is scanned. Next, the blue subpixel B31 in two-next row of the blue subpixel B29 is scanned. Next, the white subpixel W31 which commonly has the data line DL2 with the blue subpixel B31 in the same row and is disposed in the pixel column different from the pixel column of the blue subpixel B31 is scanned. Next, the white subpixel W32 in one-next row of the white subpixel W31 is scanned. Next, the blue subpixel B32 which commonly has the data line DL2 with the white subpixel W32 in the same row and is disposed in the pixel column different from the pixel column of the white subpixel W32 is scanned.

The similarity judging part 550 compares the image data (signal) applied to each row with the image data applied to the other rows. In a fourth aspect, the rows that is judged by the similarity judging part 550 to receive the similar image data are firstly scanned, and the number of the rows for consecutively scanning the subpixels of the same color increases even when the rows that is judged to receive the similar image data are not consecutive. As a result, the frequency of discontinuity of the signal (voltage) of the outputted image data is reduced, and the power consumption of the display device 10 is reduced. Accordingly, in the display device according to a fourth aspect of the present disclosure using a double rate driving (DRD) method, the power consumption of writing the image data to the subpixels is further reduced.

Figure 35:
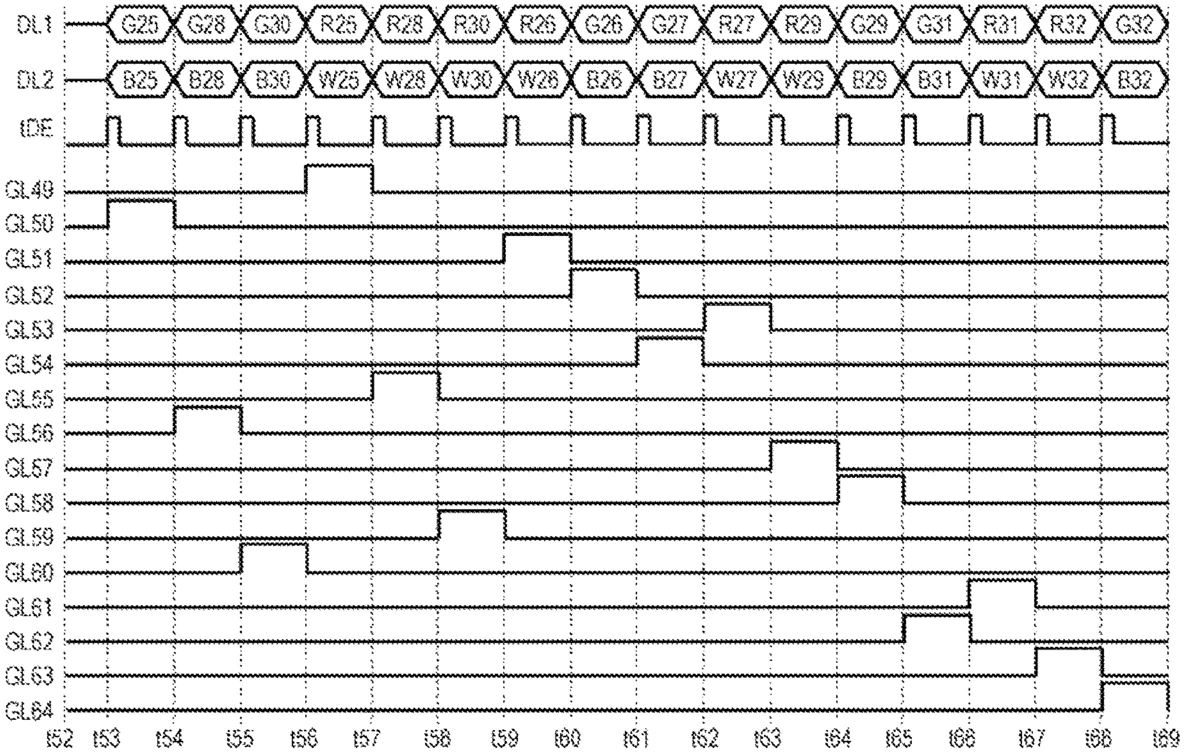
FIG. 35 is a view showing a gate signal of a gate driving unit of a display device according to a fourth aspect of the present disclosure.

FIG. 35 is a view showing a gate signal of a gate driving unit of a display device according to a fourth aspect of the present disclosure. The subpixels of the rows 2501 to 2508 of FIG. 34 are scanned based on the signals transmitted from the similarity judging part 550 to the scheduler 560 of FIG. 31. The gate driving unit 200 applies the gate signals to the gate lines GL49 to GL64 according to a timing of FIG. 35.

During a period between timings t52 and t53, the gate signal is not applied to the gate lines GL49 to GL64. During a period between timings t53 and t54, the gate signal is applied to the gate line GL50 in synchronization with the modulated data enable tDE. When the gate signal is applied to the gate line GL50, the data signal of the data line DL1 is applied to the first node N1 between the gate of the driving transistor DT of the green subpixel G25 and the first capacitor C1 of the green subpixel G25 through the first switching transistor T1 of the green subpixel G25. The data signal of the data line DL1 corresponds to the image data for the green subpixel G25. Similarly, when the gate signal is applied to the gate line GL50, the data signal of the data line DL2 is applied to the first node N1 between the gate of the driving transistor DT of the blue subpixel B25 and the first capacitor C1 of the blue subpixel B25 through the first switching transistor T1 of the blue subpixel B25. The data signal of the data line DL2 corresponds to the image data for the blue subpixel B25.

During a period between timings t54 and t55, the gate signal is applied to the gate line GL56 in synchronization with the modulated data enable tDE. When the gate signal is applied to the gate line GL56, the data signal of the data line DL1 is applied to the first node N1 between the gate of the driving transistor DT of the green subpixel G28 and the first capacitor C1 of the green subpixel G28 through the first switching transistor T1 of the green subpixel G28. The data signal of the data line DL1 corresponds to the image data for the green subpixel G28. Similarly, when the gate signal is applied to the gate line GL56, the data signal of the data line DL2 is applied to the first node N1 between the gate of the driving transistor DT of the blue subpixel B28 and the first capacitor C1 of the blue subpixel B28 through the first switching transistor T1 of the blue subpixel B28. The data signal of the data line DL2 corresponds to the image data for the blue subpixel B28.

During a period between timings t55 and t56, the gate signal is applied to the gate line GL60 in synchronization with the modulated data enable tDE. When the gate signal is applied to the gate line GL60, the data signal of the data line DL1 is applied to the first node N1 between the gate of the driving transistor DT of the green subpixel G30 and the first capacitor C1 of the green subpixel G30 through the first switching transistor T1 of the green subpixel G30. The data signal of the data line DL1 corresponds to the image data for the green subpixel G30. Similarly, when the gate signal is applied to the gate line GL60, the data signal of the data line DL2 is applied to the first node N1 between the gate of the driving transistor DT of the blue subpixel B309 and the first capacitor C1 of the blue subpixel B30 through the first switching transistor T1 of the blue subpixel B30. The data signal of the data line DL2 corresponds to the image data for the blue subpixel B30.

During a period between timings t56 and t57, the gate signal is applied to the gate line GL49 in synchronization with the modulated data enable tDE. When the gate signal is applied to the gate line GL49, the data signal of the data line DL1 is applied to the first node N1 between the gate of the driving transistor DT of the red subpixel R25 and the first capacitor C1 of the red subpixel R25 through the first switching transistor T1 of the red subpixel R25. The data signal of the data line DL1 corresponds to the image data for the red subpixel R25. Similarly, when the gate signal is applied to the gate line GL49, the data signal of the data line DL2 is applied to the first node N1 between the gate of the driving transistor DT of the white subpixel W25 and the first capacitor C1 of the white subpixel W25 through the first switching transistor T1 of the white subpixel W25. The data signal of the data line DL2 corresponds to the image data for the white subpixel W25.

During a period between timings t57 and t58, the gate signal is applied to the gate line GL55 in synchronization with the modulated data enable tDE. When the gate signal is applied to the gate line GL55, the data signal of the data line DL1 is applied to the first node N1 between the gate of the driving transistor DT of the red subpixel R28 and the first capacitor C1 of the red subpixel R28 through the first switching transistor T1 of the red subpixel R28. The data signal of the data line DL1 corresponds to the image data for the red subpixel R28. Similarly, when the gate signal is applied to the gate line GL55, the data signal of the data line DL2 is applied to the first node N1 between the gate of the driving transistor DT of the white subpixel W28 and the first capacitor C1 of the white subpixel W28 through the first switching transistor T1 of the white subpixel W28. The data signal of the data line DL2 corresponds to the image data for the white subpixel W28.

During a period between timings t58 and t59, the gate signal is applied to the gate line GL59 in synchronization with the modulated data enable tDE. When the gate signal is applied to the gate line GL59, the data signal of the data line DL1 is applied to the first node N1 between the gate of the driving transistor DT of the red subpixel R30 and the first capacitor C1 of the red subpixel R30 through the first switching transistor T1 of the red subpixel R30. The data signal of the data line DL1 corresponds to the image data for the red subpixel R30. Similarly, when the gate signal is applied to the gate line GL59, the data signal of the data line DL2 is applied to the first node N1 between the gate of the driving transistor DT of the white subpixel W30 and the first capacitor C1 of the white subpixel W30 through the first switching transistor T1 of the white subpixel W30. The data signal of the data line DL2 corresponds to the image data for the white subpixel W30.

During a period between timings t59 and t60, the gate signal is applied to the gate line GL51 in synchronization with the modulated data enable tDE. When the gate signal is applied to the gate line GL51, the data signal of the data line DL1 is applied to the first node N1 between the gate of the driving transistor DT of the red subpixel R26 and the first capacitor C1 of the red subpixel R26 through the first switching transistor T1 of the red subpixel R26. The data signal of the data line DL1 corresponds to the image data for the red subpixel R26. Similarly, when the gate signal is applied to the gate line GL51, the data signal of the data line DL2 is applied to the first node N1 between the gate of the driving transistor DT of the white subpixel W26 and the first capacitor C1 of the white subpixel W26 through the first switching transistor T1 of the white subpixel W26. The data signal of the data line DL2 corresponds to the image data for the white subpixel W26.

During a period between timings t60 and t61, the gate signal is applied to the gate line GL52 in synchronization with the modulated data enable tDE. When the gate signal is applied to the gate line GL52, the data signal of the data line DL1 is applied to the first node N1 between the gate of the driving transistor DT of the green subpixel G26 and the first capacitor C1 of the green subpixel G26 through the first switching transistor T1 of the green subpixel G26. The data signal of the data line DL1 corresponds to the image data for the green subpixel G26. Similarly, when the gate signal is applied to the gate line GL52, the data signal of the data line DL2 is applied to the first node N1 between the gate of the driving transistor DT of the blue subpixel B26 and the first capacitor C1 of the blue subpixel B26 through the first switching transistor T1 of the blue subpixel B26. The data signal of the data line DL2 corresponds to the image data for the blue subpixel B26.

During a period between timings t61 and t62, the gate signal is applied to the gate line GL54 in synchronization with the modulated data enable tDE. When the gate signal is applied to the gate line GL54, the data signal of the data line DL1 is applied to the first node N1 between the gate of the driving transistor DT of the green subpixel G27 and the first capacitor C1 of the green subpixel G27 through the first switching transistor T1 of the green subpixel G27. The data signal of the data line DL1 corresponds to the image data for the green subpixel G27. Similarly, when the gate signal is applied to the gate line GL54, the data signal of the data line DL2 is applied to the first node N1 between the gate of the driving transistor DT of the blue subpixel B27 and the first capacitor C1 of the blue subpixel B27 through the first switching transistor T1 of the blue subpixel B27. The data signal of the data line DL2 corresponds to the image data for the blue subpixel B27.

During a period between timings t62 and t63, the gate signal is applied to the gate line GL53 in synchronization with the modulated data enable tDE. When the gate signal is applied to the gate line GL53, the data signal of the data line DL1 is applied to the first node N1 between the gate of the driving transistor DT of the red subpixel R27 and the first capacitor C1 of the red subpixel R27 through the first switching transistor T1 of the red subpixel R27. The data signal of the data line DL1 corresponds to the image data for the red subpixel R27. Similarly, when the gate signal is applied to the gate line GL53, the data signal of the data line DL2 is applied to the first node N1 between the gate of the driving transistor DT of the white subpixel W27 and the first capacitor C1 of the white subpixel W27 through the first switching transistor T1 of the white subpixel W27. The data signal of the data line DL2 corresponds to the image data for the white subpixel W27.

During a period between timings t63 and t64, the gate signal is applied to the gate line GL57 in synchronization with the modulated data enable tDE. When the gate signal is applied to the gate line GL57, the data signal of the data line DL1 is applied to the first node N1 between the gate of the driving transistor DT of the red subpixel R29 and the first capacitor C1 of the red subpixel R29 through the first switching transistor T1 of the red subpixel R29. The data signal of the data line DL1 corresponds to the image data for the red subpixel R29. Similarly, when the gate signal is applied to the gate line GL57, the data signal of the data line DL2 is applied to the first node N1 between the gate of the driving transistor DT of the white subpixel W29 and the first capacitor C1 of the white subpixel W29 through the first switching transistor T1 of the white subpixel W29. The data signal of the data line DL2 corresponds to the image data for the white subpixel W29.

During a period between timings t64 and t65, the gate signal is applied to the gate line GL58 in synchronization with the modulated data enable tDE. When the gate signal is applied to the gate line GL58, the data signal of the data line DL1 is applied to the first node N1 between the gate of the driving transistor DT of the green subpixel G29 and the first capacitor C1 of the green subpixel G29 through the first switching transistor T1 of the green subpixel G29. The data signal of the data line DL1 corresponds to the image data for the green subpixel G29. Similarly, when the gate signal is applied to the gate line GL58, the data signal of the data line DL2 is applied to the first node N1 between the gate of the driving transistor DT of the blue subpixel B29 and the first capacitor C1 of the blue subpixel B29 through the first switching transistor T1 of the blue subpixel B29. The data signal of the data line DL2 corresponds to the image data for the blue subpixel B29.

During a period between timings t65 and t66, the gate signal is applied to the gate line GL62 in synchronization with the modulated data enable tDE. When the gate signal is applied to the gate line GL62, the data signal of the data line DL1 is applied to the first node N1 between the gate of the driving transistor DT of the green subpixel G31 and the first capacitor C1 of the green subpixel G31 through the first switching transistor T1 of the green subpixel G31. The data signal of the data line DL1 corresponds to the image data for the green subpixel G31. Similarly, when the gate signal is applied to the gate line GL62, the data signal of the data line DL2 is applied to the first node N1 between the gate of the driving transistor DT of the blue subpixel B31 and the first capacitor C1 of the blue subpixel B31 through the first switching transistor T1 of the blue subpixel B31. The data signal of the data line DL2 corresponds to the image data for the blue subpixel B31.

During a period between timings t66 and t67, the gate signal is applied to the gate line GL61 in synchronization with the modulated data enable tDE. When the gate signal is applied to the gate line GL61, the data signal of the data line DL1 is applied to the first node N1 between the gate of the driving transistor DT of the red subpixel R31 and the first capacitor C1 of the red subpixel R31 through the first switching transistor T1 of the red subpixel R31. The data signal of the data line DL1 corresponds to the image data for the red subpixel R31. Similarly, when the gate signal is applied to the gate line GL61, the data signal of the data line DL2 is applied to the first node N1 between the gate of the driving transistor DT of the white subpixel W31 and the first capacitor C1 of the white subpixel W31 through the first switching transistor T1 of the white subpixel W31. The data signal of the data line DL2 corresponds to the image data for the white subpixel W31.

During a period between timings t67 and t68, the gate signal is applied to the gate line GL63 in synchronization with the modulated data enable tDE. When the gate signal is applied to the gate line GL63, the data signal of the data line DL1 is applied to the first node N1 between the gate of the driving transistor DT of the red subpixel R32 and the first capacitor C1 of the red subpixel R32 through the first switching transistor T1 of the red subpixel R32. The data signal of the data line DL1 corresponds to the image data for the red subpixel R32. Similarly, when the gate signal is applied to the gate line GL63, the data signal of the data line DL2 is applied to the first node N1 between the gate of the driving transistor DT of the white subpixel W32 and the first capacitor C1 of the white subpixel W32 through the first switching transistor T1 of the white subpixel W32. The data signal of the data line DL2 corresponds to the image data for the white subpixel W32.

During a period between timings t68 and t69, the gate signal is applied to the gate line GL64 in synchronization with the modulated data enable tDE. When the gate signal is applied to the gate line GL64, the data signal of the data line DL1 is applied to the first node N1 between the gate of the driving transistor DT of the green subpixel G32 and the first capacitor C1 of the green subpixel G32 through the first switching transistor T1 of the green subpixel G32. The data signal of the data line DL1 corresponds to the image data for the green subpixel G32. Similarly, when the gate signal is applied to the gate line GL64, the data signal of the data line DL2 is applied to the first node N1 between the gate of the driving transistor DT of the blue subpixel B32 and the first capacitor C1 of the blue subpixel B32 through the first switching transistor T1 of the blue subpixel B32. The data signal of the data line DL2 corresponds to the image data for the blue subpixel B32.

During a period between the timings t53 and t69, the gate driving unit 200 applies the gate signal to the gate lines GL49 to GL64 based on the gate line designation signal GL_Num of the scheduler 560 according to an order as shown in FIG. 35. During a period between the timings t53 and t69, the data driving unit 300 writes the data signal to the green subpixel G and the red subpixel R through the common data line DL1 according to the gate signal applied to the gate lines GL49 to GL64. During a period between the timings t53 and t69, the data driving unit 300 writes the data signal to the white subpixel W and the blue subpixel B through the common data line DL2 according to the gate signal applied to the gate lines GL49 to GL64.

According to the timings of FIG. 35 and the order of FIG. 34, the data driving unit 300 writes the data signal to the green subpixels G25 to G32, the red subpixels R25 to R32, the white subpixels W25 to W32 and the blue subpixels B25 to B32 in the pixel rows 2501 to 2508. When the region of the subpixels of FIG. 34 is scanned, the rows that is judged by the similarity judging part 550 to receive the similar image data are firstly scanned. Further, the number of the rows for consecutively scanning the subpixels of the same color increases even when the rows that is judged to receive the similar image data are not consecutive. As a result, the frequency of discontinuity of the signal (voltage) of the outputted image data is reduced, and the power consumption of the display device 10 is reduced. Accordingly, in the display device according to a fourth aspect of the present disclosure using a double rate driving (DRD) method, the power consumption of writing the image data to the sub-pixels is further reduced.

A variation of the data selecting part 310 will be illustrated hereinafter. Illustration on parts of the data dividing parts 311-1 to 311-*m*, the first registers 312-1 to 312-*m*, the second registers 313-1 to 313-*m* and the selecting parts 314-1 to 314-*m* having the same structure and the same function as those of a first aspect may be omitted.

An exemplary operation of the data selecting part 310 according to the input signal to the scheduler 560 will be illustrated with reference to FIGS. 16 and 36. FIG. 36 is a view showing input signals to a data selecting part of a display device according to a sixth aspect of the present disclosure.

As shown in FIG. 16, the judgement result signal RES_O of the similarity judging part 550 to the odd column has a value of 0 with respect to the (x−7)th row. The similarity judging part 550 judges that the image data of the odd column with respect to the (x−7)th row is not similar to the image data of the odd column with respect to a one-previous row. The judgement result signal RES_O of the similarity judging part 550 to the odd column has a value of 1 with respect to the (x−6)th row to the xth row. The similarity judging part 550 judges that the image data of the odd column with respect to the (x−6)th row to the xth row is similar to the image data of the odd column with respect to the one-previous row. The judgement result signal RES_E of the similarity judging part 550 to the even column has a value of 0 with respect to all of the rows. The similarity judging part 550 judges that the image data of the even column with respect to the (x−7)th row to the xth row is not similar to the image data of the even column with respect to the one-previous row.

FIG. 36 shows an input register selection signal IRSS, an input validation signal VALID and an output register selection signal ORSS transmitted to a data selecting part 310. The image data (signal) of the odd column with respect to the (x−6)th row to the xth row are similar to the image data of the odd column with respect to the one-previous row. For a scan number of 33, the arranged image data R'G'B'W' of the odd column with respect to the (x−7)th row is inputted as an input data number of 33 from the row memory part 520 to the data selecting part 310. Next, for the scan number of 34, the arranged image data R'G'B'W' of the even column with respect to the (x−7)th row is inputted as the input data number of 41 from the row memory part 520 to the data selecting part 310. Next, for the scan numbers of 35 to 40, the image data is not inputted from the row memory part 520 to the data selecting part 310. Next, for the scan numbers of 41 to 47, the arranged image data R'G'B'W' of the even column with respect to the (x−6)th row to the xth row are inputted as the input data numbers of 42 to 48 from the row memory part 520 to the data selecting part 310. Next, for the scan number of 48, the image data is not inputted from the row memory part 520 to the data selecting part 310.

The scheduler 560 generates the input register selection signal TRSS for designating the register that can store the input data of the input data number of 33 of the odd column. The scheduler 560 transmits the input register selection signal IRSS designating the first registers 312-1 to 312-*m* as a register that can store the input data of the input data number of 33 to the data selecting part 310. The scheduler 560 generates the input register selection signal TRSS for designating the register that can store the input data of the input data numbers of 41 to 48 of the even column. The scheduler 560 transmits the input register selection signal IRSS designating the first registers 312-1 to 312-*m* or the second registers 313-1 to 313-*m* as a register that can store the input data of the input data numbers of 41 to 48 to the data selecting part 310.

The scheduler 560 transmits 1 as the input validation signal VALID for the input data of the input data number of 33 corresponding to the odd column to the data selecting part 310 and validates the input register selection signal TRSS designating that the input data of the input data number of 33 is stored in the first registers 312-1 to 312-*m*. Next, the scheduler 560 does not transmit the input data for the scan numbers of 35 to 40 and transmits 0 as the input validation signal VALID to the data selecting part 310. As a result, the first registers 312-1 to 312-*m* are not updated and the input data of the input data number of 41 is maintained. Accordingly, the power consumption for updating the data stored in the first registers 312-1 to 312-*m* is reduced. Further, the scheduler 560 transmits the input register selection signal IRSS designating the second registers 313-1 to 313-*m*. However, when the scheduler 560 transmits 0 as the input validation signal VALID to the data selecting part 310, the transmission of the input register selection signal IRSS may be omitted.

Next, the scheduler 560 transmits 1 as the input validation signal VALID for the input data of the input data numbers of 42, 44, 46 and 48 corresponding to the even column to the data selecting part 310 and validates the input register selection signal IRSS designating that the input data of the input data numbers of 42, 44, 46 and 48 are stored in the first registers 312-1 to 312-*m*. The scheduler 560 transmits 1 as the input validation signal VALID for the input data of the input data numbers of 43, 45 and 47 corresponding to the even column to the data selecting part 310 and validates the input register selection signal IRSS designating that the input data of the input data numbers of 44, 45 and 47 are stored in the second registers 313-1 to 313-*m*.

The scheduler 560 transmits the output register selection signal ORSS to the data selecting part 310 for sequentially outputting the input data of the input data number of 33 and the input data of the input data numbers of 41 to 48 as output data of output data numbers of 33 to 48 to the data converting part 320. The scheduler 560 transmits the output register selection signal ORSS designating the first registers 312-1 to 312-*m* for the scan numbers 33 to 40, 42, 44, 46 and 48 to the data selecting part 310 and transmits the output register selection signal ORSS designating the second registers 313-1 to 313-*m* for the scan numbers 41, 43, 45 and 47 to the data selecting part 310. For the scan numbers of 33-40, the input data of the input data number of 33 stored in the first registers 312-1 to 312-*m* is outputted as the output data of the output data numbers of 33 to 40. For the scan number of 41, the input data of the input data number of 41 stored in the second registers 313-1 to 313-*m* corresponding to the scan number of 34 is outputted as the output data of the output data number of 41. For the scan number of 42, the input data of the input data number of 42 stored in the first registers 312-1 to 312-*m* corresponding to the scan number of 41 is outputted as the output data of the output data number of 42. For the scan number of 43, the input data of the input data number of 43 stored in the second registers 313-1 to 313-*m* corresponding to the scan number of 42 is outputted as the output data of the output data number of 43. For the scan number of 44, the input data of the input data number of 44 stored in the first registers 312-1 to 312-*m* corresponding to the scan number of 43 is outputted as the output data of the output data number of 44. For the scan number of 45, the input data of the input data number of 45 stored in the second registers 313-1 to **313-*m* corresponding to the scan number of 44 is outputted as the output data of the output data number of 45. For the scan number of 46, the input data of the input data number of 46 stored in the first registers 312-1 to 312-*m* corresponding to the scan number of 45 is outputted as the output data of the output data number of 46. For the scan number of 47, the input data of the input data number of 47 stored in the second registers 313-1 to 313-*m* corresponding to the scan number of 46 is outputted as the output data of the output data number of 47. For the scan number of 48, the input data of the input data number of 48 stored in the first registers 312-1 to 312-*m*** corresponding to the scan number of 47 is outputted as the output data of the output data number of 48.

The input data corresponding to the even column are stored in the first registers 312-1 to **312-*m* as well as the second registers 313-1 to 313-*m*. Similarly, the input data corresponding to the odd column may be stored in the second registers 313-1 to 313-*m* as well as the first registers 312-1 to 312-*m*. The input data stored in the registers may be changed as in a sixth aspect. Further, additional registers may be further connected to each row. A capacity of the row memory part 520 in the timing controlling unit 500** may be reduced by using the additional registers.

A variation of the scheduler 560 will be illustrated hereinafter. Illustration on parts of the buffer 561, the scan order determining part 562, the gate line determining part 563 and the register 564 having the same structure and the same function as those of a first aspect may be omitted.

Figure 37:
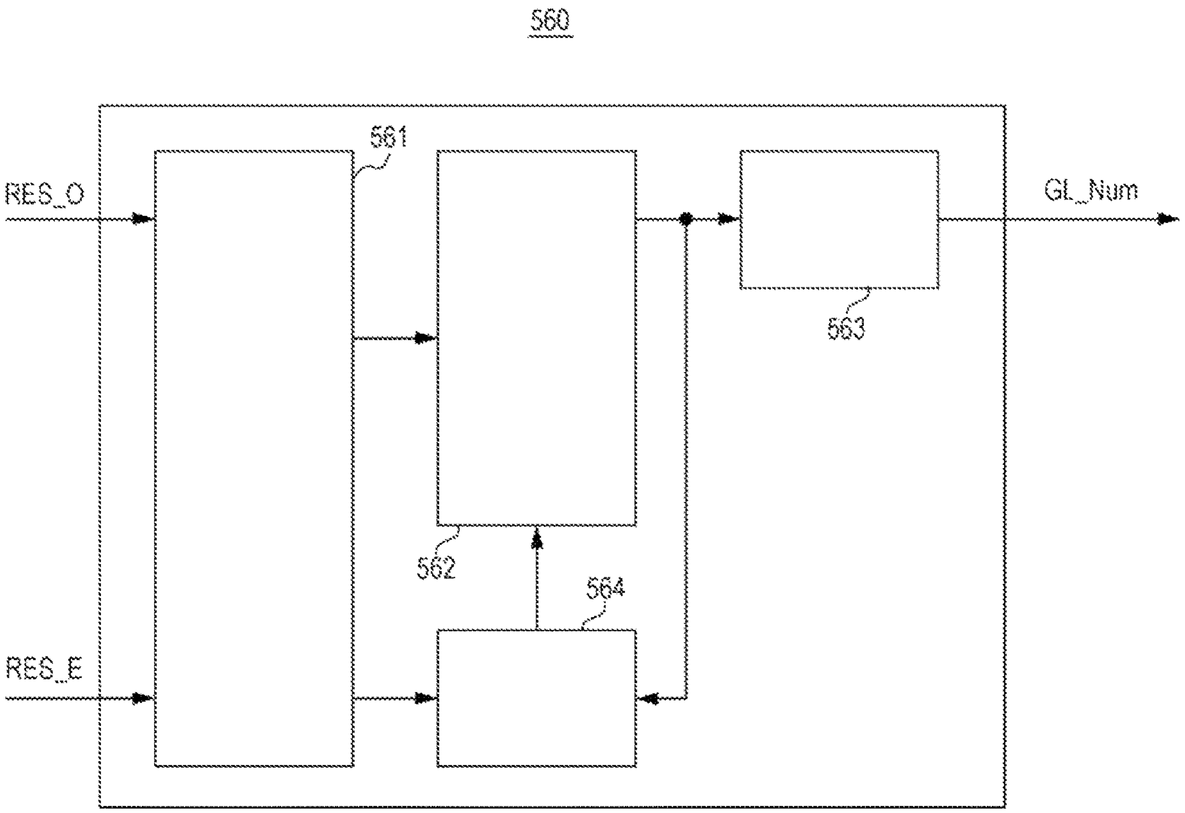
FIG. 37 is a view showing a scheduler of a display device according to a seventh aspect of the present disclosure.

FIG. 37 is a view showing a scheduler of a display device according to a seventh aspect of the present disclosure. The scheduler 560 includes a buffer 561, a scan order determining part 562, a gate line determining part 563 and a resister 564. The scheduler 560 of a seventh aspect does not include a selection signal determining part 565. As a result, a register selection signal RSS is not transmitted from the scheduler 560. The data driving unit 300 does not include a data selecting part 310. An additional row memory (not shown) is formed in the timing controlling part 500. The image data RGBW inputted to the timing controlling part 500 is transmitted to the additional row memory part. The signal modulating part 510 transmits the arranged image data R'G'B'W' corresponding to the designated gate line from the additional row memory part to the data driving unit 300 based on the gate line designation signal GL_Num received from the scheduler 560.

In the display device according to a seventh aspect of the present disclosure, the scheduler 560 does not include a selection signal determining part 565, and the data driving unit 300 does not include a data selecting part 310. As a result, a structure of the display device 10 may be simplified.

A variation of the timing controlling unit 500 will be illustrated hereinafter. Illustration on parts of the signal modulating part 510, the data control signal generating part 530, the gate control signal generating part 540, the similarity judging part 550 and the scheduler 560 having the same structure and the same function as those of a first aspect may be omitted.

Figure 38:
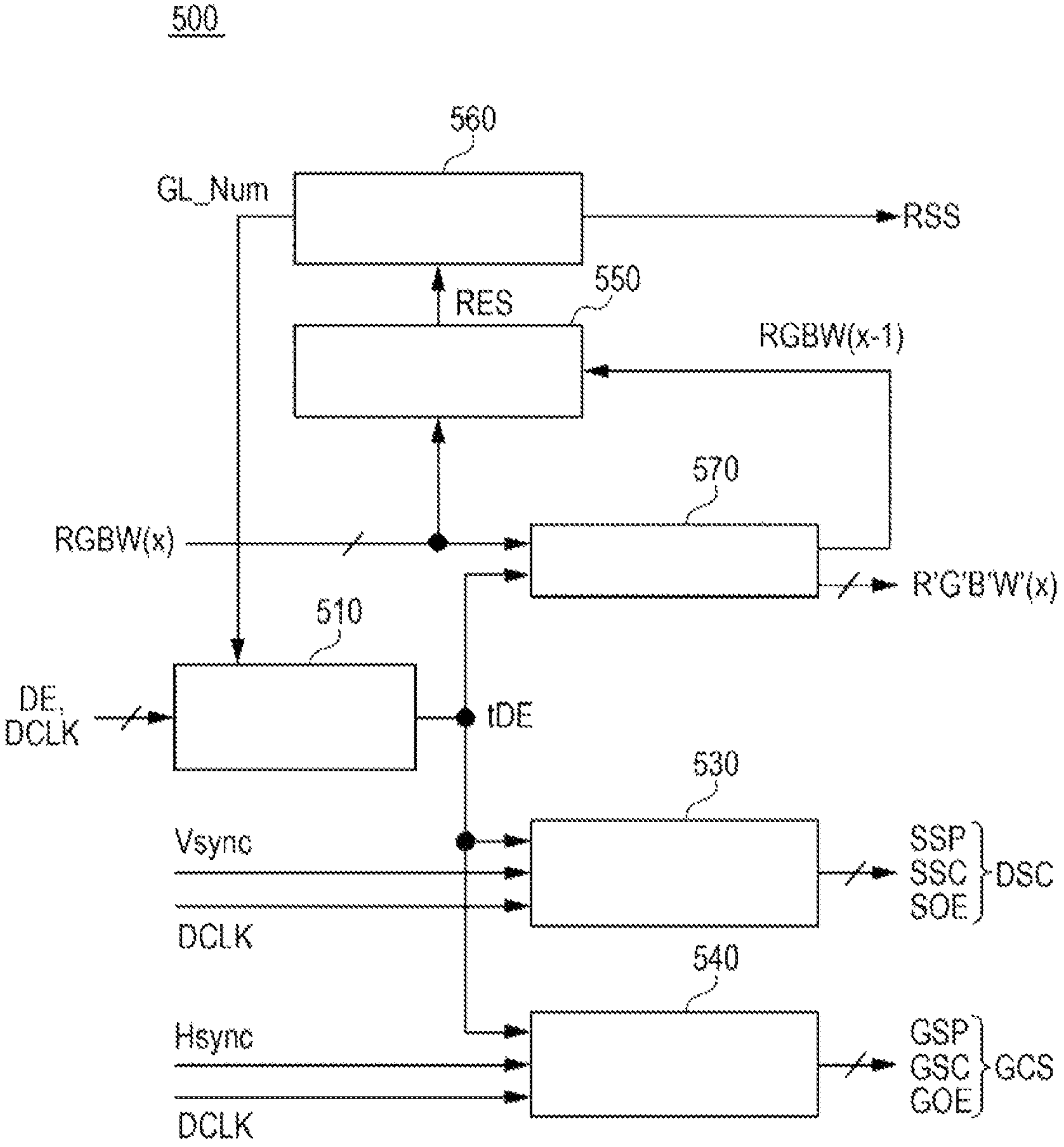
FIG. 38 is a view showing a timing controlling unit of a display device according to an eighth aspect of the present disclosure.

FIG. 38 is a view showing a timing controlling unit of a display device according to an eighth aspect of the present disclosure. In FIG. 38, a timing controlling unit 500 includes a frame memory part 570. The frame memory part 570 stores an image data RGBW by a frame. For example, the frame memory part 570 stores the image data RGBW (x) of the xth frame. The frame memory part 570 transmits the image data RGBW (x−1) of the (x−1) th frame to the similarity judging part 550.

The similarity judging part 550 judges the similarity of the image data between two frames and transmits the judgement result signal RES to the scheduler 560. For example, the similarity judging part 550 receives the image data RGBW(x−1) of the (x−1)th frame from the frame memory part 570 and judges whether the image data RGBW (x−1) of the (x−1)th frame is similar to the image data RGBW(x) of the xth frame. When the image data of two rows among the image data between two frames are judged to be similar to each other, the similarity judging part 550 outputs 1 as the judgement result signal RES. When the image data of two rows among the image data between two frames are judged to be not similar to each other, the similarity judging part 550 outputs 0 as the judgement result signal RES.

The scheduler 560 generates the gate line designation signal GL_Num designating the number of the gate line GL transmitting the gate signal based on the judgement result signal RES received from the similarity judging part 550. The scheduler 560 transmits the register selection signal RSS for designating the register that can store the image data R'G'B'W' transmitted from the frame memory part 570 to the data driving unit 300. The data driving unit 300 stores the image data R'G'B'W' in the designated register based on the received register selection signal RSS.

The timing controlling unit 500 judges the similarity between the image data (signal) of each frame displayed in the display panel 100. The timing controlling unit 500 generates the gate line designation signal GL_Num and the register selection signal RSS based on the judged similarity. In the display device 10 using the DRD method according to an eighth aspect of the present disclosure, deterioration of the display quality is prevented and the power consumption is reduced based on the similarity between the image data (signal) of each frame displayed in the display panel 100.

Further, when the display panel 100 displays a static image, deterioration of the display quality according to the writing time difference of the image data to the subpixels in the same row may be negligible. As a result, when the display device 10 displays a static image, the number of the rows for consecutively scanning the subpixels of the same color may be determined to be the same as the number of the pixel rows of the display panel. For example, when the display device 10 includes the pixel rows of 2160, the green subpixel G and the blue subpixel B are consecutively scanned throughout the pixel rows of 2160 during a former half of a frame, and the red subpixel R and the white subpixel W are consecutively scanned throughout the pixel rows of 2160 during a latter half of a frame. Since the frequency of discontinuity of the signal (voltage) of the outputted image data is further reduced, the power consumption of the display device 10 may be reduced.

In the display device according to first to eighth aspects of the present disclosure, the scan order for the subpixels is determined based on the similarity between the image data (signal). For example, when the image having a relatively low luminance such as a black is displayed, discontinuity of the image signal may not occur or negligible discontinuity may occur. For example, when the luminance of the image displayed in the display panel 100 is equal to or smaller than a predetermined value, the number of the rows for consecutively scanning the subpixels of the same color is reduced regardless of the judgement result on the similarity. As a result, the writing time difference of the image data between the subpixels in the same row is reduced. As shown in FIG. 21, the writing time difference of the image data between the subpixels in the same row is reduced by alternately scanning the subpixels of each color by two rows. In the display device using the DRD method according to an eighth aspect of the present disclosure, deterioration of the display quality is prevented and the power consumption is reduced.

If the number of the rows for consecutively scanning the subpixels of the same color excessively increases even when the similarity judging part 550 judges that the image data (signal) are similar to each other in a relatively wide area, the display quality may be deteriorated. As a result, the timing controlling unit 500 may limit the number of the rows for consecutively scanning the subpixels of the same color. For example, when the display device displays a moving image, the timing controlling unit 500 may determine the number of the rows for consecutively scanning the subpixels of the same color to be ⅕ of a sum of the subpixel rows in the display panel 100. When the display panel 100 includes the subpixel rows of 2160, the timing controlling unit 500 may limit the number of the rows for consecutively scanning the subpixels of the same color as 432.

It will be apparent to those skilled in the art that various modifications and variations can be made in the display device in the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A display device, comprising:

a display panel having a plurality of subpixels arranged in a row and a column, a plurality of gate lines extending along a row direction and a plurality of data lines extending along a column direction;

a first gate driving unit supplying a plurality of gate signals that activates a first subpixel of a first color of the plurality of subpixels to the first subpixel through a first gate line of the plurality of gate lines;

a second gate driving unit supplying the plurality of gate signals that activates a second subpixel of a second color of the plurality of subpixels to the second subpixel through a second gate line of the plurality of gate lines;

a data driving unit supplying a plurality of data signals corresponding to a luminance of the plurality of subpixels through the plurality of data lines; and a timing controlling unit controlling the first gate driving unit, the second gate driving unit and the data driving unit, wherein the first subpixel and the second subpixel in a first row commonly have a first data line of the plurality of data lines, wherein the timing controlling unit independently controls the first gate driving unit from the second gate driving unit to consecutively supply the plurality of gate signals to the first subpixel through the first gate line, wherein the plurality of subpixels further include a third subpixel of the first color and a fourth subpixel of the second color, the third subpixel and the fourth subpixel in a second row commonly having the first data line, and wherein the timing controlling unit controls the first gate driving unit such that the plurality of gate signals are supplied to the third subpixel consecutively to the first subpixel when the plurality of data signals of the first subpixel is judged to be similar to the plurality of data signals of the third subpixel.

2. The display device of claim 1, wherein the timing controlling unit controls the first gate driving unit to have a state such that the plurality of gate signals are supplied through first group gate lines of the plurality of gate lines at a first scan timing and controls the first gate driving unit to have a state such that the plurality of gate signals are supplied through second group gate lines of the plurality of gate lines at a second scan timing next to the first scan timing, and wherein the second group gate lines include a gate line which is not included in the first group gate lines.

3. The display device of claim 2, wherein the timing controlling unit controls the first gate driving unit such that the plurality of gate signals are supplied to the first subpixel through one of the first group gate lines at the first scan timing.

4. The display device of claim 2, wherein the timing controlling unit controls the second gate driving unit such that the plurality of gate signals are supplied through group gate lines of the plurality of gate lines at the first scan timing and the second scan timing.

5. The display device of claim 4, wherein the timing controlling unit controls the second gate driving unit such that the plurality of gate signals are not supplied to the second subpixel at the first scan timing and the second scan timing.

6. The display device of claim 5, wherein the timing controlling unit independently controls the second gate driving unit from the first gate driving unit such that the plurality of gate signals are consecutively supplied to the second subpixel through the second gate line after the plurality of gate signals are supplied to the first subpixel.

7. The display device of claim 6, wherein the timing controlling unit controls the second gate driving unit to have a state such that the plurality of gate signals are supplied through third group gate lines of the plurality of gate lines at a third scan timing next to the second scan timing and controls the second gate driving unit to have a state such that the plurality of gate signals are supplied through fourth group gate lines of the plurality of gate lines at a fourth scan timing next to the third scan timing, and wherein the fourth group gate lines include a gate line which is not included by the third group gate lines.

8. The display device of claim 7, wherein the timing controlling unit controls the second gate driving unit such that the plurality of gate signals are supplied to the second subpixel through one of the third group gate lines at the third scan timing.

9. The display device of claim 8, wherein the timing controlling unit controls the first gate driving unit such that the plurality of gate signals are supplied through group gate lines of the plurality of gate lines at the third scan timing and the fourth scan timing.

10. The display device of claim 9, wherein the timing controlling unit controls the first gate driving unit such that the plurality of gate signals are not supplied to the first subpixel at the third scan timing and the fourth scan timing.

11. The display device of claim 1, wherein the timing controlling unit controls the first gate driving unit and the second gate driving unit such that the plurality of gate signals are supplied to the second subpixel consecutively to the first subpixel when the plurality of data signals of the first subpixel is judged to be not similar to the plurality of data signals of the third subpixel.

12. The display device of claim 11, wherein the timing controlling unit controls the second gate driving unit such that the plurality of gate signals are supplied to the fourth subpixel consecutively to the second subpixel.

13. The display device of claim 1, wherein the timing controlling unit judges whether the plurality of data signals of the first subpixel is similar to the plurality of data signals of the third subpixel in a same frame.

14. The display device of claim 1, wherein the timing controlling unit determines whether the plurality of data signals of the first subpixel is similar to the plurality of data signals of the third subpixel between a plurality of frames.

15. The display device of claim 1, wherein the first row is adjacent to the second row.

16. The display device of claim 1, wherein the first row is not adjacent to the second row.

17. The display device of claim 1, wherein the timing controlling unit supplies a gate start signal designating a start of supply of the plurality of gate signals to the plurality of subpixels to the first gate driving unit and the second gate driving unit at different timings.

18. The display device of claim 1, wherein the timing controlling unit supplies a reset signal designating a reset of a voltage of the plurality of gate lines.

19. The display device of claim 1, wherein the timing controlling unit controls the first gate driving unit such that a number of rows for consecutively supplying the plurality of gate signals to the first subpixel is limited when a moving image is displayed in the display panel.

20. The display device of claim 1, wherein the timing controlling unit controls the first gate driving unit such that a number of rows for consecutively supplying the plurality of gate signals to the first subpixel is a same as a number of pixel rows of the display panel when a static image is displayed in the display panel.

21. The display device of claim 1, wherein the timing controlling unit controls the first gate driving unit and the second gate driving unit such that the plurality of gate signals are supplied to the second subpixel consecutively to the first subpixel regardless of a judgement result when a luminance of an image displayed in the display panel is equal to or smaller than a predetermined value.

22. The display device of claim 1, wherein the first gate driving unit and the second gate driving unit are disposed in a same region.

23. The display device of claim 1, wherein the first gate driving unit and the second gate driving unit are disposed through a gate in panel (GIP) type.

24. The display device of claim 22, wherein a straight path connecting a first output terminal of the plurality of gate lines supplied form the first gate driving unit and one of the plurality of gate lines corresponding to the first output terminal crosses a path connecting a second output terminal of the plurality of gate lines supplied form the second gate driving unit and one of the plurality of gate lines corresponding to the second output terminal.

25. The display device of claim 23, wherein a straight path connecting a first output terminal of the plurality of gate lines supplied form the first gate driving unit and one of the plurality of gate lines corresponding to the first output terminal crosses a path connecting a second output terminal of the plurality of gate lines supplied form the second gate driving unit and one of the plurality of gate lines corresponding to the second output terminal.

26. The display device of claim 1, wherein the plurality of subpixels are arranged a plurality of rows, and wherein the timing controlling unit determines a number of the plurality of rows for consecutively supplying the plurality of gate signals to the first subpixel based on a similarity of the data signal of the first subpixel in a first row of the plurality of rows and the data signals of the plurality of subpixels of the first color in other rows of the plurality of rows.

* * * * *